(12) United States Patent
Higaki et al.

(10) Patent No.: US 6,901,454 B2
(45) Date of Patent: May 31, 2005

(54) CIRCUIT GROUP CONTROL SYSTEM

(75) Inventors: Nobuo Higaki, Kobe (JP); Tetsuya Tanaka, Souraku-gun (JP); Kunihiko Hayashi, Takatsuki (JP); Hiroshi Kadota, Toyonaka (JP); Tokuzo Kiyohara, Osaka (JP); Kozo Kimura, Toyonaka (JP); Hideshi Nishida, Nishinomiya (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 10/289,993

(22) Filed: Nov. 7, 2002

(65) Prior Publication Data

US 2003/0110329 A1 Jun. 12, 2003

(30) Foreign Application Priority Data

Nov. 8, 2001 (JP) ........................................ 2001-343678
Apr. 25, 2002 (JP) ........................................ 2002-124877

(51) Int. Cl.[7] .............................................. G06F 3/00
(52) U.S. Cl. ................................ 710/5; 710/7; 710/20; 710/21
(58) Field of Search ........................... 710/5–7, 20–28; 711/168; 712/9, 212, 213, 215; 714/11

(56) References Cited

U.S. PATENT DOCUMENTS

| 4,608,631 | A |   | 8/1986  | Stiffler et al. ............. 364/200 |
| 4,745,544 | A |   | 5/1988  | Renner et al. |
| 4,800,521 | A |   | 1/1989  | Carter et al. .............. 364/900 |
| 4,926,318 | A |   | 5/1990  | Nakayama |
| 4,942,519 | A |   | 7/1990  | Nakayama |
| 5,155,858 | A |   | 10/1992 | DeBruler et al. ........... 395/800 |
| 5,313,588 | A | * | 5/1994  | Nagashige et al. ............ 710/5 |
| 5,479,622 | A | * | 12/1995 | Grohoski et al. ........... 712/215 |
| 5,613,080 | A | * | 3/1997  | Ray et al. .................... 712/214 |
| 5,918,248 | A |   | 6/1999  | Newell et al. ............... 711/147 |
| 6,011,921 | A | * | 1/2000  | Takahashi et al. ............ 710/48 |
| 6,157,964 | A | * | 12/2000 | Young ........................... 710/5 |
| 6,202,101 | B1| * | 3/2001  | Chin et al. ..................... 710/5 |
| 6,353,844 | B1|   | 3/2002  | Bitar et al. ................. 709/102 |
| 6,647,485 | B2| * | 11/2003 | Nguyen et al. .............. 712/23 |
| 6,704,857 | B2| * | 3/2004  | Barry et al. ................ 712/215 |
| 2002/0083303 | A1| * | 6/2002 | Leitner et al. .............. 712/215 |

FOREIGN PATENT DOCUMENTS

| EP | 0 343 646 A2 | 5/1989 |
| EP | 0 367 639 A2 | 9/1989 |
| EP | 0 403 229 A1 | 6/1990 |
| EP | 0 473 444 A2 | 8/1991 |
| GB | 2 354 349 A  | 3/2001 |
| WO | WO 00/36509  | 6/2000 |

* cited by examiner

Primary Examiner—Jeffrey Gaffin
Assistant Examiner—David Martinez

(57) ABSTRACT

A circuit group control system which receives from a master processor a first command sequence and a second command sequence each of which is composed of a plurality of commands, each command being to be executed by one of a plurality of circuits, and causes any available circuits to execute the commands one by one in order of arrangement in each command sequence. The circuit group control system achieves concurrent execution of a plurality of command sequences by causing a circuit (a second circuit) to execute a command in the second command sequence while another circuit (a first circuit) is executing another command in the first command sequence.

26 Claims, 22 Drawing Sheets

FIG. 3

COMMAND FORMAT (16Byte)

| POSITION | ITEM | COMMANDS FOR SLAVE PROCESSOR | COMMANDS FOR DMA CONTROLLER |
|---|---|---|---|
| 0 | COMMAND TYPE, ATTRIBUTE (FIRST BIT INDICATES TYPE OF EXECUTING HARDWARE UNIT — 1:SLAVE PROCESSOR, 0:DMA CONTROLLER) | COMMAND TYPE, ATTRIBUTE (ATTRIBUTES INCLUDE SPECIFICATION OF FORMAT NO., VIRTUAL BANK NO. TO BE ALLOCATED, VIRTUAL BANK NO. TO BE RELEASED) | COMMAND TYPE, ATTRIBUTE (ATTRIBUTES INCLUDE SPECIFICATION OF TRANSFER DIRECTION, VIRTUAL BANK NO. TO BE ALLOCATED, VIRTUAL BANK NO. TO BE RELEASED) |
| 2 | NEXT COMMAND ID | NEXT COMMAND ID | NEXT COMMAND ID |
| 4 | PARAMETERS OR THE LIKE FOR EACH EXECUTING HARDWARE UNIT TYPE | EXECUTION START ADDRESS | MAIN MEMORY ADDRESS UPPER PART |
| 6 | | PARAMETER1 | MAIN MEMORY ADDRESS LOWER PART |
| 8 | | PARAMETER 2 | LOCAL MEMORY ADDRESS |
| A | | PARAMETER 3 | SIZE OF TRANSFER DATA |
| C | | PARAMETER4 | ADDRESS INCREMENT IN MAIN MEMORY |
| E | | PARAMETER5 | ADDRESS INCREMENT IN LOCAL MEMORY |

FIG. 6

COMPLETION TABLE (128bit) — 171

| BIT POSITION | MEANING OF COMPLETION FLAG |
|---|---|
| 0 | — |
| 1 | VALUE "1" INDICATES COMPLETION OF EXECUTION OF COMMAND IN COMMAND AREA (1) |
| 2 | VALUE "1" INDICATES COMPLETION OF EXECUTION OF COMMAND IN COMMAND AREA (2) |
| .... | .... |
| 127 | VALUE "1" INDICATES COMPLETION OF EXECUTION OF COMMAND IN COMMAND AREA (127) |

FIG. 8

BANK TABLE 163

| PHYSICAL BANK NO. 261 | EXECUTED COMMAND SEQUENCE ID NO. 262 | VIRTUAL BANK NO. 263 |
|---|---|---|
| 0 | ( 1 ) | ( 0 ) |
| 1 | ( 1 ) | ( 1 ) |
| 2 | ( 2 ) | ( 0 ) |
| 3 | ( 2 ) | ( 1 ) |

FIG. 13

BANK TABLE — 563

| PHYSICAL BANK NO. 564 | EXECUTED COMMAND SEQUENCE ID NO. 565 | VIRTUAL BANK NO. 566 |
|---|---|---|
| 0 | ( 0 ) | ( 0 ) |
| 1 | ( 1 ) | ( 1 ) |
| 2 | ( 2 ) | ( 1 ) |
| 3 | ( 3 ) | ( 4 ) |

FIG. 15

| BANK TABLE 663 | | | | |
|---|---|---|---|---|
| PHYSICAL BANK NO. 665 | EXECUTED COMMAND SEQUENCE ID NO. 666 | VIRTUAL BANK NO. 667 | SP STATE 668 | DMA STATE 669 |
| 0 | ( 1 ) | ( 0 ) | ( WAIT ) | ( USED ) |
| 1 | ( 1 ) | ( 1 ) | ( — ) | ( USED ) |
| 2 | ( 3 ) | ( 4 ) | ( — ) | ( — ) |
| 3 | ( 3 ) | ( 4 ) | ( — ) | ( — ) |

FIG. 22

COMMAND FORMAT (16Byte)

| POSI-TION | ITEM | COMMANDS FOR SLAVE PROCESSOR | COMMANDS FOR DMA CONTROLLER | SUSPENSE COMMAND |
|---|---|---|---|---|
| 0 | COMMAND TYPE, ATTRIBUTE (FIRST TWO BITS INDICATE COMMAND TYPE— 10:COMMAND FOR SLAVE PROCESSOR, 00:COMMAND FOR DMA CONTROLLER, 01:SUSPENSE COMMAND) | COMMAND TYPE, ATTRIBUTE (ATTRIBUTES INCLUDE SPECIFICATION OF FORMAT NO, VIRTUAL BANK NO. TO BE ALLOCATED, VIRTUAL BANK NO. TO BE RELEASED) | COMMAND TYPE, ATTRIBUTE (ATTRIBUTES INCLUDE SPECIFICATION OF TRANSFER DIRECTION, VIRTUAL BANK NO. TO BE ALLOCATED, VIRTUAL BANK NO. TO BE RELEASED) | COMMAND TYPE, ATTRIBUTE (ATTRIBUTES INCLUDE SPECIFICATION OF HARDWARE UNIT TO BE SUSPENDED) |
| 2 | NEXT COMMAND ID | NEXT COMMAND ID | NEXT COMMAND ID | NEXT COMMAND ID |
| 4 | | EXECUTION START ADDRESS | MAIN MEMORY ADDRESS UPPER PART | NUMBER OF SUSPENSE CYCLES UPPER PART |
| 6 | PARAMETERS OR THE LIKE FOR EACH EXECUTING HARDWARE UNIT TYPE | PARAMETER1 | MAIN MEMORY ADDRESS LOWER PART | NUMBER OF SUSPENSE CYCLES LOWER PART |
| 8 | | PARAMETER2 | LOCAL MEMORY ADDRESS | PARAMETER1 |
| A | | PARAMETER3 | SIZE OF TRANSFER DATA | PARAMETER2 |
| C | | PARAMETER4 | ADDRESS INCREMENT IN MAIN MEMORY | PARAMETER3 |
| E | | PARAMETER5 | ADDRESS INCREMENT IN LOCAL MEMORY | PARAMETER4 |

CIRCUIT GROUP CONTROL SYSTEM

BACKGROUND OF THE INVENTION (1) Field of the Invention

The present invention relates to a technique for controlling a circuit group that includes a processor circuit or the like, and in particular, relates to a circuit group control system that causes circuits in a circuit group to operate in accordance with a command issued from a processor.

(2) Description of the Related Art

A system is known in which a certain processor (hereinafter referred to as a master processor) gives a commission of executing a command to a circuit operating as another processor (hereinafter referred to as a slave processor), a DMA controller circuit or the like. Hereinafter, such circuits as the slave processor and the DMA controller which are given a commission of executing a command are referred to as slave hardware units.

This system enables the master processor and the slave hardware to operate concurrently, resulting in faster data processing by a program that the master processor decodes and executes.

Meanwhile, there is a case where a certain job is completed only when a plurality of commands respectively corresponding to a plurality of slave hardware units are executed in a certain order.

In executing such a job, it is effective that the master processor gives a commission of executing a plurality of commands in a certain order to a group of slave hardware units collectively as follows: (a) the master processor issues a command sequence that is a plurality of commands arranged in a certain order to be executed respectively by corresponding slave hardware units, to a control unit for controlling the group of slave hardware units,; and (b) the control unit, upon receiving the issued command sequence, decodes the plurality of commands one by one in the order, identifies the slave hardware units that correspond to the decoded commands, and causes the slave hardware units to operate in accordance with the decoded commands. This method is effective in that it reduces the processing overhead of the master processor in sending or receiving commands, and increases the speed of the data processing.

A command sequence is composed of, for example, a command A instructing the DMA controller to transfer a set of data of approximately several hundred kilo bytes from a main memory to a local memory, a command B instructing the slave processor to perform a calculation based on the set of data stored in the local memory and store a set of data as the calculation results into the local memory, and a command C instructing the DMA controller to transfer the set of data as the calculation results from the local memory to the main memory, where these commands are arranged in this order to be executed in the same order.

Upon receiving the command sequence as an example from the master processor, the control unit controlling the group of slave hardware units first causes the DMA controller to execute a process A that corresponds to the command A, then after completion of the process A, causes the slave processor to execute a process B that corresponds to the command B, then after completion of the process B, causes the DMA controller to execute a process C that corresponds to the command C.

Here, there are cases where the master processor needs to cause a slave hardware unit group to execute a plurality of command sequences as necessary when, for example, the data processing of the target job can be treated as a plurality of tasks.

In such cases, the master processor issues to the control unit two or more command sequences that instruct a plurality of slave hardware units to operate in conjunction with each other. Generally, a normal control unit for controlling a group of slave hardware units executes the command sequences one by one by causing slave hardware units to execute corresponding commands constituting each command sequence one by one, in the order of arrangement.

However, in this method, the slave hardware units are not effectively used. This is because according to the method, commands constituting a command sequences are executed one by one by corresponding slave hardware units, and this process is repeated for each command sequence, and therefore only one slave hardware unit among those in a group is operable at a time.

SUMMARY OF THE INVENTION

An object of the present invention is therefore to provide a circuit group control system including a control unit that exercises a control so as to increase the rate of operation of slave hardware units in processing a plurality of command sequences received from a master processor.

Another object of the present invention is to provide various techniques that are useful in constructing the above circuit group control system.

The above object is fulfilled by a circuit group control system for controlling a plurality of circuits in accordance with an instruction by a master processor, comprising: a command sequence specification receiving unit operable to receive, from the master processor, specification of a command sequence composed of a plurality of commands, each command being to be executed by one of the plurality of circuits; and an execution control unit operable to cause any available circuits among the plurality of circuits to start executing corresponding commands among the plurality of commands one by one in order of arrangement in the command sequence, wherein the execution control unit includes a concurrent execution control unit operable to, while a circuit is executing a command, detect another command that can be executed by another circuit and cause the other circuit to execute the other command concurrently.

With the above-stated construction, the meaning of each command sequence that the commands constituting each command sequence are executed one by one in order of arrangement in each command sequence is secured, and different slave hardware units execute a plurality of commands concurrently. This increases the rate of operation of each slave hardware unit.

In the above circuit group control system, the plurality of circuits may include two circuits that are different in function, the command sequence specification receiving unit receives specification of a plurality of command sequences from the master processor, the execution control unit causes any available circuits among the plurality of circuits to execute corresponding commands in a manner in which commands constituting each command sequence are to be executed one by one in order of arrangement in each command sequence, wherein the concurrent execution control unit, while one of the two circuits is executing a command in a command sequence, detects another command in another command sequence that can be executed by another one of the two circuits and causes the other circuit to execute the other command.

With the above-stated construction, when each circuit, namely each slave hardware unit is caused to execute a command belonging to any of a plurality of command sequences, different slave hardware units execute a plurality of commands belonging to different command sequences concurrently. This increases the rate of operation of each slave hardware unit.

In the above circuit group control system, the plurality of circuits may include a slave processor and a DMA controller, and the execution control unit, while the slave processor is executing a command in a command sequence, causes the DMA controller to execute another command in another command sequence.

With the above-stated construction, it is possible to execute, at high speeds, a plurality of programs for data processing that performs calculations or the like on a large amount of data, without providing a plurality of circuits having the same function. That is to say, when the data processing is specified by a command sequence composed of commands to be executed by the DMA controller for transferring a large amount of data to a local memory so that the slave processor can access to the data, and commands for the slave processor for causing the slave processor to perform the calculations or the like on the data in the local memory, while either the slave processor or the DMA controller is executing a command in a command sequence, the other slave hardware unit of the two can execute another command in another command sequence. This increases the processing speed as a whole.

In the above circuit group control system, each of the plurality of circuits can access a same memory, each command sequence includes a memory access command instructing a circuit to access the memory, the execution control unit includes a memory access control unit operable to control two or more circuits that are to execute memory access commands of different command sequences concurrently, to access different areas in the memory, respectively.

With the above-stated construction, interference between command sequences in reading or writing data is prevented, and data is protected.

In the above circuit group control system, each memory access command may include a logical address of a location to be accessed, the memory access control unit, when two or more circuits are to execute memory access commands of different command sequences concurrently, converts each logical address contained in the memory access commands to a physical address, each physical address being assigned to a different command sequence, so that the two or more circuits use physical addresses converted from logical addresses to identify areas in the memory to access, respectively.

With the above-stated construction, the master processor can specify a command for each command sequence based on the premise that different memory areas are respectively assigned to the command sequences. That is to say, the master processor can specify, in terms of a command sequence, an address of an access target in a command that is required to access a memory, without considering other command sequences.

In the above circuit group control system, the memory access control unit may hold an area ID information table that includes area ID information, each piece of which correlates a logical address with a physical address converted from the logical address and with a memory area, the memory access control unit, when converting a logical address to a physical address, refers to the area ID information table so as not to select in the conversion a physical address that is contained in a piece of area ID information in the table, each command sequence includes a command instructing release of a memory area that has been specified by a preceding command in a same command sequence as an access target, specifying a logical address corresponding to the memory area to be released, and the memory access control unit deletes a piece of area ID information corresponding to the specified logical address from the area ID information table before causing a circuit to execute the command instructing release of the memory area.

With the above-stated construction, it is possible to correlate a physical address specified to be released with a logical address which is different from the one with which the physical address has been correlated. This enables the memory areas to be used effectively.

In the above circuit group control system, each of the plurality of circuits can access a same memory, each command sequence includes a memory access command instructing a circuit to access the memory, each memory access command contains either a share attribute or a separate attribute, the share attribute specifying an access to a shared memory area that can be accessed by a plurality of command sequences, and the separate attribute specifying an access to one of memory areas which are respectively assigned to the plurality of command sequences, the execution control unit includes a memory access control unit operable to control two or more circuits that are to execute memory access commands containing the separate attribute of different command sequences concurrently, to respectively access separate areas in the memory, and to control two or more circuits that are to execute memory access commands containing the share attribute of different command sequences concurrently, to access the shared memory area in the memory.

With the above-stated construction, it is possible for different command sequences to access pieces of data that are respectively assigned to the command sequences, and to access shared data.

In the above circuit group control system, the command sequence specification receiving unit may include a command storage memory, and recognizes the specification of the plurality of command sequences when the master processor writes the plurality of commands for each command sequence into the command storage memory, and the execution control unit causes any available circuits among the plurality of circuits to execute corresponding commands among the plurality of commands stored in the command storage memory, one by one in order of arrangement in each command sequence.

With the above-stated construction, the master processor can write a plurality of commands into the command storage memory, namely the communication memory. This basically eliminates the necessity of synchronized control. Accordingly, this facilitates the control of conveying commands, compared with a method of conveying commands one by one.

In the above circuit group control system, each command stored in the command storage memory may have a pointer indicating a location in the command storage memory of a next command that is to be executed next to the command in a same command sequence, and the execution control unit causes any available circuits among the plurality of circuits to execute the plurality of commands one by one in order of arrangement, by referring to the pointer in each command to recognize the location in the command storage memory of the next command.

With the above-stated construction, for example, when a command sequence that have been executed consists of commands A, B, and C, and when the next command sequence to be executed consists of commands A, B, and D, the master processor only sets the command D and changes the pointer in the command B pointing to the command C to point to the command D. This facilitates the master processor since it can recycle command sequences. Also, if the command storage memory does not have enough consecutive, not-allocated areas for all commands in a command sequence, it is possible to store the commands at separate areas. This enables the memory areas in the command storage memory to be used efficiently.

In the above circuit group control system, the plurality of commands are respectively stored in areas of the command storage memory at sequential addresses therein in order of arrangement in the command sequence to which the plurality of commands belong, and the execution control unit causes any available circuits among the plurality of circuits to execute the plurality of commands one by one in order of arrangement, by referring to the areas of the command storage memory in order of the sequential addresses.

With the above-stated construction, it is possible to refer to each command constituting a command sequence without referring to pointer information or the like. This simplifies the processing construction for referring to commands.

The above circuit group control system may further comprise the plurality of circuits, wherein each command contains a parameter, the command storage memory is connected to one or more circuits among the plurality of circuits, and when one of the one or more circuits is instructed by the execution control unit to execute a command, the instructed circuit accesses a parameter in the command stored in the command storage memory.

With the above-stated construction, the slave processor can update the parameters or the like in commands as necessary by accessing the command storage memory. It is possible, for example, to change part of contents of a command in advance, then, later, when execution of the command is specified by the master processor, perform a process conforming to the changed contents.

In the above circuit group control system, the specification of a command sequence may be made by a command sequence identifier that identifies the command sequence composed of the plurality of commands stored in the command storage memory, and the execution control unit causes any available circuits among the plurality of circuits to execute the plurality of commands in the command sequence identified by the command sequence identifier, one by one in order of arrangement in the command sequence.

With the above-stated construction, storing of commands constituting a command sequence into the command storage memory is separated from specifying the command sequence. As a result, even after commands in a command sequence have already been stored in the memory, it is possible to specify the command sequence a plurality of times. This reduces the amount of transferred commands.

In the above circuit group control system, the circuit group control system may comprise the master processor, and the master processor specifies a plurality of same command sequence identifiers.

With the above-stated construction, after the master processor stores commands in a command sequence into the command storage memory, the master processor can recycle the command sequence a plurality of times only by specifying the command sequence identifier. This takes much of the load off the master processor in transferring the substantial part of the command sequence.

In the above circuit group control system, the command sequence identifier may be a pointer indicating a location of a command in the command storage memory, and the execution control unit recognizes the command at the location indicated by the pointer as a first command in a command sequence, and causes any available circuits among the plurality of circuits to execute the plurality of commands one by one in order of arrangement, starting with the command at the location indicated by the pointer.

With the above-stated construction, upon receiving specification of a command sequence, the circuit group control system can easily access the command since the command sequence identifier itself used for the specification is a pointer pointing to a command. As a result, the system does not require a mechanism for performing calculations or the like to obtain, from the command sequence identifier, information required to access the command.

In the above circuit group control system, the command sequence specification receiving unit may include a first FIFO buffer for storing command sequence identifiers, the master processor, after writing a plurality of commands into the command storage memory, writes command sequence identifiers into the first FIFO buffer, the command sequence identifiers identifying command sequences composed of commands among the plurality of commands, the command sequence specification receiving unit thereby recognizing specification of the command sequences, and the execution control unit causes any available circuits among the plurality of circuits to execute commands in each of the command sequences identified by the command sequence identifiers in the first FIFO buffer.

With the above-stated construction, the master processor can store a plurality of command sequence identifiers in the FIFO buffer, enabling it to request a plurality of command sequences all at once. This reduces wait time in, for example, the synchronized control.

In the above circuit group control system, the command sequence specification receiving unit further includes a second FIFO buffer for storing command sequence identifiers, the master processor, after writing a plurality of commands into the command storage memory, writes command sequence identifiers into the second FIFO buffer, the command sequence identifiers identifying command sequences composed of commands among the plurality of commands, the command sequence specification receiving unit thereby also recognizing specification of the command sequences, and the execution control unit causes any available circuits among the plurality of circuits to execute commands in each of the command sequences identified by the command sequence identifiers in the second FIFO buffer, taking precedence over commands in each of the command sequences identified by the command sequence identifiers in the first FIFO buffer.

With the above-stated construction, it is possible to deals with a case where it is necessary to execute certain commands first when, for example, debugging the circuit group control system.

The above circuit group control system may further comprise a command updating unit operable to update the commands stored in the command storage memory.

With the above-stated construction, commands can be updated as necessary. As a result, it is possible, for example, to change part of contents of a command in advance, then, later, when execution of the command is specified by the master processor, perform a process conforming to the changed contents.

The above circuit group control system may further comprise: a completion notification request receiving unit operable to receive from the master processor a request to send a notification of completion of execution of a command; and a completion notifying unit operable to, if having received from a circuit a notification of completion of execution of the command of which the master processor had requested to send a notification of completion of execution, send the notification to the master processor.

With the above-stated construction, the master processor can detect completion of execution of certain commands. This enables the circuit group control system to achieve data processing by executing a plurality of command sequences in synchronization with each other, for example.

In the above circuit group control system, the concurrent execution control unit may, while a circuit is executing a command in a command sequence, detect another command in the command sequence that can be executed by another circuit and causes the other circuit to execute the other command concurrently.

With the above-stated construction, the meaning of each command sequence that the commands constituting each command sequence are executed one by one in order of arrangement in each command sequence is secured, and different slave hardware units execute a plurality of commands in a same command sequence concurrently. This increases the rate of operation of each slave hardware unit, and reduces the time required for executing the command sequence.

The above circuit group control system may further comprise the plurality of circuits, wherein each of the plurality of circuits can access a same memory, each command sequence includes a memory specification attached command that contains (i) an attribute specifying either allocation or release of a memory area and (ii) a bank number that identifies the specified memory area, the execution control unit holds memory management information for managing whether each memory area is used or not used, even if a command to be executed next in a command sequence is a memory specification attached command containing an attribute specifying allocation of a memory area identified by a bank number contained therein, the execution control unit does not cause a circuit to execute the command to be executed next in so far as the memory management information indicates that the memory area specified by the memory specification attached command to be executed next is used, when causing a circuit to execute a memory specification attached command containing an attribute specifying allocation of a memory area, the execution control unit updates the memory management information to indicate that a memory area specified by the memory specification attached command is used, and when causing a circuit to execute a memory specification attached command containing an attribute specifying release of a memory area, the execution control unit updates the memory management information to indicate that a memory area specified by the memory specification attached command is not used.

With the above-stated construction, the memory resources are managed so that only such commands as require allocation of memory resources are started to be executed. Accordingly, a designer of command sequences or the like can adjust the timing with which each command constituting a same command sequence is executed, by specifying allocation or release of memory resources using attributes of commands.

In the above circuit group control system, the plurality of circuits include some circuits having a function to, while executing a predetermined command, send the execution control unit a notification of release of a memory area together with a bank number identifying the released memory area, and the execution control unit, after receiving a notification of release of a memory area from any circuit, updates the memory management information to indicate that the memory area identified by a bank number attached to the notification is not used.

With the above-stated construction, the slave processor or the like can specify release of a memory resource while executing a command. Accordingly, it is possible to adjust the execution timing minutely at various stages during a command execution, considering the execution timing of another command.

The above circuit group control system may further comprise the plurality of circuits, wherein each of the plurality of circuits can access a same memory, the plurality of circuits include some circuits having a function to, while executing a predetermined command, send the execution control unit a notification of release of a memory area together with a bank number identifying the released memory area, the plurality of circuits include some circuits having a function to, while executing a predetermined command, send the execution control unit a request to allocate a memory area together with a bank number identifying the requested memory area, and then suspend the execution of the predetermined command until the some circuits receive a notification of allocation of the requested memory area from the execution control unit, the execution control unit holds memory management information for managing whether each memory area is used or not used, the execution control unit, after receiving a notification of release of a memory area from any circuit, updates the memory management information to indicate that the memory area identified by a bank number attached to the notification is not used, the execution control unit, after receiving a request to allocate a memory area from any circuit, sends a notification of allocation of the requested memory area immediately after the memory management information indicates that the requested memory area is not used, and updates the memory management information to indicate that the requested memory area is used.

With the above-stated construction, the slave processor or the like can specify wait for release of a memory resource currently used by another command, while executing a command. Accordingly, it is possible for the slave processor or the like to start executing a command and proceed with the execution to some extent even if a memory resource that is required at a certain stage of the command execution has not been allocated. This increases the speed of command executions.

In the above circuit group control system, the command sequence, specification of which is received by the command sequence specification receiving unit, contains a component that is arranged in a same way as a command in the command sequence, the component being suspension specification data that instructs a specific circuit to suspend specifying a suspension period, and the execution control unit suspends the specific circuit for the specified suspension period when treating the component in turn thereof while causing any available circuits to execute commands and the component of the command sequence one by one in order of arrangement in the command sequence.

With the above-stated construction, it is possible to suspend a slave hardware unit for a desired period. Accordingly, it is possible to reduce power consumption of the slave hardware units, while maintaining required level of performance depending on, for example, the contents of command sequences.

The object is also achieved by a circuit group control system for controlling a plurality of circuits in accordance with an instruction by a master processor, comprising: a command sequence specification receiving unit operable to receive from the master processor specification of a plurality of command sequences each of which is composed of a plurality of commands, each command being to be executed by one of the plurality of circuits; and an execution control unit operable to cause any available circuits among the plurality of circuits to execute the plurality of commands in each command sequence one by one in order of arrangement, wherein the command sequence specification receiving unit includes a command storage memory, and recognizes the specification of the plurality of command sequences when the master processor writes the plurality of commands for each command sequence into the command storage memory, and the execution control unit causes any available circuits among the plurality of circuits to execute the plurality of commands for each command sequence stored in the command storage memory, one by one in order of arrangement in each command sequence.

With the above-stated construction, the master processor can convey a plurality of command sequences each of which is composed of a plurality of commands to the circuit group control system all at once. This basically eliminates the necessity of synchronized control. Accordingly, this facilitates the control of conveying commands, compared with a method of conveying commands one by one.

The above objects is also achieved by a circuit group control system for controlling a plurality of circuits in accordance with an instruction by a master processor, comprising: a command sequence specification receiving unit operable to receive specification of a plurality of command sequences from the master processor, each command sequence being composed of a plurality of commands, each command being to be executed by one of the plurality of circuits; an execution control unit operable to cause any available circuits among the plurality of circuits to execute the plurality of commands for each command sequence one by one in order of arrangement in each command sequence; a completion notification request receiving unit operable to receive from the master processor a request to send a notification of completion of execution of a command; and a completion notifying unit operable to, if having received from a circuit a notification of completion of execution of the command of which the master processor had requested to send a notification of completion of execution, send the notification to the master processor.

With the above-stated construction, the master processor can detect completion of execution of certain commands. This enables the circuit group control system to achieve data processing by executing a plurality of command sequences in synchronization with each other, for example.

The above objects is also achieved by a circuit group control method for controlling a plurality of circuits in accordance with an instruction by a master processor, comprising: a command sequence specification receiving step for receiving, from the master processor, specification of a command sequence composed of a plurality of commands, each command being to be executed by one of the plurality of circuits; and an execution control step for causing any available circuits among the plurality of circuits to start executing corresponding commands among the plurality of commands one by one in order of arrangement in the command sequence, wherein the execution control step includes a concurrent execution control step for, while a circuit is executing a command, detecting another command that can be executed by another circuit and causing the other circuit to execute the other command concurrently.

With the above-stated construction, the meaning of each command sequence that the commands constituting each command sequence are executed one by one in order of arrangement in each command sequence is secured, and different slave hardware units execute a plurality of commands in a same command sequence concurrently. This increases the rate of operation of each slave hardware unit.

In the above circuit group control method, the plurality of circuits includes two circuits that are different in function, the command sequence specification receiving step receives specification of a plurality of command sequences from the master processor, the execution control step causes any available circuits among the plurality of circuits to execute corresponding commands in a manner in which commands constituting each command sequence are to be executed one by one in order of arrangement in each command sequence, wherein the concurrent execution control step, while one of the two circuits is executing a command in a command sequence, detects another command in another command sequence that can be executed by another one of the two circuits and causes the other circuit to execute the other command.

With the above-stated construction, when each circuit, namely each slave hardware unit is caused to execute a command belonging to any of a plurality of command sequences, different slave hardware units execute a plurality of commands belonging to different command sequences concurrently. This increases the rate of operation of each slave hardware unit.

In the above circuit group control method, the concurrent execution control step may, while a circuit is executing a command in a command sequence, detect another command in the command sequence that can be executed by another circuit and causes the other circuit to execute the other command concurrently.

With the above-stated construction, the meaning of each command sequence that the commands constituting each command sequence are executed one by one in order of arrangement in each command sequence is secured, and different slave hardware units execute a plurality of commands in a same command sequence concurrently. This increases the rate of operation of each slave hardware unit, and reduces the time required for executing the command sequence.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 3 shows the format of a command that is an element of a command sequence and is stored in the communication memory 151;

FIG. 6 shows the data structure of the completion table 171;

FIG. 8 shows the data structure and examples of contents of the bank table 163;

FIG. 13 shows the data structure and examples of contents of the bank table provided in the modified processing system in Embodiment 2;

FIG. 15 shows the data structure and examples of contents of the bank table 663;

FIG. 22 shows the format of the suspense command and commands for slave hardware units, the commands being elements of command sequences and are stored in the communication memory 151.

DESCRIPTION OF THE PREFERRED EMBODIMENT

The following describes a processing system as an embodiment of a circuit group control system of the present invention, with reference to the attached drawings.

Embodiment 1

1-1. Construction

Figure 1:
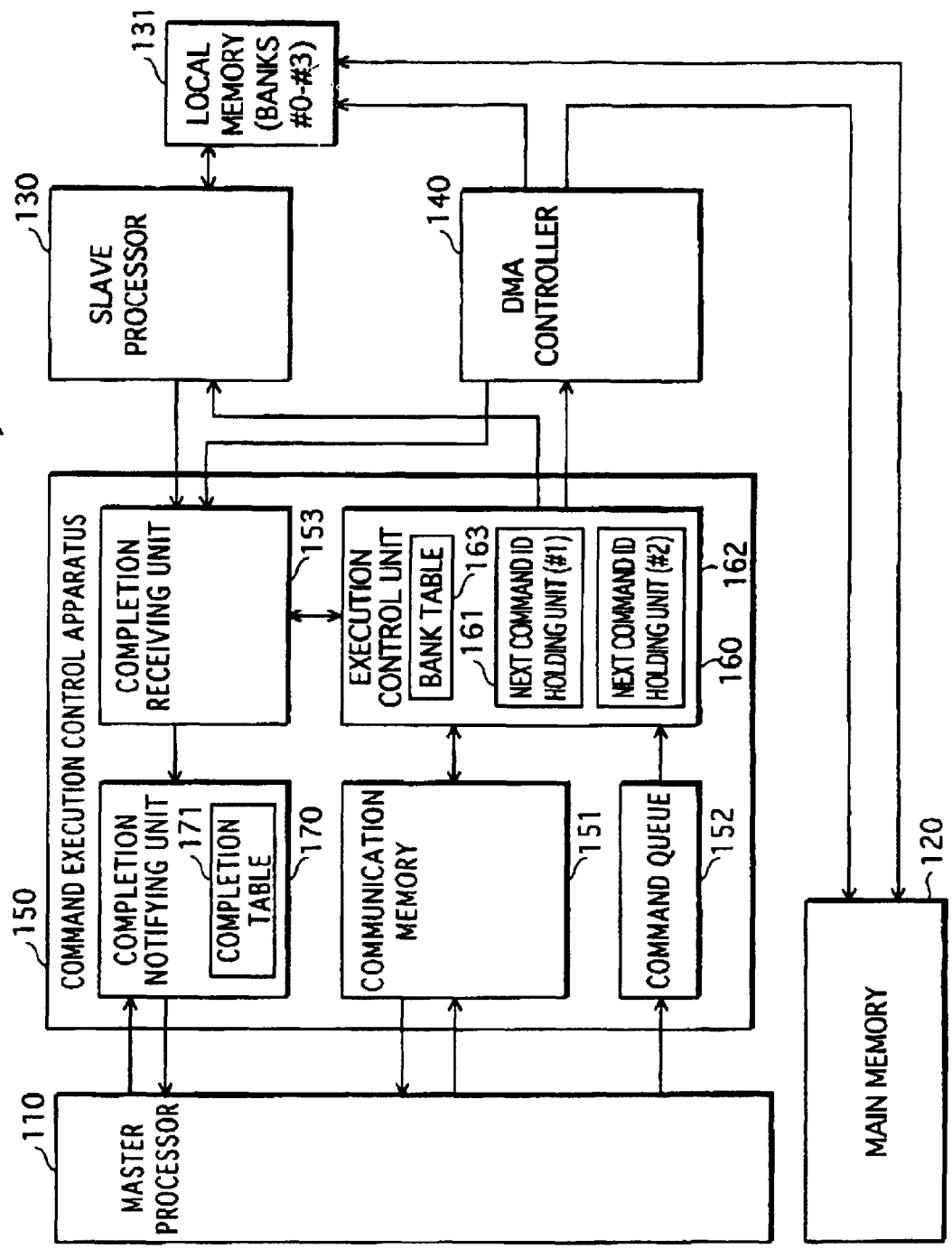
FIG. 1 shows the construction of a processing system 100 in Embodiment 1 of the present invention.

FIG. 1 shows the construction of a processing system 100 in Embodiment 1 of the present invention.

In the processing system 100, the master processor performs data processing by giving a commission of executing partial processes to slave processors such as a slave processor and a DMA controller. As shown in FIG. 1, the processing system 100 includes a master processor 110, a main memory 120, a slave processor 130, a local memory 131, a DMA controller 140, and a command execution control apparatus 150, and is formed in one semiconductor chip.

The master processor 110 is a processor for executing data processing as specified by a program such as an application program. The data processing is divided into partial processes of a certain unit which are realized by command sequences each of which is composed of commands for the slave processor and commands for the DMA controller, the commands being arranged in a certain order.

As a program is executed, the master processor 110 issues a command sequence to the command execution control apparatus 150 to cause a slave hardware unit to execute a partial process, requests the command execution control apparatus 150 to send, as necessary, a notification of completion of execution of a process corresponding to a command, and receives the notification. It should be noted here that in this document, execution of a process corresponding to a command may be referred to as execution of the command.

The slave processor 130, when a command is sent from the command execution control apparatus 150 as a control program dedicated to the slave processor is executed, executes the command using the local memory 131 as necessary, and notifies the command execution control apparatus 150 of completion of the command execution. It is supposed here that the local memory 131 has four 16 KB-memory banks. Note that although not illustrated, the slave processor 130 has an instruction memory storing instructions that are to be executed directly in execution of a command, that is to say, stores contents of various dedicated control programs.

The DMA controller 140, upon receiving a command from the command execution control apparatus 150, controls a data transfer between the main memory 120, which is a large-capacity on-chip memory, and the local memory 131, and notifies the command execution control apparatus 150 of completion of the data transfer.

The command execution control apparatus 150 serves as an interface between the master processor 110 and slave hardware units. The command execution control apparatus 150 selects an appropriate command from a plurality of command sequences issued to the master processor in order to effectively use the slave hardware units, instructs a slave hardware unit to start executing the command, receives a notification of completion of the command execution from the slave hardware unit, and notifies the master processor of the completion of the command execution if the notification is requested by the master processor in terms of the command. As shown in FIG. 1, the command execution control apparatus 150 includes a communication memory 151, a command queue 152, a completion receiving unit 153, an execution control unit 160, and a completion notifying unit 170. Note that the command execution control apparatus 150 may be achieved by a CPU or a memory.

The communication memory 151 is connected to the master processor 110, and is a 2 KB-memory in which a plurality of commands are stored by the master processor 110. Note that the contents of the communication memory 151 and the data structure of the commands will be described later in detail.

The command queue 152 is FIFO (First-In-First-Out) buffer for storing identification information of the first command in a command sequence, the identification information being used when the master processor 110 issues the command sequence. The command execution control apparatus 150 refers to the command queue 152 to identify a command that the apparatus causes a slave hardware unit to execute.

The completion notifying unit 170 includes a completion table 171 that shows whether executions of commands have been completed. More specifically, when being requested by the master processor 110 to notify of completion of a command execution, the completion notifying unit 170 stores information identifying the requested command in the completion table 171, and after the execution of the requested command is completed, the completion notifying unit 170 notifies the master processor 110 of it. The completion notifying unit 170 can notify the master processor 110 of completion of execution of up to two commands. The completion table 171 will be described later in detail.

The completion receiving unit 153, upon receiving a signal indicating a command execution completion from each slave hardware unit, conveys the execution completion to the execution control unit 160, and updates the information in the completion table 171 in terms of the executed command.

The execution control unit 160 includes a next command ID holding unit 161, a next command ID holding unit 162, and a bank table 163, and refers to the command queue 152 and the communication memory 151 to exercise a control so as to cause the slave hardware units to execute commands in command sequences in the order of arrangement, enabling concurrent executions of commands.

More specifically, the execution control unit 160 judges whether a slave hardware unit can execute a command in a command sequence while another slave hardware unit executes a command in another command sequence, and if it judges positively, causes the slave hardware unit to execute the command in the command sequence concurrently with the other command that is executed by the other slave hardware unit. The execution control unit 160 judges that a slave hardware unit can execute a command when it recognizes, for example, that the slave hardware unit has completed a command execution and is currently not operating, which the execution control unit 160 can recognize by notification of it sent from the completion receiving unit 153.

Among the commands to be executed is a command that requires use of the local memory 131. As a result, the execution control unit 160 exercises a control so that different memory areas in the local memory 131 are respectively used by different slave hardware units so that a plurality of command sequences can be executed concurrently.

The next command ID holding units 161 and 162 store information identifying a command to be executed next after a currently executed command in the same command sequence. The identification information (command IDs which will be described later) is stored by the execution control unit 160.

It should be noted here that as indicated by "#1" and "#2" in FIG. 1, the next command ID holding unit 161 can be identified by an identification number "1", and the next command ID holding unit 162 by an identification number "2".

The bank table 163 manages the correspondences between virtual bank numbers and physical bank numbers, where the virtual bank numbers are used in commands instructing an access to the local memory 131, and the physical bank numbers identify the four memory banks that physically exist in the local memory 131. Hereinafter, a memory bank to which a physical bank number "0" is assigned is referred to as a bank #0, for example, and similarly, a memory bank to which a physical bank number "N" is assigned is referred to as a bank #N.

1-2. Command Sequence Specification Interface

Now, the contents of the communication memory 151 and the command queue 152 that are used when the master processor 110 issues a command sequence to the command execution control apparatus 150 will be described with reference to FIGS. 2–5, as well as the commands and command sequences.

Figure 2:
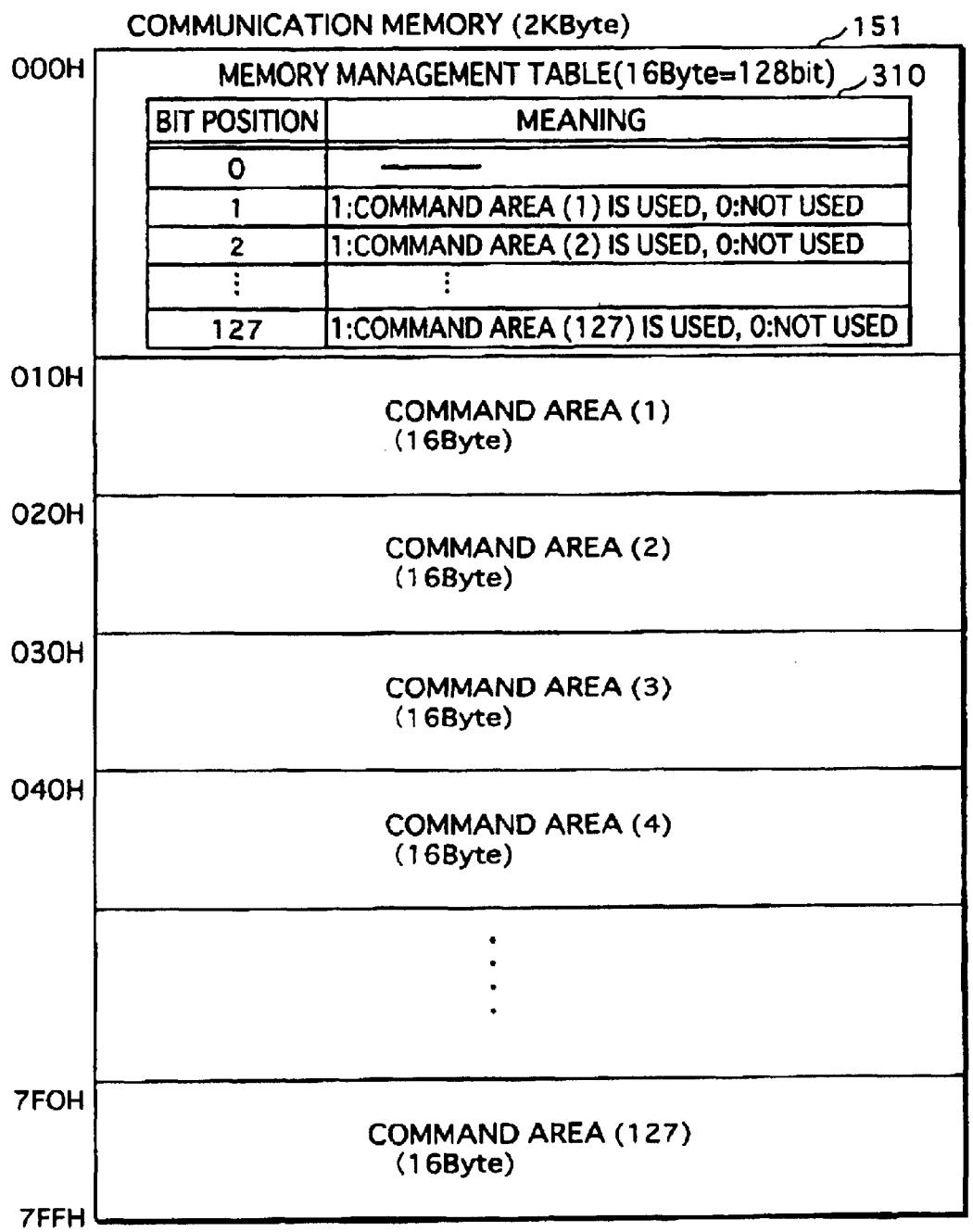
FIG. 2 shows the data structure of the communication memory 151.

FIG. 2 shows the data structure of the communication memory 151.

As shown in FIG. 2, the first 16 bytes of the communication memory 151 is used as a memory management table 310, and the rest is divided into command areas, each of which has 16 bytes and stores one command. The communication memory with a capacity of 2 kilo bytes can store up to 127 commands in the same number of command areas, respectively. Note that the $N^{th}$ command area is represented as command area (N).

Hereinafter, 1-byte data containing a 7-bit value that indicates the command area number is referred to a command ID. Accordingly, a command ID indicates a location of a command in the communication memory 151.

The memory management table 310 has 128 bits (=16 bytes) Of the 128 bits, the bit N indicates the use state of the command area (N), except for the bit 0. If the bit N is "1", it indicates that the command area (N) is being used and a command is stored therein; and if the bit N is "0", it indicates that the command area (N) is not being used and a command can be stored therein newly.

Here, the first bit of the memory management table 310 is the bit 0. For example, if the next bit (=bit 1), is "1", it indicates that the command area (1) is being used, and if the next bit (=bit 2), is "0", it indicates that the command area (2) is not used. Note that all bit values of the memory management table 310 are "0" before the master processor 110 starts storing a command into the communication memory.

FIG. 3 shows the format of a command that is an element of a command sequence and is stored in the communication memory 151.

In FIG. 3, a command 200 is divided into 2-byte elements that are shown in rows, and each element contains information shown in two columns: a position column 201 and an item column 202. The position column 201 has hexadecimal numerals that indicate the positions of the 2-byte elements in the command 200 by the byte numbers (byte 0 to byte E). The item column 202 shows meaning of the contents of each 2-byte element.

One command has 16 bytes. Of the 16 bytes, the first two bytes starting with byte 0 indicate a command type and attribute, the next two bytes starting with byte 2 include a next command ID, and each of the following elements indicates a parameter for each slave hardware unit.

In the first two bytes of the command 200, the first bit indicates a type of a slave hardware unit that is to execute the command. More specifically, if the first bit is "1", it indicates that the command is for the slave processor; and if the first bit is "0", it indicates that the command is for the DMA controller. The second bit is not used. The third bit and onwards indicate attributes that have different meanings for each slave hardware unit. That is to say, for commands for the slave processor, the bits indicate attributes such as a format number for identifying an instruction to be executed, a virtual bank number of a virtual bank in the local memory 131 which should be allocated for the command execution, and a virtual bank number of a virtual bank in the local memory 131 which should be released; and for commands for the DMA controller, the bits indicate attributes such as a data transfer direction (for example, from the main memory 120 to the local memory 131, or from the local memory 131 to the main memory 120), a virtual bank number of a virtual bank in the local memory 131 which is used for the command execution, namely the data transfer, and a virtual bank number of a virtual bank in the local memory 131 which should be released.

The next command ID contained in the second 2-byte data of the command 200 indicates a location in the communication memory 151 of the next command of the command 200 in the same command sequence.

The parameters for the slave processor includes a 2-byte execution start address in an instruction memory of the slave processor 130, and various parameters necessary for the execution of the command.

The parameters for the DMA controller includes: (a) upper two bytes and lower two bytes of an address in the main memory 120, (b) an address in the local memory 131, (c) a size of the data to be transferred, (d) an address increment in the main memory 120, and (e) an address increment in the local memory 131.

Figure 4:
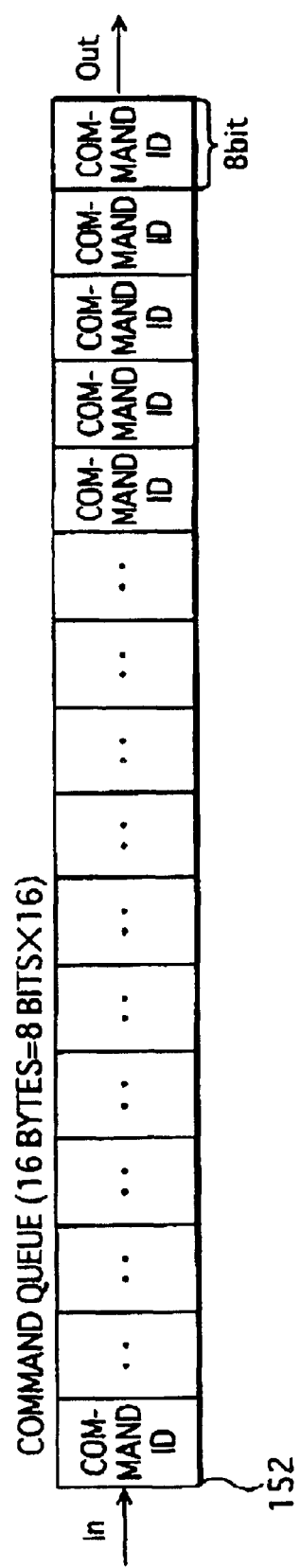
FIG. 4 shows the data structure of the command queue 152.

FIG. 4 shows the data structure of the command queue 152.

As shown in FIG. 4, the command queue 152 can store up to 16 command IDs.

The master processor 110 stores command IDs that respectively indicates locations of the first commands of the command sequences, into the command queue 152 one by one. Then, the execution control unit 160 extracts the command IDs from the command queue 152 one by one in the order in which they were stored, and performs the corresponding processes.

Figure 5:
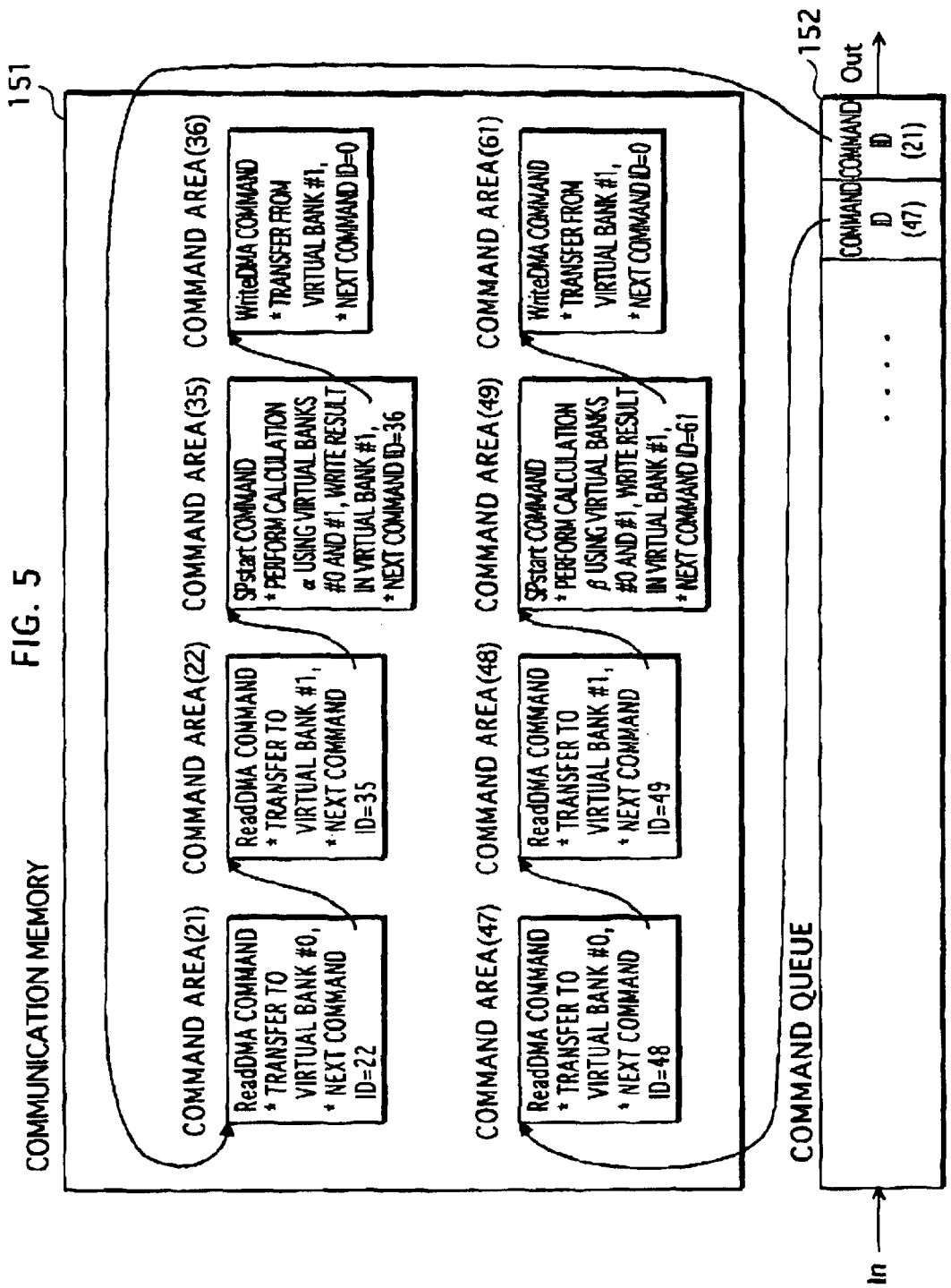
FIG. 5 shows examples of the commands stored in the communication memory 151 by the master processor 110 and the command IDs stored in the command queue 152.

FIG. 5 shows examples of the commands stored in the communication memory 151 by the master processor 110 and the command IDs stored in the command queue 152.

In this example, two command sequences are shown: a first command sequence composed of commands stored in the command areas (21), (22), (35), and (36) that are linked in the stated order by the next command IDs starting with the command ID that is to be output first from the command queue 152; and a second command sequence composed of commands stored in the command areas (47), (48), (49), and (61) that are linked by the next command IDs starting with the command ID that is to be output next from the command queue 152.

The first command sequence is executed to perform a calculation α between data groups, and is composed of (1) the ReadDMA command for the DMA controller instructing to transfer data from the main memory 120 to an area in the local memory 131 identified by virtual bank number 0, (2) the ReadDMA command for the DMA controller instructing to transfer data from the main memory 120 to an area in the local memory 131 identified by virtual bank number 1, (3) the SPstart command for the slave processor instructing to perform the calculation α using areas in the local memory 131 identified by virtual bank numbers 0 and 1 and update the area identified by virtual bank number 1 based on the calculation results, and (4) the WriteDMA command for the DMA controller instructing to transfer data from the area in the local memory 131 identified by virtual bank number 1 to the main memory 120, the commands being linked in the stated order.

The second command sequence is executed to perform a calculation β between data groups, and is composed of (1) the ReadDMA command for the DMA controller instructing to transfer data from the main memory 120 to the area in the local memory 131 identified by virtual bank number 0, (2) the ReadDMA command for the DMA controller instructing to transfer data from the main memory 120 to the area in the local memory 131 identified by virtual bank number 1, (3) the SPstart command for the slave processor instructing to perform the calculation β using the areas in the local memory 131 identified by virtual bank numbers 0 and 1 and update the area identified by virtual bank number 1 based on the calculation results, and (4) the WriteDMA command for the DMA controller instructing to transfer data from the area in the local memory 131 identified by virtual bank number 1 to the main memory 120, the commands being linked in the stated order.

As understood from the above description, the master processor 110 first stores all command constituting a command sequence into the communication memory 151, then inputs a command ID indicating the first command of the command sequence into the command queue 152. In this way, the master processor 110 can instruct the command execution control apparatus 150 to execute the command sequence.

1-3. Command Execution Completion Notification Interface

Now, how the command execution control apparatus 150 notifies the master processor 110 of completion of a command will be described with reference to FIGS. 6 and 7, where the command is executed by a slave hardware unit at the request of the apparatus 150 in accordance with issuance of a command sequence by the master processor 110. In this description, the contents of the completion table 171 and signals transferred between the completion notifying unit 170 and the master processor 110 will be shown.

FIG. 6 shows the data structure of the completion table 171.

The completion table 171 has 128 bits. Of the 128 bits, the bit N indicates whether execution of a command in the command area (N) has been completed or not, except for the bit 0. If the bit N is "1", it indicates that the command execution has been completed. That is to say, the completion table 171 is a set of completion flags which each indicate whether execution of a command has been completed, where if a flag is "1", it indicates that a corresponding command has been executed.

Here, the initial value of each bit is "0". If execution of a command is completed, the completion receiving unit 153 sets a bit corresponding to the command to "1".

Figure 7:
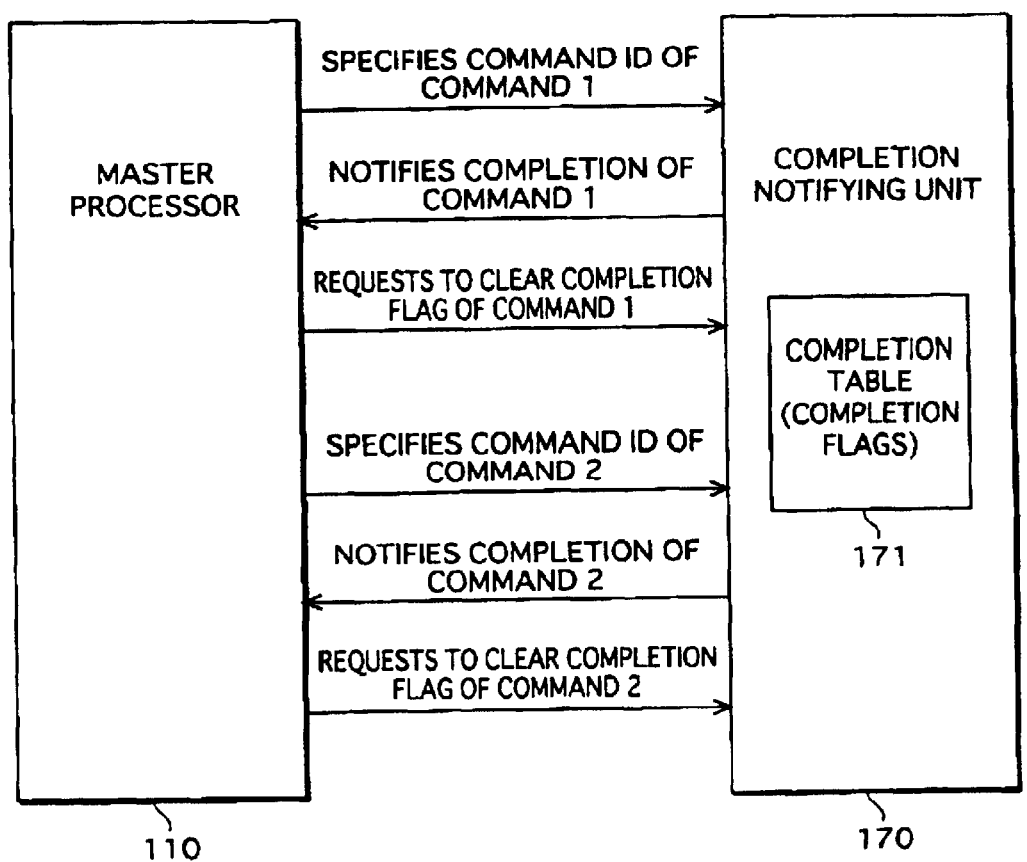
FIG. 7 shows signals transferred between the completion notifying unit 170 and the master processor 110.

FIG. 7 shows signals transferred between the completion notifying unit 170 and the master processor 110.

The master processor 110 sends a command ID specification signal specifying a command ID of a first command of which the master processor 110 wants a notification of the command execution, to the completion notifying unit 170. The master processor 110 also sends a command ID specification signal specifying a command ID of a second command of which the master processor 110 wants a notification of the command execution, to the completion notifying unit 170.

The completion notifying unit 170 receives and holds the command IDs of the first and second commands, and after a completion flag corresponding to the first or second command is set to "1" in the completion table 171, sends a completion notification signal indicating the completion of execution of the command to the master processor 110. When the master processor 110 sends a command ID specification signal specifying another command ID of the first command to the completion notifying unit 170, the completion notifying unit 170 refers to the completion table and if a completion flag corresponding to the first command has already been set to "1", immediately sends a completion notification signal indicating the completion of execution of the first command to the master processor 110.

After receiving a completion notification signal, the master processor 110 sends a completion flag clear request signal requesting that a completion flag corresponding to the completed command is set to "0" so that the flag can be used for another notification, to the notifying unit 170.

1-4. Memory Management by Bank Table

Now, a bank table 163 used by the execution control unit 160 of the command execution control apparatus 150 will be described with reference to FIG. 8.

FIG. 8 shows the data structure and examples of contents of the bank table 163.

As shown in FIG. 8, the bank table 163 has four elements in rows respectively corresponding to banks #0–#3 in the local memory 131, and each element contains information shown in three columns: a physical bank number column 261; an execution command sequence identification number column 262; and a virtual bank number column 263. In FIG. 8, the numerals in the parentheses indicate that the numerals can be changed by the execution control unit 160.

The execution command sequence identification number column 262 have numerals identifying command sequences that are currently executed by the execution control unit 160. When it instructs a slave hardware unit to execute a certain command in a command sequence, the execution control unit 160 stores a command ID of the next command in the same command sequence into the next command ID holding unit 161 or 162. As a result, the currently executed command sequences can be identified by the identification numbers of the next command ID holding units. Accordingly, the execution command sequence identification number column 262 has "1" or "2" for each element (physical bank), these numerals being the identification numbers of the next command ID holding units. It should be noted here that if no virtual bank number is assigned to a physical bank, the execution command sequence identification number column 262 has, for example, "3" in a corresponding element, to indicate the fact. The virtual bank number column 263 has virtual bank numbers corresponding to the physical banks. The correspondence between them is determined by the execution control unit 160. A virtual bank number is specified as an attribute of a command, where any of numerals "0" to "3" is specified as the virtual bank number.

It should be noted here that if no virtual bank number is assigned to a physical bank, the virtual bank number column 263 has, for example, "4" in a corresponding element, to indicate the fact.

The execution control unit 160 uses the bank table 163 to manage the correspondence between the virtual bank numbers and the physical bank numbers. When causing a slave hardware unit to execute a command in a command sequence, if the command has an attribute specifying a virtual bank number of a virtual bank that should be allocated for the execution of the command, the execution control unit 160 updates the bank table 163 so that the table shows a correspondence between a not-assigned physical bank number, an identification number of a next command ID holding unit storing a command ID of the next command in the same command sequence, and the virtual bank number specified by the attribute in the command being executed.

If the command has an attribute specifying a virtual bank number of a virtual bank that should be released, the execution control unit 160 updates the bank table 163. More specifically, the execution control unit 160 detects elements containing the virtual bank number of the attribute, and inserts values "3" and "4", which indicate as described above that no virtual bank number is assigned to the physical bank number, respectively into the execution command sequence identification number column 262 and the virtual bank number column 263 of the detected elements.

The updating of the bank table 163 by the execution control unit 160 in accordance with an attribute in a command specifying a virtual bank number that should be allocated or released is performed immediately before the execution control unit 160 actually causes a slave hardware unit to execute a command. Note that when causing a slave hardware unit to execute a command instructing to allocate a memory area and specifying a virtual bank number, the execution control unit 160 checks whether the local memory 131 has a physical bank to which no virtual bank number is not assigned; and if the local memory 131 has such a physical bank, the execution control unit 160 causes the slave hardware unit to execute the command after updating the bank table 163 to show a correspondence between the physical bank and the virtual bank number specified in the command.

1-5. Operation

Now, the operation of the processing system 100 will be described.

In the processing system 100, in accordance with a program such as an application program, the master processor 110 conveys command sequences to the command execution control apparatus 150 via the command sequence specification interface, requests notification of completion of command execution as necessary, and receives the notification (hereinafter, such process performed by the master processor 110 is referred to as a master processor process). The command execution control apparatus 150 instructs slave hardware units to execute commands of the conveyed command sequences (hereinafter, such process performed by the command execution control apparatus 150 is referred to as an execution control process), and notifies the master processor 110 of completion of command execution via the command execution completion notification interface.

It should be noted here that the command sequences conveyed by the master processor 110 to the command execution control apparatus 150 are specified by the program.

Now, the master processor process and the execution control process will be described with reference to the flowcharts shown in FIGS. 9–11.

1-5-1. Master Processor Process

Figure 9:
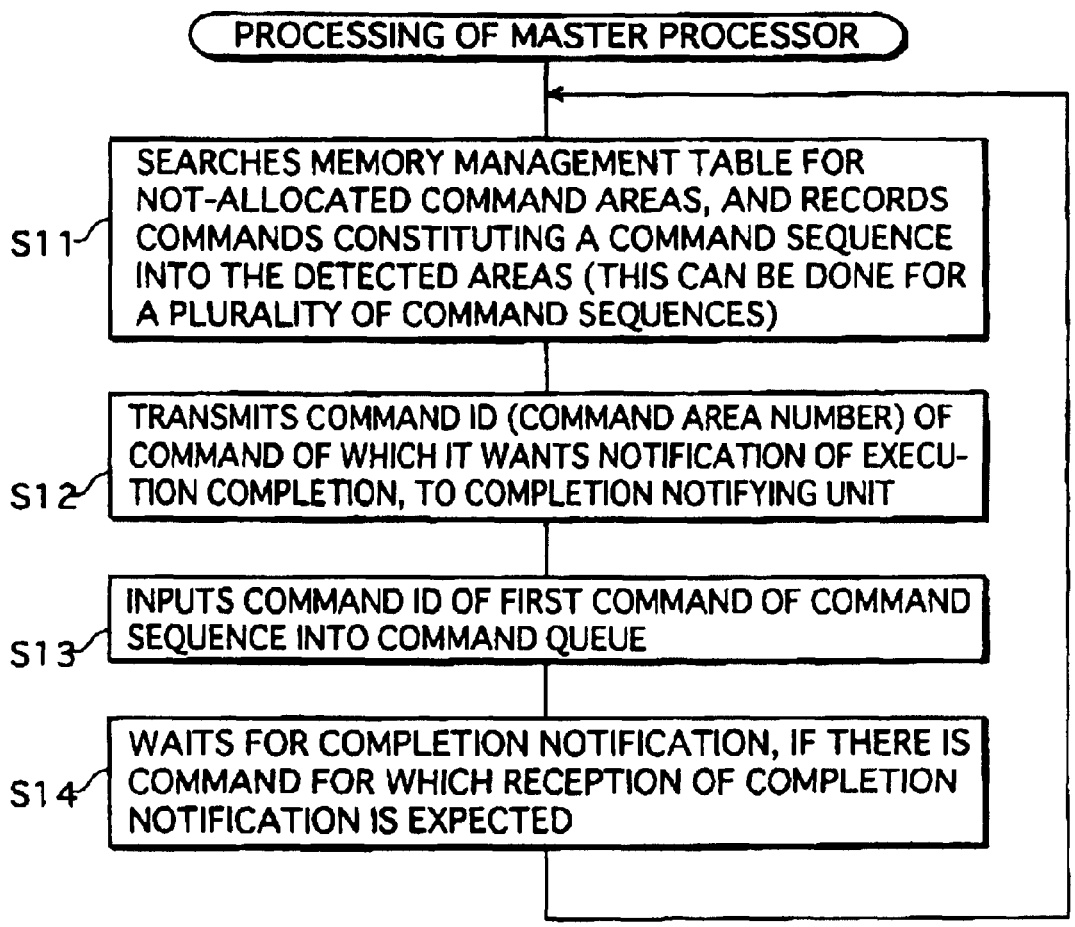
FIG. 9 is a flowchart of the processing performed by the master processor 110.

FIG. 9 is a flowchart of the processing performed by the master processor 110.

The master processor 110 searches the memory management table 310 in the communication memory 151 for not-allocated command areas, and records commands constituting a command sequence into the detected command areas (step S11).

The master processor 110 performs the searching of the memory management table 310 for not-allocated command areas as follows, for example. The master processor 110 checks each bit from the bit 1 to the bit 127 in the memory management table 310 to see whether the bit is "0", and if it detects bit N being "0", it recognizes that command area (N) is a not-allocated command area having been searched for.

For example, suppose that the master processor 110 is going to specify a command sequence composed of four commands, and that the master processor 110 detects four not-allocated command areas in the above described manner and store the four commands into the detected command areas, respectively. Note that when storing each command into the command areas, the master processor 110 writes a command ID of the next command in the same command sequence onto the second 2-byte area of the command. Also, every time it stores a command into a command area, the master processor 110 updates the memory management table 310 by changing the bit corresponding to the stored command from "0" to "1".

After storing each command into the command areas, the master processor 110 transmits a command ID specification signal specifying a command ID of a command of which the master processor 110 wants a notification of execution completion, to the completion notifying unit 170 (step S12).

The master processor 110 then inputs a command ID that is a command area number of a command area storing the first command of the command sequence, into the command queue 152 (step S13).

Here, depending on the program the master processor 110 executes, the master processor 110 may perform the step S11 for a plurality of command sequences, and the step S13 for a plurality of command IDs. Also, the master processor 110 may specify two command IDs to the completion notifying unit 170.

After the step S13, the master processor 110 waits for a completion notification signal to be sent from the completion notifying unit 170 if there is a command for which reception of the completion notification signal is expected (step S14).

The execution control unit 160 of the command execution control apparatus 150 identifies a first command of the command sequence, based on the command ID stored in the command queue 152 in step S13, then identifies the next command and onwards by referring to the next command ID in each command, and causing the slave hardware units to execute the commands in the command sequence in the order.

By repeatedly performing the steps S11 to S14, the master processor 110 causes the slave hardware units to execute the commands in a plurality of command sequences.

When the steps S11 and S13 are performed, the communication memory 151 and the command queue have the contents shown in FIG. 5, for example.

1-5-2. Execution Control Process

Figure 10:
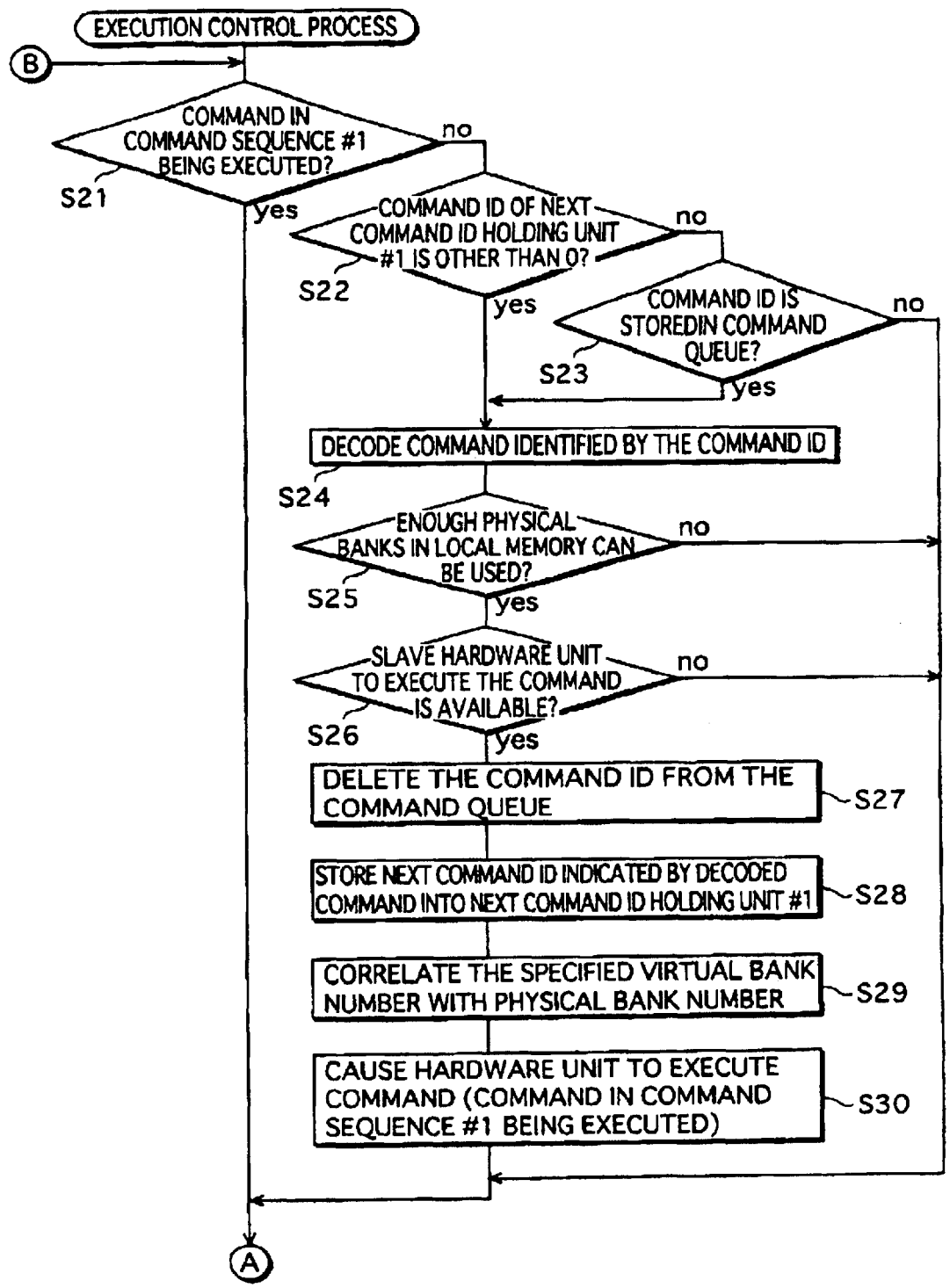
FIG. 10 is a flowchart showing part of the execution control process performed by the execution control unit 160 of the command execution control apparatus 150.
Figure 11:
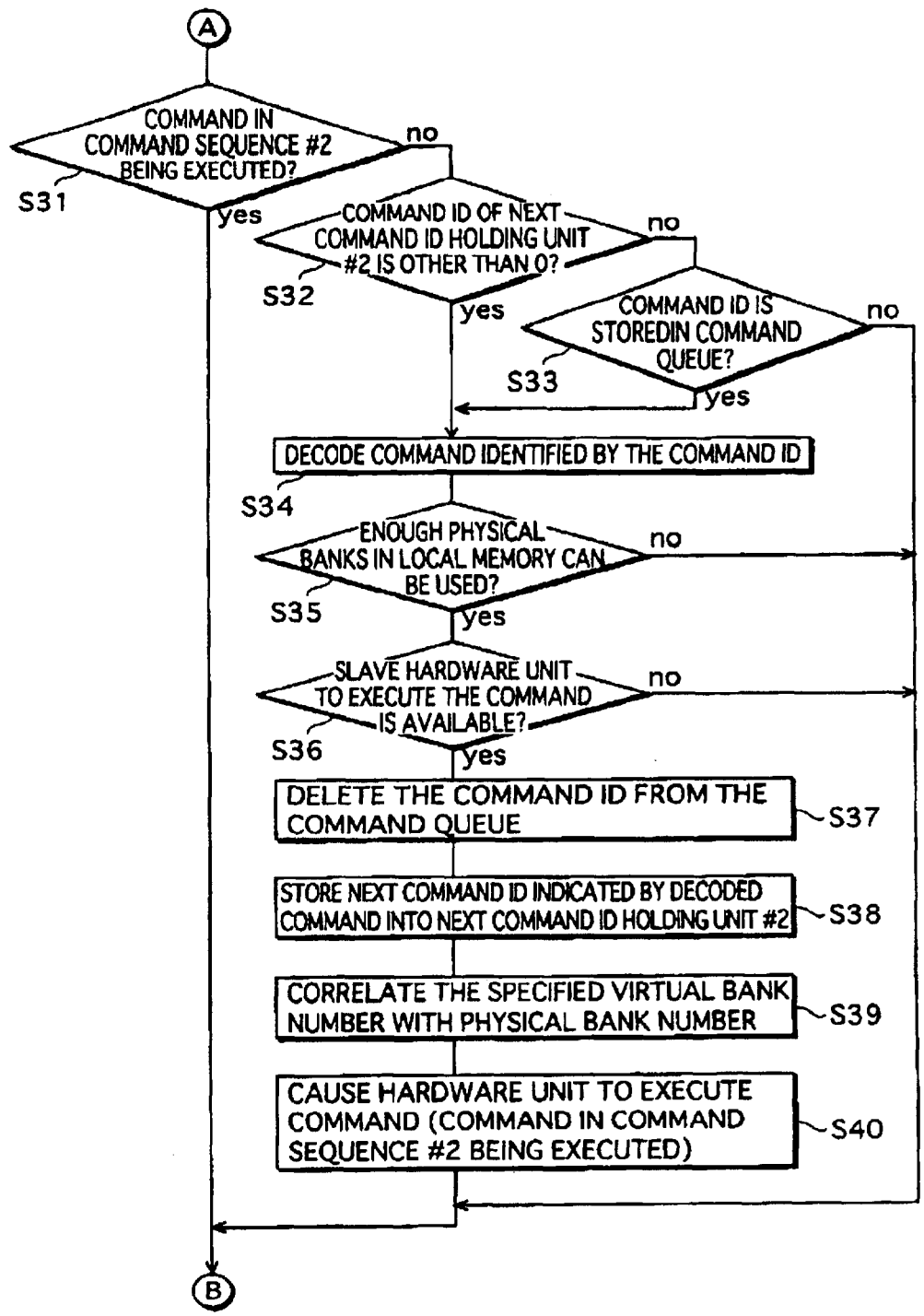
FIG. 11 is a flowchart showing another part the execution control process performed by the execution control unit 160 of the command execution control apparatus 150.

FIGS. 10 and 11 are flowcharts showing the execution control process performed by the execution control unit 160 of the command execution control apparatus 150.

The execution control unit 160 judges whether a command in a command sequence #1 is currently executed by a slave hardware unit, where the command sequence #1 is a command sequence having a command whose command ID was previously held by the next command ID holding unit 161 (next command ID holding unit #1) (step S21).

The execution control unit 160 holds, in a working memory area (not illustrated) which it holds in itself, a command ID indicating a location of a command after it instructs a slave hardware unit to execute the command, and deletes the command ID after it is notified from the completion receiving unit 153 of completion of the command execution by the slave hardware unit. With this construction, the execution control unit 160 can determine that the command is currently executed by the slave hardware unit if it holds the corresponding command ID in the working memory area; and can determine that the command is not executed by the slave hardware unit if it does not hold the corresponding command ID in the working memory area. The working memory area can hold one command ID per one command sequence. The execution control unit 160 can identify a slave hardware unit that is currently operating, by referring to the first bit of the command corresponding to the command ID held the working memory area.

If the judgment result of step S21 is negative, the execution control unit 160 judges whether a command ID held by the next command ID holding unit 161 is other than "0" (step S22). If the judgment result is negative (judges that the command ID is "0"), the execution control unit 160 judges whether the command queue 152 stores a command ID (step S23).

If the judgment result of step S22 is positive (judges that the command ID is other than "0"), the execution control unit 160 decodes a command stored in a command area indicated by a command ID held by the next command ID holding unit 161 (step S24).

Also, if the judgment result of step S23 is positive, the execution control unit 160 decodes a command stored in a command area indicated by the first command ID in the command queue 152 (step S24).

After the step S24, if the command contains an attribute specifying a virtual bank number of a virtual bank to be allocated, the execution control unit 160 refers to the bank table 163 to check whether enough physical banks in the local memory 131 can be used (step S25). If the judgment result is positive, the execution control unit 160 refers to the working memory area to judge whether the slave hardware unit to execute the command is not operating, that is, whether the slave hardware unit is available (step S26).

If the judgment result of step S26 is positive, and if the currently focused command is the one indicated by the command ID in the command queue 152 as treated in steps S23 through S24, the execution control unit 160 deletes the command ID from the command queue 152 (step S27). It should be noted here that if the judgment result of step S22 is positive (judges that the command ID is other than "0"), the execution control unit 160 omits the step S27.

The execution control unit 160 then stores a next command ID indicated by the decoded command into the next command ID holding unit 161 (step S28). If the decoded command has an attribute specifying a virtual bank number of a virtual bank to be allocated, the execution control unit 160 updates the bank table 163 so that the table shows a correspondence between a not-assigned physical bank number and the specified virtual bank number (step S29). Note that if the virtual bank number has been correlated with any physical bank number, the execution control unit 160 omits the step S29. Also, if the decoded command has an attribute specifying a virtual bank number of a virtual bank that should be released, the execution control unit 160 updates the bank table 163 so that the table shows that no virtual bank number is assigned to the physical bank number corresponding to the specified virtual bank number.

After the step S29, the execution control unit 160 instructs the slave hardware unit specified by the first bit of the command (that is, either the slave processor 130 or the DMA controller 140) to execute the command, and store the command ID of the command into the working memory area in the execution control unit 160 (step S30). When instructing the execution of the command, the execution control unit 160 conveys the physical bank number corresponding to the virtual bank number specified by the command, to the slave hardware unit. Upon receiving the physical bank number, the slave hardware unit executes the command using the physical bank in the local memory 131 specified by the received physical bank number. The slave processor 130 or the DMA controller 140 will later notify the completion receiving unit 153 of completion of the command execution. Then, upon receiving a notification of it from the completion receiving unit 153, the execution control unit 160 deletes the command ID of the executed command from the working memory area.

The instruction of the command execution by the execution control unit 160 to the slave hardware unit is performed as follows, for example. The execution control unit 160 extracts the data necessary for the slave hardware unit, namely attributes and parameters for each type of slave hardware unit, from the decoded command. Of the extracted data, the execution control unit 160 replaces the virtual bank number with a physical bank number that is in correspondence with the virtual bank number in the bank table 163. The execution control unit 160 then transmits the physical bank number to the slave hardware unit (either the slave processor 130 or the DMA controller 140) that is to execute the command.

The control goes to step S31: (i) after step S30; (ii) if the judgment result of step S21 is positive; (iii) if the judgment result of step S23 is negative; (iv) if the judgment result of step S25 is negative; or (v) if the judgment result of step S26 is negative. In step S31, the execution control unit 160 judges whether a command in a command sequence #2 is currently executed by a slave hardware unit, where the command sequence #2 is a command sequence having a command whose command ID was previously held by the next command ID holding unit 162 (next command ID holding unit #2) (step S31).

If the judgment result of step S31 is negative, the execution control unit 160 judges whether a command ID held by the next command ID holding unit 162 is other than "0" (step S32). If the judgment result is negative (judges that the command ID is "0"), the execution control unit 160 judges whether the command queue 152 stores a command ID (step S33).

If the judgment result of step S32 is positive (judges that the command ID is other than "0"), the execution control unit 160 decodes a command stored in a command area indicated by a command ID held by the next command ID holding unit 162 (step S34).

Also, if the judgment result of step S33 is positive, the execution control unit 160 decodes a command stored in a command area indicated by the first command ID in the command queue 152 (step S34).

After the step S34, if the command contains an attribute specifying a virtual bank number of a virtual bank to be allocated, the execution control unit 160 refers to the bank table 163 to check whether there is a not-allocated physical bank number, that is to say, whether enough physical banks in the local memory 131 can be used (step S35). If the judgment result is positive, the execution control unit 160 refers to the working memory area to judge whether the slave hardware unit to execute the command is not operating, that is, whether the slave hardware unit is available (step S36).

If the judgment result of step S36 is positive, and if the currently focused command is the one indicated by the command ID in the command queue 152 as treated in steps S33 through S34, the execution control unit 160 deletes the command ID from the command queue 152 (step S37). It should be noted here that if the judgment result of step S32 is positive (judges that the command ID is other than "0"), the execution control unit 160 omits the step S37.

The execution control unit 160 then stores a next command ID indicated by the decoded command into the next command ID holding unit 162 (step S38). If the decoded command has an attribute specifying a virtual bank number of a virtual bank to be allocated, the execution control unit 160 updates the bank table 163 so that the table shows a correspondence between a not-assigned physical bank number and the specified virtual bank number (step S39). Note that if the virtual bank number has been correlated with any physical bank number, the execution control unit 160 omits the step S39. Also, if the decoded command has an attribute specifying a virtual bank number of a virtual bank that should be released, the execution control unit 160 updates the bank table 163 so that the table shows that no virtual bank number is assigned to the physical bank number corresponding to the specified virtual bank number.

After the step S39, the execution control unit 160 instructs the slave hardware unit specified by the first bit of the command (that is, either the slave processor 130 or the DMA controller 140) to execute the command, and store the command ID of the command into the working memory area in the execution control unit 160 (step S40). When instructing the execution of the command, the execution control unit 160 conveys the physical bank number corresponding to the virtual bank number specified by the command, to the slave hardware unit. Upon receiving the physical bank number, the slave hardware unit executes the command using the physical bank in the local memory 131 specified by the received physical bank number. The slave processor 130 or the DMA controller 140 will later notify the completion receiving unit 153 of completion of the command execution. Then, upon receiving a notification of it from the completion receiving unit 153, the execution control unit 160 deletes the command ID of the executed command from the working memory area.

The instruction of the command execution by the execution control unit 160 to the slave hardware unit in step S40 is basically the same as that performed in step S30. That is to say, the execution control unit 160 extracts the data necessary for the slave hardware unit, namely attributes and parameters for each type of slave hardware unit, from the decoded command. Of the extracted data, the execution control unit 160 replaces the virtual bank number with a physical bank number that is in correspondence with the virtual bank number in the bank table 163. The execution control unit 160 then transmits the physical bank number to the slave hardware unit that is to execute the command.

The control returns to step S21: (i) after step S40; (ii) if the judgment result of step S31 is positive; (iii) if the judgment result of step S33 is negative; (iv) if the judgment result of step S35 is negative; or (v) if the judgment result of step S36 is negative. In step S21, the execution control unit 160 judges whether a command in a command sequence #1 is currently executed by a slave hardware unit.

In the above-stated manner, the execution control unit 160 repeats steps S21 to S40 in performing the execution control process.

1-5-3 Operation Example of Execution Control Unit

Now, a specific example of the operation of the execution control unit 160 will be described, assuming that the communication memory 151 and the command queue 152 have the contents shown in FIG. 5.

In the initial state: no command ID is stored in the working memory in the execution control unit 160; the next command ID holding units 161 and 162 have a value "0" indicating that no command ID is stored therein; and in the bank table 163, no correspondence is established between physical bank numbers and virtual bank numbers.

In such initial state, when the execution control unit 160 starts the execution control process by step S21, it judges that no command in the command sequence #1 is currently executed, and moves to step S22 (refer to the flowchart shown in FIG. 10). Then in step S22, the execution control unit 160 judges that a command ID held by the next command ID holding unit 161 is "0" (judges as "no"), and moves to step S23 to judge whether the command queue 152 stores a command ID.

Here, as shown in FIG. 5, the command queue 152 stores a command ID. Therefore, the execution control unit 160 moves to step S24 and decodes the ReadDMA command for the DMA controller, the ReadDMA command being stored in the command area (21) that is indicated by the command ID (21) being the first-to-be-output command ID in the command queue 152 (step S24).

Since the ReadDMA command decoded in step S24 contains an attribute specifying a virtual bank number "0" indicating that the virtual bank corresponding to the virtual bank number "0" should be allocated, the execution control unit 160 refers to the bank table 163 to check whether enough physical banks in the local memory 131 can be used (step S25) The judgment result is positive. As a result, the execution control unit 160 refers to the working memory area to judge whether the DMA controller to execute the command is not operating, that is, whether the DMA controller is available (step S26). The judgment result is positive. As a result, the execution control unit 160 deletes the command ID (21) from the command queue 152 (step S27), and stores a command ID (22) as indicated by the ReadDMA command into the next command ID holding unit 161 (step S28) After step S28, the execution control unit 160 refers to the bank table 163 to detect a not-allocated physical bank number and updates the table so that it shows a correspondence between the not-assigned physical bank number "0" and the specified virtual bank number "0" (step S29). After the update, the bank table 163 has an information element that correlates the physical bank number "0" with the execution command sequence identification number "1" and the virtual bank number "0".

After step S29, the execution control unit 160 instructs the DMA controller 140 to execute the ReadDMA command (step S30) That is to say, the execution control unit 160 transmits the following data to the DMA controller 140: (a) an address in the main memory 120, (b) physical bank number "0", (c) an address in the local memory 131, (d) a size of the data to be transferred, (e) an address increment in the main memory 120, (f) an address increment in the local memory 131, and (g) data indicating that the data is transferred from the main memory to the local memory.

Upon receiving the above data, the DMA controller 140 starts transferring data from the main memory 120 to bank #0 in the local memory 131. The execution control unit 160 stores the command ID of the ReadDMA command into the working memory area.

The execution control unit 160 then moves to step S31 in which it judges that no command in the command sequence #2 is currently executed, and moves to step S32 (refer to the flowchart shown in FIG. 11). Then in step S32, the execution control unit 160 judges that a command ID held by the next command ID holding unit 162 is "0" (judges as "no"), and moves to step S33 to judge whether the command queue 152 stores a command ID (step S33).

Here, as shown in FIG. 5, the command queue 152 stores a command ID (47) although the command ID (21) has been deleted in step S27. Therefore, the execution control unit 160 moves to step S34, and decodes the ReadDMA command for the DMA controller, the ReadDMA command being stored in the command area (47) that is indicated by the command ID (47) in the command queue 152 (step S34).

Since the ReadDMA command decoded in step S34 contains an attribute specifying a virtual bank number "0" indicating that the virtual bank corresponding to the virtual bank number "0" should be allocated, the execution control unit 160 refers to the bank table 163 to check whether enough physical banks in the local memory 131 can be used (step S35). The judgment result is positive. As a result, the execution control unit 160 judges whether the DMA controller to execute the command is not operating, that is, whether the DMA controller is available (step S36). The judgment result is negative because the DMA controller is currently executing the previously specified ReadDMA command. As a result, the execution control unit 160 returns to step S21.

Here, description of this specific example will be continued supposing that the execution of the ReadDMA command of the command area (21) has been completed. It is also supposed that at this point, the DMA controller 140 has notified the completion receiving unit 153 of completion of the command execution, and that upon receiving the notification from the completion receiving unit 153, the execution control unit 160 has deleted the command ID of the ReadDMA command from the working memory area.

In this round of step S21, the execution control unit 160 judges that no command in the command sequence #1 is currently executed, and moves to step S22. Then in step S22, the execution control unit 160 judges that a command ID held by the next command ID holding unit 161 is other than "0" since it is actually "22" (judges as "yes"), and moves to step S24 and decodes the ReadDMA command for the DMA controller, the ReadDMA command being stored in the command area (22) that is indicated by the command ID (22) held by the next command ID holding unit 161 (step S24).

Since the ReadDMA command decoded in step S24 contains an attribute specifying a virtual bank number "1" indicating that the virtual bank corresponding to the virtual bank number "1" should be allocated, the execution control unit 160 refers to the bank table 163 to check whether enough physical banks in the local memory 131 can be used (step S25). The judgment result is positive. As a result, the execution control unit 160 refers to the working memory area to judge whether the DMA controller to execute the command is not operating, that is, whether the DMA controller is available (step S26). The judgment result is positive. As a result, the execution control unit 160 stores the command ID (35) that is indicated by the ReadDMA command as the next command ID, into the next command ID holding unit 161 (step S28).

After step S28, the execution control unit 160 refers to the bank table 163 to detect a not-allocated physical bank number and updates the table so that it shows a correspondence between the not-assigned physical bank number "1" and the specified virtual bank number "1" (step S29). After the update, the bank table 163 has an information element that correlates the physical bank number "1" with the execution command sequence identification number "1" and the virtual bank number "1".

After step S29, the execution control unit 160 instructs the DMA controller 140 to execute the ReadDMA command (step S30). That is to say, the execution control unit 160 transmits the following data to the DMA controller 140: (a) an address in the main memory 120, (b) physical bank number "1", (c) an address in the local memory 131, (d) a size of the data to be transferred, (e) an address increment in the main memory 120, (f) an address increment in the local memory 131, and (g) data indicating that the data is transferred from the main memory to the local memory. Upon receiving the above data, the DMA controller 140 starts transferring data from the main memory 120 to bank #1 in the local memory 131.

Here, description of this specific example will be continued supposing that the execution of the ReadDMA command of the command area (22) has been completed.

In this round of step S21, the execution control unit 160 judges that no command in the command sequence #1 is currently executed, and moves to step S22. Then instep S22, the execution control unit 160 judges that a command ID held by the next command ID holding unit 161 is other than "0" since it is actually "35" (judges as "yes"), and moves to step S24 and decodes the SPstart command for the slave processor, the SPstart command being stored in the command area (35) that is indicated by the command ID (35) held by the next command ID holding unit 161 (step S24).

The SPstart command decoded in step S24 contains an attribute specifying virtual bank numbers "0" and "1" indicating that the virtual banks corresponding to the virtual bank numbers "0" and "1" should be allocated. Here, in the bank table, the virtual bank numbers "0" and "1" have already been correlated with the physical bank numbers "0" and "1". The execution control unit 160 therefore judges that enough physical banks in the local memory 131 can be used, judging as "yes" (step S25), and refers to the working memory area to judge whether the slave processor to execute the command is not operating, that is, whether the slave processor is available (step S26). The judgment result is positive. As a result, the execution control unit 160 stores the command ID (36) that is indicated by the SPstart command as the next command ID, into the next command ID holding unit 161 (step S28).

After step S28, the execution control unit 160 omits step S29 since the virtual bank numbers have already been correlated with the physical bank numbers. The execution control unit 160 instructs the slave processor 130 to execute the decoded SPstart command (step S30) That is to say, the execution control unit 160 transmits the following data to the slave processor 130: (a) a format number for identifying an instruction, (b) physical bank numbers "0" and "1", (c) an execution start address in the instruction memory of the slave processor 130, (d) data indicating parameters 1–5. Upon receiving the above data, the slave processor 130 performs a calculation α based on the contents of banks #0 and #1 in the local memory 131, and writes the calculation result in bank #1.

The execution control unit then goes to step S31, and judges that no command in a command sequence #2 is currently executed by a slave hardware unit (judges as "no" in step S31). Then in the next step S32, the execution control unit 160 judges that a command ID held by the next command ID holding unit 162 is "0" (judges as "no" in step S32). The execution control unit 160 then judges whether the command queue 152 stores a command ID (step S33).

Here, the command queue 152 stores the command ID (47) (judges as "yes" instep S33). Therefore, the execution control unit 160 moves to step S34 and decodes the ReadDMA command for the DMA controller, the ReadDMA command being stored in the command area (47) that is indicated by the command ID (47) in the command queue 152 (step S34).

Since the ReadDMA command decoded in step S34 contains an attribute specifying a virtual bank number "0" indicating that the virtual bank corresponding to the virtual bank number "0" should be allocated, the execution control unit 160 refers to the bank table 163 to check whether enough physical banks in the local memory 131 can be used (step S35). Since there is a not-allocated physical bank, the execution control unit 160 judges positively in step S35. In the next step S36, it also judges positively since the DMA controller to execute the command is not operating ("yes" in step S36).

The execution control unit 160 deletes the command ID (47) from the command queue 152 (step S37), and stores the command ID (48) as indicated by the ReadDMA command as the next command ID into the next command ID holding unit 162 (step S38).

After step S38, the execution control unit 160 refers to the bank table 163 to detect a not-allocated physical bank number and updates the table so that it shows a correspondence between the not-assigned physical bank number "2" and the virtual bank number "0" specified in the decoded ReadDMA command (step S39). After the update, the bank table 163 has an information element that correlates the physical bank number "2" with the execution command sequence identification number "2" and the virtual bank number "0".

After step S39, the execution control unit 160 instructs the DMA controller 140 to execute the ReadDMA command (step S40). That is to say, the execution control unit 160 transmits the following data to the DMA controller 140: (a) an address in the main memory 120, (b) physical bank number "2", (c) an address in the local memory 131, (d) a size of the data to be transferred, (e) an address increment in the main memory 120, (f) an address increment in the local memory 131, and (g) data indicating that the data is transferred from the main memory to the local memory.

Upon receiving the above data, the DMA controller 140 starts transferring data from the main memory 120 to bank #2 in the local memory 131.

The description of this example will be continued supposing that the DMA controller 140 has completed the execution of the ReadDMA command of the command area (47) while the slave processor 130 is executing the SPstart command of the command area (35).

In this round of step S21, the execution control unit 160 judges that a command in the command sequence #1 is currently executed (judges as "yes"), and moves to step S31.

In this round of step S31, the execution control unit 160 judges that no command in a command sequence #2 is currently executed by a slave hardware unit (judges as "no" in step S31) Then in the next step S32, the execution control unit 160 judges that a command ID held by the next command ID holding unit 162 is other than "0" since it is actually "48" (judges as "yes" in step S32). The execution control unit 160 decodes the ReadDMA command for the DMA controller, the ReadDMA command being stored in the command area (48) that is indicated by the command ID (48) held by the next command ID holding unit 162 (step S34).

Since the ReadDMA command decoded in step S34 contains an attribute specifying a virtual bank number "1" indicating that the virtual bank corresponding to the virtual bank number "1" should be allocated, the execution control unit 160 refers to the bank table 163 to check whether enough physical banks in the local memory 131 can be used (step S35). The judgment result is positive since there is a not-allocated physical bank. As a result, the execution control unit 160 refers to the working memory area to judge whether the DMA controller to execute the command is not operating, that is, whether the DMA controller is available (step S36). The judgment result is positive. As a result, the execution control unit 160 stores the command ID (49) that is indicated by the ReadDMA command as the next command ID, into the next command ID holding unit 162 (step S38).

After step S38, the execution control unit 160 refers to the bank table 163 to detect a not-allocated physical bank number and updates the table so that it shows a correspondence between the not-assigned physical bank number "3" and the specified virtual bank number "1" (step S39). After the update, the bank table 163 has an information element that correlates the physical bank number "3" with the execution command sequence identification number "2" and the virtual bank number "1".

At this point of time, the bank table 163 has the contents as shown in FIG. 8.

After step S39, the execution control unit 160 instructs the DMA controller 140 to execute the ReadDMA command (step S40). That is to say, the execution control unit 160 transmits the following data to the DMA controller 140: (a) an address in the main memory 120, (b) physical bank number "3", (c) an address in the local memory 131, (d) a size of the data to be transferred, (e) an address increment in the main memory 120, (f) an address increment in the local memory 131, and (g) data indicating that the data is transferred from the main memory to the local memory. Upon receiving the above data, the DMA controller 140 starts transferring data from the main memory 120 to bank #3 in the local memory 131

Here, description of this specific example will be continued supposing that the execution of the SPstart command of the command area (35) has been completed by the slave processor 130, and that the ReadDMA command of the command area (48) has been completed by the DMA controller 140.

In this round of step S21, the execution control unit 160 judges that no command in the command sequence #1 is currently executed, and moves to step S22. Then in step S22, the execution control unit 160 judges that a command ID held by the next command ID holding unit 161 is other than "0" since it is actually "36" (judges as "yes"), and moves to step S24 and decodes the WriteDMA command for the DMA controller, the WriteDMA command being stored in the command area (36) that is indicated by the command ID (36) held by the next command ID holding unit 161 (step S24).

The WriteDMA command decoded in step S24 contains an attribute specifying a virtual bank number "1" indicating that the virtual bank corresponding to the virtual bank number "1" should be allocated. Here, in the bank table, the virtual bank numbers "1" has already been correlated with the physical bank number "1". The execution control unit 160 therefore judges that enough physical banks in the local memory 131 can be used, judging as "yes" (step S25), and refers to the working memory area to judge whether the DMA controller to execute the command is not operating, that is, whether the DMA controller is available (step S26). The judgment result is positive. As a result, the execution control unit 160 stores the command ID (0) that is indicated by the WriteDMA command as the next command ID, into the next command ID holding unit 161 (step S28).

After step S28, the execution control unit 160 omits step S29 since the virtual bank number has already been correlated with the physical bank number. The execution control unit 160 instructs the DMA controller 140 to execute the WriteDMA command (step S30). That is to say, the execution control unit 160 transmits the following data to the DMA controller 140: (a) an address in the main memory 120, (b) physical bank number "1", (c) an address in the local memory 131, (d) a size of the data to be transferred, (e) an address increment in the main memory 120, (f) an address increment in the local memory 131, and (g) data indicating that the data is transferred from the local memory to the main memory. Upon receiving the above data, the DMA controller 140 starts transferring data from bank #1 of the local memory 131 to the main memory 120.

It should be noted here that if the command has an attribute specifying "0" as the virtual bank number of a virtual bank that should be released, the execution control unit 160 updates the bank table 163 in step S29 to indicate that a physical bank corresponding to physical bank number "0" is not allocated.

The execution control unit 160 then moves to step S31 in which it judges that no command in a command sequence #2 is currently executed by a slave hardware unit (judges as "no" in step S31). Then in the next step S32, the execution control unit 160 judges that a command ID held by the next command ID holding unit 162 is other than "0" since it is actually "49" (judges as "yes" in step S32). The execution control unit 160 decodes the SPstart command for the slave processor, the SPstart command being stored in the command area (49) that is indicated by the command ID (49) held by the next command ID holding unit 162 (step S34).

The SPstart command decoded in step S34 contains an attribute specifying virtual bank numbers "0" and "1" indicating that the virtual banks corresponding to the virtual bank numbers "0" and "1" should be allocated. Here, in the bank table, the virtual bank numbers "0" and "1" have already been correlated with the physical bank numbers "2" and "3". The execution control unit 160 therefore judges that enough physical banks in the local memory 131 can be used, judging as "yes" (step S35), and refers to the working memory area to judge whether the slave processor to execute the command is not operating, that is, whether the slave processor is available (step S36). The judgment result is positive. As a result, the execution control unit 160 stores the command ID (61) that is indicated by the SPstart command as the next command ID, into the next command ID holding unit 162 (step S38).

After step S38, the execution control unit 160 omits step S39 since the virtual bank numbers have already been correlated with the physical bank numbers. The execution control unit 160 instructs the slave processor 130 to execute the decoded SPstart command (step S40). That is to say, the execution control unit 160 transmits the following data to the slave processor 130: (a) a format number for identifying an instruction, (b) physical bank numbers "2" and "3", (c) an execution start address in the instruction memory of the slave processor 130, (d) data indicating parameters 1–5. Upon receiving the above data, the slave processor 130 performs a calculation β based on the contents of banks #2 and #3 in the local memory 131, and writes the calculation result in bank #3.

As described above, the execution control unit 160 causes the slave hardware units to execute each command in the order of arrangement in each command sequence. More specifically, while a slave hardware unit is executing a command in a command sequence, another slave hardware unit can execute a command in another command sequence. Accordingly, compared with a conventional system in which the slave hardware units execute the commands in units of command sequences, that is to say, one command sequence by one command sequence, the processing system 100 in Embodiment 1 uses the slave hardware units more effectively, resulting in a high-speed processing of a plurality of command sequences.

1-6. Consideration

Figure 12:
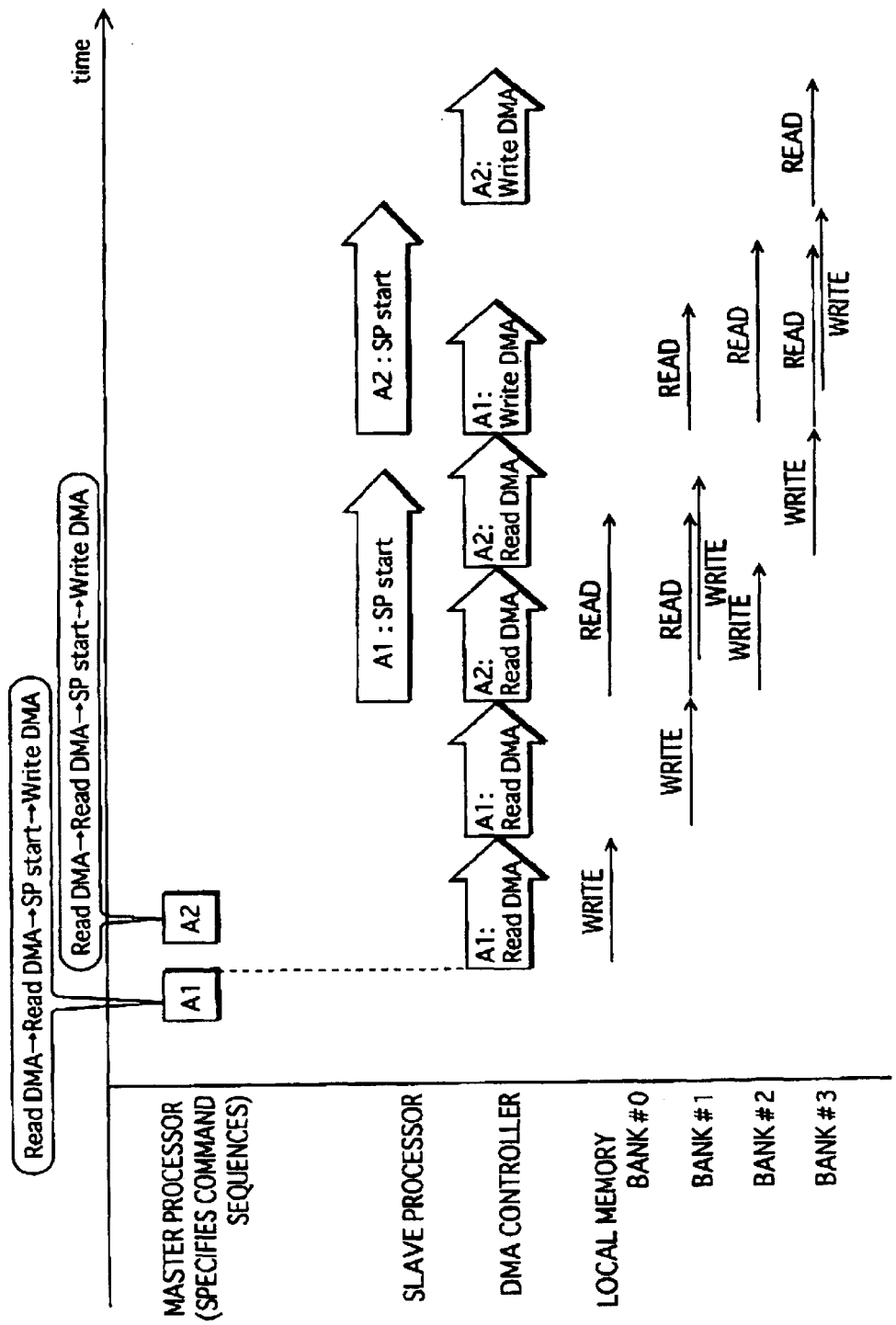
FIG. 12 is a time chart showing changes in the command execution state based on an operation example of the execution control unit 160.

FIG. 12 is a time chart showing changes in the command execution state when the execution control unit 160 operates as the above-described specific example based on the contents of the communication memory 151 and the command queue 152 shown in FIG. 5.

In FIG. 12, "A1" represents a command sequence which starts with a command stored in the command area (21) in the communication memory 151, and "A2" represents a command sequence which starts with a command stored in the command area (47) in the communication memory 151.

Here, if commands in the command sequences A1 and A2 are executed in the order by the slave hardware units, while the slave processor 130 executes the SPstart command, the DMA controller 140 is not operating.

In contrast, in the control exercised by the command execution control apparatus 150 in Embodiment 1, while the slave processor 130 executes the SPstart command in the command sequence A1, the DMA controller 140 executes the ReadDMA command in the command sequence A2. As understood from this comparison, the present invention increases the rate of operation of slave hardware units in processing a plurality of command sequences, increasing the processing speed as a whole.

Also, execution of the commands constituting the command sequence A1 uses banks #0 and #1 in the local memory 131, and execution of the commands constituting the command sequence A2 uses banks #2 and #3 in the local memory 131. That is to say, independent memory spaces are allocated to each command sequence. This ensures the consistency of the data used for each command sequence.

Embodiment 2

In the processing system 100 in Embodiment 1, when instructing a slave hardware unit to execute a command containing an attribute instructing to allocate a memory area, specifying a virtual bank number, the execution control unit 160 correlates the specified virtual bank number with a not-allocated physical bank number in the bank table 163 so that each command sequence can use a separate memory area.

The processing system in Embodiment 2 is basically the same as the processing system 100 in Embodiment 1, though a slight modification has been added to it (hereinafter, the processing system in Embodiment 2 is referred to as a modified processing system). The modified processing system is characterized in that the modified execution control unit, which is basically the same as the execution control unit 160 in the processing system 100 except for some modification, uses a certain memory area shared by a plurality of command sequences, when instructing slave hardware units to execute commands.

2-1. Modified Processing System

The construction of the modified processing system only slightly differs from that of the processing system 100 shown in FIG. 1. Accordingly, the components of the modified processing system will be described basically using the reference numbers shown in FIG. 1.

The modified processing system differs from the processing system 100 in the following points:

(1) In the processing system 100, each command stored by the master processor 110 into the communication memory 151 can contain an attribute specifying a virtual bank number and instruct to allocate or release a memory area as specified.

In the modified processing system, each command stored by the master processor 110 into the communication memory 151 can contain a global attribute that indicates whether the memory area to be allocated or released is shared by a plurality of command sequences or not, in addition to the specification of a virtual bank number and instruction to allocate or release the memory area.

More specifically, each specification of a virtual bank number by an attribute in a command is accompanied with a 1-bit global attribute. Hereinafter, to specify that a memory area should be shared by a plurality of command sequences is referred to as a global specification.

(2) The processing system 100 uses the bank table 163 to manage the correspondences between the physical bank numbers and the virtual bank numbers. Each element of the table contains information for the physical bank number column 261, execution command sequence identification number column 262, and virtual bank number column 263. The value for the execution command sequence identification number column 262 maybe "1" or "2" that respectively correspond to command sequences #1 and #2, or "3" or the like that indicates that the physical bank is not correlated with any command sequence (see FIG. 8).

FIG. 13 shows the data structure and examples of contents of the bank table provided in the modified processing system in Embodiment 2.

As shown in FIG. 13, the bank table 563 is basically constructed the same as the bank table 163 in the processing system 100, and has four elements in rows respectively corresponding to banks #0–#3, and each element contains information shown in three columns; a physical bank number column 564; an execution command sequence identification number column 565; and a virtual bank number column 566. The difference from the bank table 163 is that the execution command sequence identification number column 565 may have a value "0" that indicates the corresponding bank is shared by a plurality of command sequences, namely is given a global specification.

According to the example shown in FIG. 13, the bank #0 in the local memory 131 is shared by a plurality of command sequences, and is correlated with the virtual bank number "0"; the bank #1 is correlated with command sequence #1 and virtual bank number "1"; the bank #2 is correlated with command sequence #2 and virtual bank number "1"; and the bank #3 is not allocated.

(3) In the processing system 100, as described with reference to the flowcharts shown in FIGS. 10 and 11, if a command to be executed contains an attribute specifying a virtual bank number instructing to allocate the specified memory area, the execution control unit 160 refers to the bank table 163 to check whether enough physical banks in the local memory 131 can be used (steps S25, S35), and executes the command only when enough physical banks can be used. The execution control unit 160 also updates the bank table 163 in accordance with an attribute in the command instructing allocation or release of a memory area (steps S29, S39). When causing a slave hardware unit to execute a command containing an attribute instructing to allocate a memory area, the execution control unit 160 notifies the slave hardware unit of a physical bank number corresponding to a virtual bank number specified in the command, so that the slave hardware unit can access a memory area indicated by the physical bank number.

In the modified processing system, a modified execution control unit basically follows the procedure of the flowcharts shown in FIGS. 10 and 11, except for the following:

When causing a slave hardware unit to execute a command containing an attribute instructing to allocate a memory area with specification of a virtual bank number and the global specification, the modified execution control unit refers to the bank table to check whether the specified virtual bank number is correlated with a physical bank number and an execution command sequence identification number "0". If it is correlated, the modified execution control unit notifies the executing slave hardware unit of the physical bank number; and if it is not correlated, the modified execution control unit checks to see whether there is a physical bank number that is not allocated (steps S25, S35). Only if there is a not-allocated physical bank number, the modified execution control unit determines to execute the command. The modified execution control unit updates the bank table 563 to show correspondences between the not-allocated physical bank number, the execution command sequence identification number "0", and the specified virtual bank number (steps S29, S39). The modified execution control unit then notifies the slave hardware unit of the physical bank number so that the slave hardware unit can access a memory area indicated by the physical bank number in the execution of the command.

2-2. Consideration

In the above-described modified processing system, after a command sequence allocates a memory area specifying, for example, a virtual bank number "0" and the global specification, a slave hardware unit writes certain data into the allocated memory area. After this, commands in other command sequences can also access the same memory area if the virtual bank number "0" and allocation of a memory area are specified in the commands.

As understood from the above description, the modified processing system, in which a plurality of command sequences can share a memory area, is useful especially when a plurality of processes should be independently performed, but certain data can be used in common by the processes.

Embodiment 3

In the processing system 100 in Embodiment 1, when instructing a slave hardware unit to execute a command containing an attribute instructing to allocate a memory area, specifying a virtual bank number, the execution control unit 160 correlates the specified virtual bank number with a not-allocated physical bank number in the bank table 163, conveys the physical bank number to the slave hardware unit being to execute the command, and causes the slave hardware unit to perform a process using a memory area indicated by the physical bank number. Also, when instructing a slave hardware unit to execute a command containing an attribute instructing to release a memory area, specifying a virtual bank number, the execution control unit 160 updates the bank table 163 to delete the correlation between the specified virtual bank number and a physical bank number. In the processing system 100, a plurality of commands respectively belonging to a plurality of command sequences are executed concurrently, but it does not happen that a plurality of commands in a same command sequence are executed concurrently. Also, the commands are executed one by one by respectively corresponding slave hardware units.

The processing system in Embodiment 3 is basically the same as the processing system 100 in Embodiment 1, except for some partial modification. The modified processing system is characterized in that (i) it is possible to allocate or release a memory area according to an instruction by a slave hardware unit executing a command, as well as according to an attribute contained in a command, and (ii) a plurality of consecutive commands in a same command sequence can be executed concurrently by corresponding slave hardware units. It should be noted here that even such processing system in Embodiment 3 conforms to the rule, as the processing system 100 in Embodiment 1, that commands constituting a command sequences are executed in the order of arrangement in the command sequence by corresponding slave hardware units. In other words, in the processing system in Embodiment 3, execution of each command in a command sequences starts in the order of arrangement in the command sequence, but the execution periods of commands may overlap with each other, and the command executions may not end necessarily in the order of arrangement in the command sequence.

3-1. Construction

Figure 14:
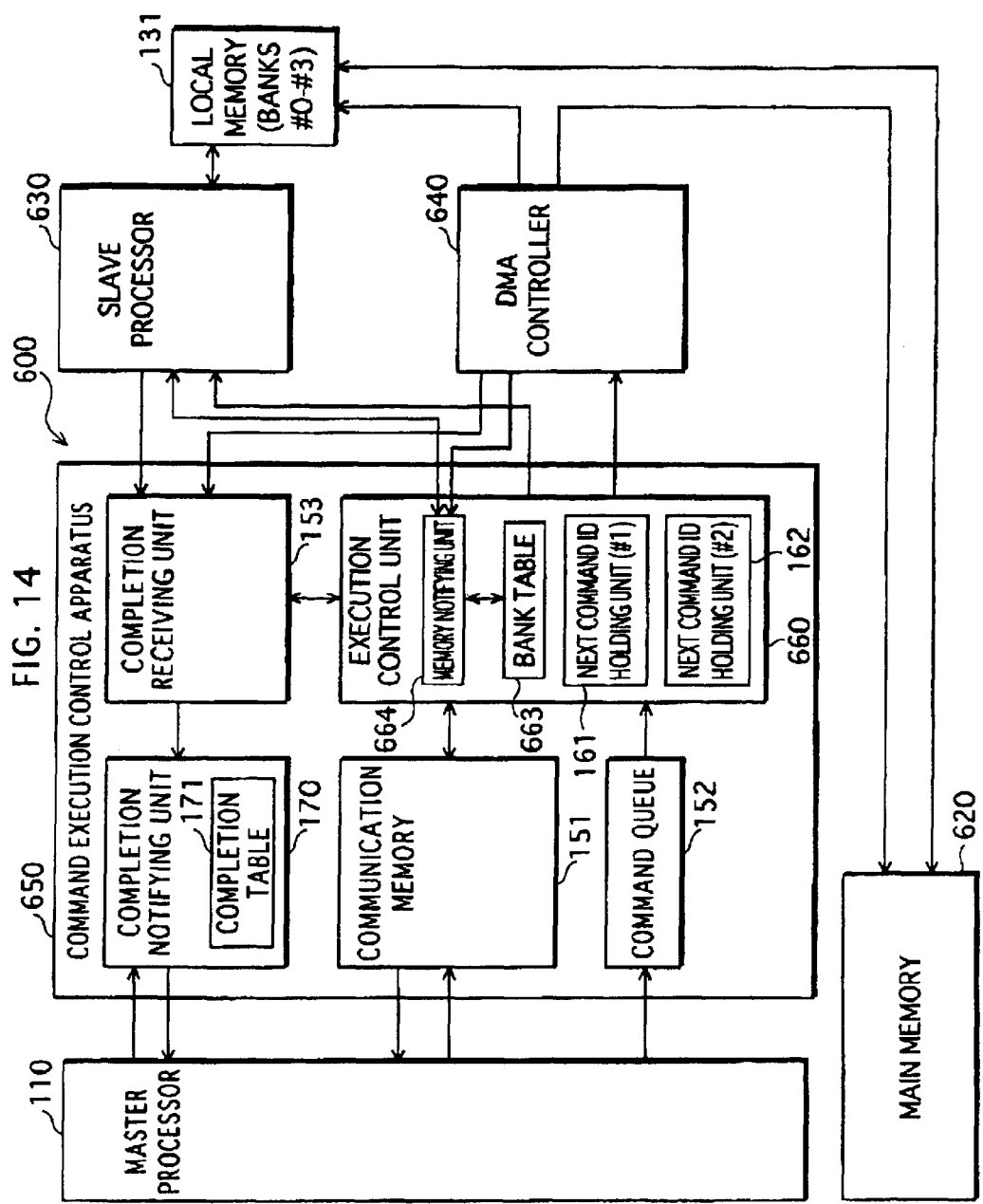
FIG. 14 shows the construction of the processing system 600 in Embodiment 3.

FIG. 14 shows the construction of the processing system 600 in Embodiment 3.

As shown in FIG. 14, the processing system 600 includes a master processor 110, a main memory 620, a slave processor 630, a local memory 131, a DMA controller 640, and a command execution control apparatus 650, and is formed in one semiconductor chip. It should be noted here that the processing systems 100 and 600 have the same components to which the same numbers are assigned in FIGS. 1 and 14, and such components are not explained here.

As a program is executed, the master processor 110 issues a command sequence to the command execution control apparatus 150 to cause a slave hardware unit to execute a partial process, requests the command execution control apparatus 150 to send, as necessary, a notification of completion of execution of a process corresponding to a command, and receives the notification.

The slave processor 630, when a command is sent from the command execution control apparatus 650 as a control program dedicated to the slave processor is executed, executes the command using the local memory 131 as necessary, and notifies the command execution control apparatus 650 of completion of the command execution. The slave processor 630 also notifies the command execution control apparatus 650 by specifying a virtual bank number, that a bank in the local memory 131 should be allocated, released, is in wait, or use completed.

The DMA controller 640, upon receiving a command from the command execution control apparatus 650, controls a data transfer between the main memory 620, which is a large-capacity on-chip memory, and the local memory 131, and notifies the command execution control apparatus 650 of completion of the data transfer. The DMA controller 640 can use two channels in parallel, and therefore can process two commands concurrently. After completing a command to transfer data from the main memory 620 to a bank in the local memory 131 as specified by a virtual bank number, the DMA controller 640 notifies the command execution control apparatus 650 that the use of the memory bank has completed, specifying a channel number (a first channel or a second channel) used in the command execution.

It should be noted here that a plurality of banks in the local memory 131 can be accessed at the same time, and that the main memory 620 also has a plurality of banks that can be accessed at the same time.

The command execution control apparatus 650 serves as an interface between the master processor 110 and slave hardware units. The command execution control apparatus 650 selects an appropriate command from a plurality of command sequences issued to the master processor in order to effectively use the slave hardware units, instructs a slave hardware unit to start executing the command, receives a notification of completion of the command execution from the slave hardware unit, and notifies the master processor of the completion of the command execution if the notification is requested by the master process or in terms of the command. The command execution control apparatus 650 is also notified from the slave processor 630 with specification of a virtual bank number that a bank in the local memory 131 should be allocated, released, is in wait, or use completed, and manages the accesses to the local memory 131. The command execution control apparatus 650 may be achieved by a CPU or a memory.

As shown in FIG. 14, the command execution control apparatus 650 includes a communication memory 151, a command queue 152, a completion receiving unit 153, an execution control unit 660, and a completion notifying unit 170.

The execution control unit 660 includes a next command ID holding unit 161, a next command ID holding unit 162, a bank table 663, and a memory notifying unit 664, and refers to the command queue 152 and the communication memory 151 to exercise a control so as to cause the slave hardware units to execute commands in command sequences in the order of arrangement, enabling concurrent executions of as many commands as possible.

More specifically, while a slave hardware unit is executing a command in a command sequence, the execution control unit 660 judges whether another slave hardware unit can execute the next command in the same command sequence. If the judgment result is positive, the execution control unit 660 causes the other slave hardware unit to execute the next command concurrently. If it is not possible to execute the next command in the same command sequence, the execution control unit 660 judges whether another slave hardware unit can execute another command in another command sequence. If the judgment result is positive, the execution control unit 660 causes the other slave hardware unit to execute the other command in the other command sequence concurrently. The execution control unit 660 judges that a slave hardware unit can execute a command when it recognizes, for example, that the slave hardware unit has completed a command execution and is currently not operating, which the execution control unit 660 can recognize by notification of it sent from the completion receiving unit 153. It should be noted here that the execution control unit 660 operates the same as the execution control unit 160, unless it is noted otherwise.

The execution control unit 660 holds, in a working memory area (not illustrated) which it holds in itself, a command ID indicating a location of a command after it instructs a slave hardware unit to execute the command, and deletes the command ID after it is notified from the completion receiving unit 153 of completion of the command execution by the slave hardware unit. With this construction, the execution control unit 660 can determine that the command is currently executed by the slave hardware unit if it holds the corresponding command ID in the working memory area; and can determine that the command is not executed by the slave hardware unit if it does not hold the corresponding command ID in the working memory area. The working memory area can hold three command IDs per one command sequence in the order of execution. When starting to cause a slave hardware unit to execute a command, the execution control unit 660 stores a command ID of the command and hardware unit type information in the working memory area in a manner in which the correspondence between them is indicated, where the hardware unit type information identifies the executing slave hardware unit as one of a slave processor 630, a first channel of a DMA controller 640, and a second channel of the DMA controller 640.

It should be noted here that the reason why the working memory area can hold three command IDs per one command sequence and the hardware unit type information is that three commands can be executed concurrently respectively by the slave processor 630 and the first and second channels of the DMA controller 640.

There are some commands that instruct to access the local memory 131 for execution of a process. As a result, the execution control unit 660 assigns separate memory areas of the local memory 131 to a plurality of command sequences so that a plurality of slave hardware units can execute commands of respectively different command sequences using different memory areas in the local memory 131.

The memory notifying unit 664 updates the bank table 663, as will be described later, in accordance with a notification from the slave processor 630 that a bank in the local memory 131 should be allocated, released, is in wait, or use completed, or a notification from the DMA controller 640 of completion of use of a memory bank. The memory notifying unit 664, when receiving a notification from the DMA controller 640 of completion of use of a memory bank which is waited by the slave processor 630, notifies the slave processor 630 that it can use the memory bank.

The bank table 663 manages the correspondences between virtual bank numbers and physical bank numbers, where the virtual bank numbers are used in commands instructing an access to the local memory 131, and the physical bank numbers identify the four memory banks that physically exist in the local memory 131.

3-2. Memory Management by Bank Table

FIG. 15 shows the data structure and examples of contents of the bank table 663.

As shown in FIG. 15, the bank table 663 has four elements in rows respectively corresponding to banks #0–#3 in the local memory 131, and each element contains information shown in three columns: a physical bank number column 665; an execution command sequence identification number column 666; a virtual bank number column 667; a slave processor (SP) state column 668; and a DMA controller state (DMA state) column 669. In FIG. 8, the numerals in the parentheses indicate that the numerals can be changed by the execution control unit 660.

The execution command sequence identification number column 666 have numerals identifying command sequences that are currently executed by the execution control unit 660. When it instructs a slave hardware unit to execute a certain command in a command sequence, the execution control unit 660 stores a command ID of the next command in the same command sequence into the next command ID holding unit 161 or 162. As a result, the currently executed command sequences can be identified by the identification numbers of the next command ID holding units. Accordingly, the execution command sequence identification number column 666 has "1" or "2" for each element (physical bank), these numerals being the identification numbers of the next command ID holding units. It should be noted here that if no virtual bank number is assigned to a physical bank, the execution command sequence identification number column 666 has, for example, "3" in a corresponding element, to indicate the fact.

The virtual bank number column 667 has virtual bank numbers corresponding to the physical banks. The correspondence between them is determined by the execution control unit 660. A virtual bank number is specified as an attribute of a command, where any of numerals "0" to "3" is specified as the virtual bank number. It should be noted here that if no virtual bank number is assigned to a physical bank, the virtual bank number column 667 has, for example, "4" in a corresponding element, to indicate the fact.

The SP state column 668 is effective only when the physical bank number for the element is correlated with a virtual bank number, and has values, for example, "1", "2", and "0" that respectively indicate the "used" state, "wait" state, and "indefinite" state, where the used state in this column indicates that the slave processor 630 is using the physical bank, the wait state indicates that the slave processor 630 is waiting for the release of the physical bank, and the indefinite state indicates that the slave processor 630 is not in any of these states.

The DMA state column 669 is also effective only when the physical bank number for the element is correlated with a virtual bank number, and has values, for example, "1", and "0" that respectively indicate the "used" state and "indefinite" state, where the used state in this column indicates that the DMA controller 640 is using the physical bank, and the indefinite state indicates that the DMA controller 640 is not using the physical bank.

The execution control unit 660 uses the bank table 663 to manage the correspondences between the virtual bank numbers and the physical bank numbers.

3-2-1. Allocation or Release Specification by Command

When causing a slave hardware unit to execute a command in a command sequence, if the command has an attribute specifying a virtual bank number of a virtual bank that should be allocated for the execution of the command, the execution control unit 660 updates the bank table 663 so that the table shows a correspondence between a not-assigned physical bank number, an identification number of a next command ID holding unit storing a command ID of the next command in the same command sequence, and the virtual bank number specified by the attribute in the command being executed, and shows by writing a value in either the SP state column 668 or the DMA state column 669 that corresponds to a slave hardware unit specified by the attribute in the command being executed, to indicate that the slave hardware unit is in the used state, and writing a value in the other column to indicate the indefinite state.

However, if the command has an attribute specifying a virtual bank number of a virtual bank that should be allocated for the execution of the command, and if the specified virtual bank number is correlated with a physical bank number in the bank table 663, that is, if the specified virtual bank number has already been allocated by a preceding command in the same command sequence or the execution of the current command, and further if the SP state column 668 and the DMA state column 669 both indicate the indefinite state, the execution control unit 660 does not newly correlate the virtual bank number with a physical bank number, and in correspondence with the physical bank number correlated with the specified virtual bank number, only changes a value in either the SP state column 668 or the DMA state column 669 that corresponds to a slave hardware unit specified by the attribute in the command being executed, to indicate that the slave hardware unit is in the used state.

If the command has an attribute specifying a virtual bank number of a virtual bank that should be released, the execution control unit 660 updates the bank table 663. More specifically, the execution control unit 660 detects elements containing the virtual bank number of the attribute, and inserts values "3" and "4", which indicate as described above that no virtual bank number is assigned to the physical bank number, respectively into the execution command sequence identification number column 666 and the virtual bank number column 667 of the detected elements, and further changes the SP state column 668 and the DMA state column 669 to indicate the indefinite state.

The updating of the bank table 663 by the execution control unit 660 in accordance with an attribute in a command specifying a virtual bank number that should be allocated or released is performed immediately before the execution control unit 660 actually causes a slave hardware unit to execute a command.

Note that if the specified virtual bank number has already been correlated with a physical bank number in the bank table 663, and if the SP state column 668 or the DMA state column 669 that corresponds to the slave hardware unit specified in the command does not indicate the indefinite state, the execution control unit 660 neither causes the slave hardware unit to execute the command nor updates the bank table 663. Also note that if the specified virtual bank number has not been correlated with a physical bank number in the bank table 663, and there is no available physical bank number, the execution control unit 660 does not update the bank table 663, unable to cause a slave hardware unit to execute the command.

3-2-2. Allocation, Release, Wait, Use End Notification

When the slave processor 630 notifies the command execution control apparatus 650 that a bank in the local memory 131 should be allocated, released, is in wait, or use completed, specifying a virtual bank number, the notification is received by the memory notifying unit 664 in the execution control unit 660. The memory notifying unit 664 then updates the bank table 663 in accordance with the contents of the received notification, as follows.

(1) Allocation Notification

After receiving a memory bank allocation notification from the slave processor 630, the memory notifying unit 664 refers to the working memory area in the execution control unit 660 to detect a command sequence which the command currently executed by the slave processor 630 belongs to. The memory notifying unit 664 then refers to the bank table 663 to determine whether the specified virtual bank number has been correlated with a physical bank number in an element that contains an execution command sequence identification number of the detected command sequence. If it has not been correlated, the memory notifying unit 664 updates the bank table 663 so as to show a correspondence between the execution command sequence identification number, a not-allocated physical bank number, and the specified virtual bank number, and to show the slave processor is in the used state and the DMA controller is in the indefinite state. The memory notifying unit 664 then notifies the slave processor 630 of the physical bank number together with the specified virtual bank number.

In the above procedure, if the specified virtual bank number has been correlated with a physical bank number, and the DMA state column 668 in the same element shows that the DMA controller 640 is in the indefinite state, the memory notifying unit 664 does not newly correlate the specified virtual bank number with a physical bank number, but updates the bank table 663 by changing the SP state column 668 in the element in which the specified virtual bank number is correlated with the physical bank number, to the used state, and notifies the slave processor 630 of the physical bank number together with the specified virtual bank number.

Also in a similar case, if the specified virtual bank number has been correlated with a physical bank number, and the DMA state column 668 in the same element shows that the DMA controller 640 is not in the indefinite state, the memory notifying unit 664 updates the bank table 663 by changing the SP state column in the element in which the specified virtual bank number is correlated with the physical bank number, to the wait state, and then as soon as the DMA controller 640 is in the indefinite state, the memory notifying unit 664 updates the bank table 663 by changing the SP state column 668 in the element to indicate the used state, and notifies the slave processor 630 of the physical bank number together with the specified virtual bank number.

Also in a similar case, if the specified virtual bank number has not been correlated with a physical bank number, and there is no not-allocated physical bank number, the memory notifying unit 664 holds the specified virtual bank number in the execution control unit 660, and then as soon as a physical bank is released, the memory notifying unit 664 updates the bank table 663 to correlate the specified virtual bank number with a physical bank number of the released physical bank, and to show the slave processor is in the used state and the DMA controller is in the indefinite state. The memory notifying unit 664 then notifies the slave processor 630 of the physical bank number together with the specified virtual bank number.

(2) Release Notification

After receiving a memory bank release notification from the slave processor 630, the memory notifying unit 664 refers to the working memory area in the execution control unit 660 to detect a command sequence which the command currently executed by the slave processor 630 belongs to. The memory notifying unit 664 then refers to the bank table 663 to detect an element in which the specified virtual bank number is correlated with a physical bank number, and updates the bank table 663 by replacing values in the execution command sequence identification number column 666 and the virtual bank number column 667 in the detected element with the values ("3" and "4", for example) that indicate that the corresponding physical bank is not allocated, and replacing values in the SP state column 668 and the DMA state column 669 with the values of the indefinite state.

(3) Wait Notification

After receiving a memory bank wait notification from the slave processor 630, the memory notifying unit 664 refers to the working memory area in the execution control unit 660 to detect a command sequence which the command currently executed by the slave processor 630 belongs to. The memory notifying unit 664 then refers to the bank table 663. If the DMA state column 668 in the same element as the specified virtual bank number shows that the DMA controller 640 is not in the indefinite state, the memory notifying unit 664 updates the bank table 663 by changing the SP state column 668 in the same element to the wait state, and then as soon as the DMA controller 640 is in the indefinite state, the memory notifying unit 664 updates the bank table 663 by changing the SP state column 668 in the element to indicate the used state, and notifies the slave processor 630 of the physical bank number together with the specified virtual bank number.

In the above case, if the DMA state column 668 in the same element as the specified virtual bank number shows that the DMA controller 640 is an the indefinite state, the memory notifying unit 664 updates the bank table 663 by changing the SP state column 668 in the same element to the used state, and notifies the slave processor 630 of the physical bank number together with the specified virtual bank number.

(4) Use End Notification

After receiving a memory bank use end notification from the slave processor 630, the memory notifying unit 664 refers to the working memory area in the execution control unit 660 to detect a command sequence which the command currently executed by the slave processor 630 belongs to. The memory notifying unit 664 then updates the bank table 663 by changing the SP state column 668 in the same element as the specified virtual bank number to the indefinite state.

3-2-3. Use End Notification from DMA Controller

When the DMA controller 640 notifies the command execution control apparatus 650 of completion of using a memory bank, specifying a channel number, the notification is received by the memory notifying unit 664 in the execution control unit 660. The memory notifying unit 664 then refers to the working memory area in the execution control unit 660 to detect, from the specified channel number, a virtual bank number of a virtual bank that was used, and updates the bank table 663 by changing the DMA state column 669 in the same element as the detected virtual bank number to the indefinite state.

3-3. Operation

Now, the operation of the processing system 600 will be described.

In the processing system 600, the master processor 110 performs the master processor process (see FIG. 9), and the command execution control apparatus 650 performs the execution control process for instructing slave hardware units to execute commands of the command sequences conveyed from the master processor 110, and a process for managing the local memory 131 using the bank table 663 while causing slave hardware units to execute commands (hereinafter, this process is referred to as a memory management during command execution) The command execution control apparatus 650 also notifies the master processor 110 of completion of command execution via the command execution completion notification interface, as is the case with the command execution control apparatus 150 in Embodiment 1.

It should be noted here that the command sequences conveyed by the master processor 110 to the command execution control apparatus 650 are specified by the program.

Now, the execution control process and the memory management during command execution will be described with reference to the flowcharts shown in FIGS. 16–19.

3-3-1. Execution Control Process

Figure 16:
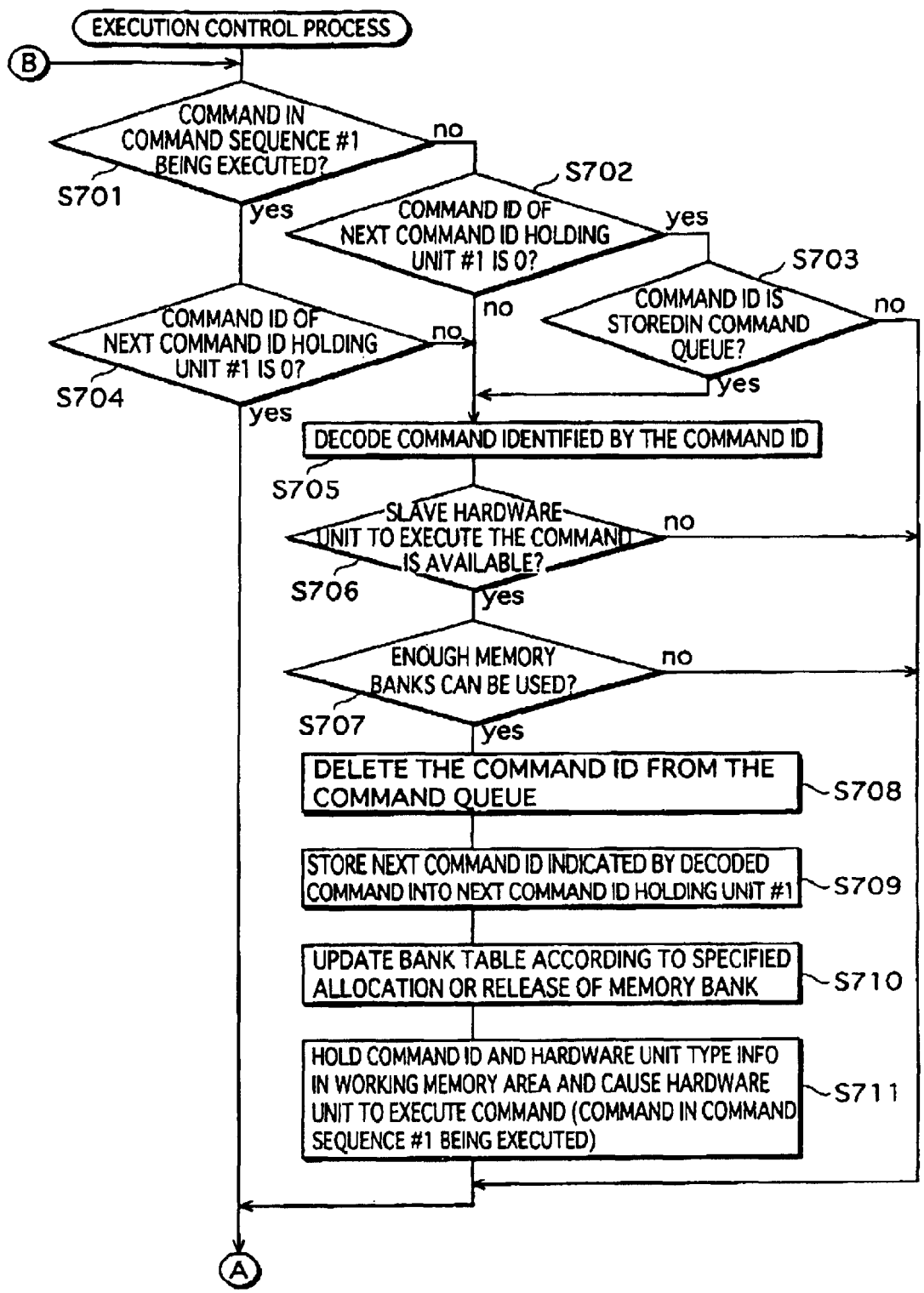
FIG. 16 is a flowchart showing part of the execution control process performed by the execution control unit 660 of the command execution control apparatus 650.
Figure 17:
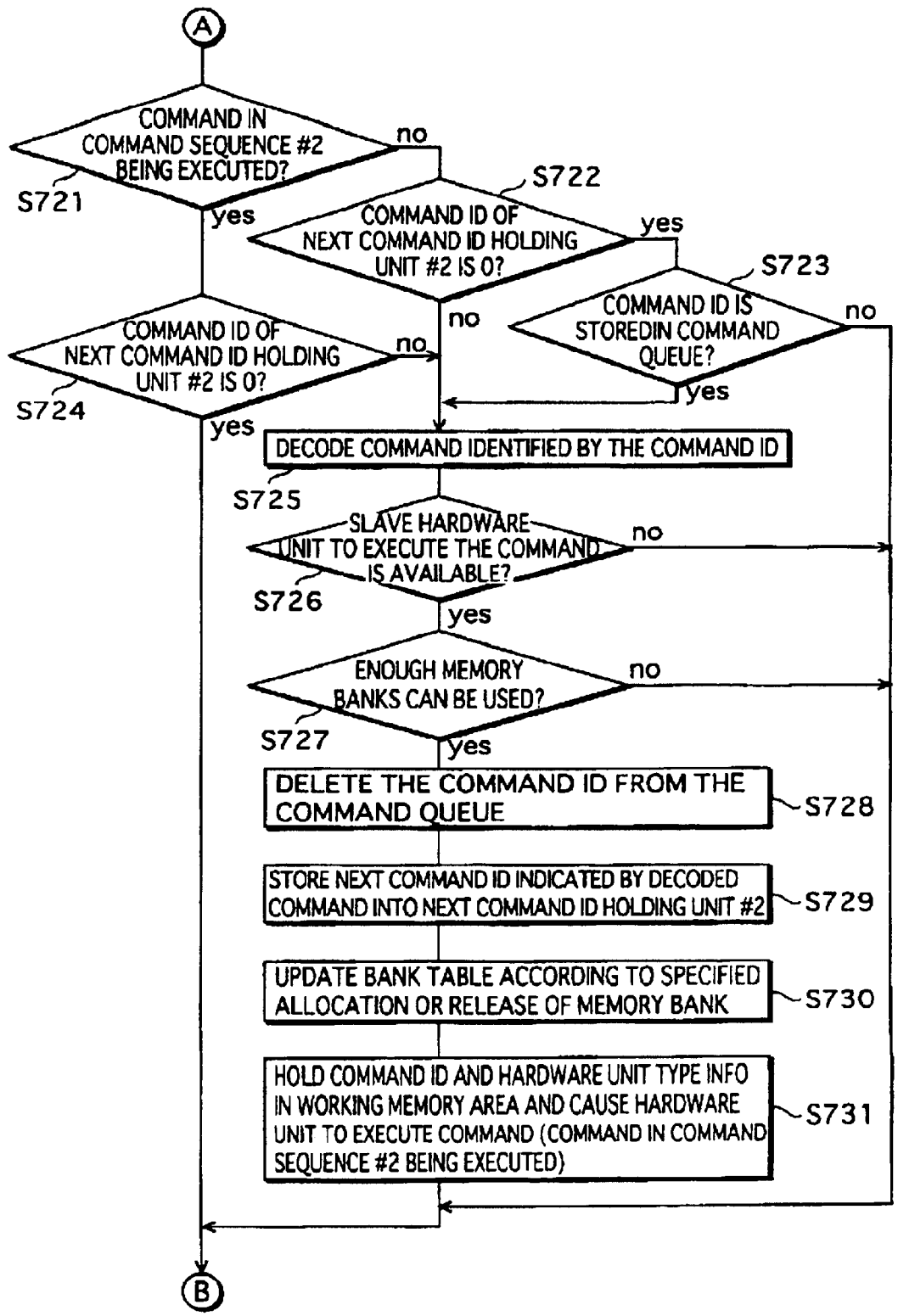
FIG. 17 is a flowchart showing another part the execution control process performed by the execution control unit 660 of the command execution control apparatus 650.

FIGS. 16 and 17 are flowcharts showing the execution control process performed by the execution control unit 660 of the command execution control apparatus 650.

The execution control unit 660 judges whether a command in a command sequence #1 is currently executed by a slave hardware unit, where the command sequence #1 is a command sequence having a command whose command ID was previously held by the next command ID holding unit 161 (next command ID holding unit #1) (step S701).

When instructing a slave hardware unit to execute a command, the execution control unit 660 holds, in a working memory area (not illustrated) in the unit 660, (i) a command ID indicating a location of the command and (ii) hardware unit type information by correlating them with a command sequence of the executed command (step S711), and deletes the command ID and the hardware unit type information after it is notified from the completion receiving unit 153 of completion of the command execution by the slave hardware unit. With this command management method, the execution control unit 660 can determine, for example, that one or more commands in the command sequence are currently executed by corresponding slave hardware units if it holds one or more corresponding command IDs in the working memory area.

If the judgment result of step S701 is negative, the execution control unit 660 judges whether a command ID held by the next command ID holding unit 161 is "0" (step S702). If the judgment result is positive (judges that the command ID is "0"), the execution control unit 660 judges whether the command queue 152 stores a command ID (step S703).

If the judgment result of step S701 is positive, the execution control unit 660 judges whether a command ID held by the next command ID holding unit 161 is "0" (step S704).

If the judgment result of step S704 is negative (judges that the command ID is other than "0"), the execution control unit 660 decodes a command stored in a command area indicated by a command ID held by the next command ID holding unit 161 (step S705).

Also, if the judgment result of step S702 is negative (judges that the command ID is other than "0"), the execution control unit 660 decodes a command stored in a command area indicated by a command ID held by the next command ID holding unit 161 (step S705).

If the judgment result of step S703 is positive, the execution control unit 660 decodes a command stored in a command area indicated by the first command ID in the command queue 152 (step S705).

After the step S705, the execution control unit 660 refers to the hardware type information stored in the working memory area to judge whether the slave hardware unit to execute the command is available, that is, not operating (step S706). If the judgment result is positive, then if the command contains an attribute specifying a virtual bank number of a virtual bank to be allocated, the execution control unit 660 refers to the bank table 163 to check whether enough physical banks in the local memory 131 can be used (step S707).

Note that in step S706, it is judged that the specified slave hardware unit is available if the specified slave hardware unit is not contained the hardware type information currently stored in the working memory area, where all hardware resources provided in this example are one slave processor and two channels of DMA controllers.

If the judgment result of step S707 is positive, and if the currently focused command is the one indicated by the command ID in the command queue 152 as treated in steps S703 and S705, the execution control unit 660 deletes the command ID from the command queue 152 (step S708). It should be noted here that if the execution control unit 660 has not entered step S703 so far, the execution control unit 660 omits the step S708.

The execution control unit 660 then stores a next command ID indicated by the decoded command into the next command ID holding unit 161 (step S709). If the decoded command has an attribute specifying a virtual bank number of a virtual bank to be allocated or released, the execution control unit 660 updates the bank table 663 according to the specification by the attribute (step S710). Note that if the decoded command does not have specification of allocation or release, the execution control unit 660 omits the step S710.

In step S710, the bank table 663 is updated as described earlier in "3-2-1. Allocation or Release by Command".

After step S710, the execution control unit 660 generates the hardware type information based on the first bit of the command indicating a slave hardware unit, and stores the hardware type information and the command ID into the working memory area by correlating them with the command sequence #1, and instructs the slave hardware unit specified by the first bit of the command to execute the command (step S711).

In step S711, if the first bit of the command specifies the slave processor, the execution control unit 660 stores the hardware type information indicating the slave processor, and instructs the slave processor to execute the command; and if the first bit of the command specifies the DMA controller and the first channel is not occupied, the execution control unit 660 stores the hardware type information indicating the first channel, and instructs the DMA controller to execute the command by specifying the first channel, and if the first channel is occupied but the second channel is not occupied, the execution control unit 660 stores the hardware type information indicating the second channel, and instructs the DMA controller to execute the command by specifying the second channel.

The instruction of the command execution by the execution control unit 660 to the slave hardware unit is performed as follows, for example. The execution control unit 660 extracts the data necessary for the slave hardware unit, namely attributes and parameters for each type of slave hardware unit, from the decoded command. Of the extracted data, the execution control unit 660 replaces the virtual bank number with a physical bank number that is in correspondence with the virtual bank number in the bank table 163. The execution control unit 660 then transmits the physical bank number to the slave hardware unit that is to execute the command.

The slave processor 630 or any channel of the DMA controller 640 will later notify the completion receiving unit 153 of completion of the command execution. Then, upon receiving a notification of it from the completion receiving unit 153, the execution control unit 160 deletes the command ID and hardware type information of the executed command from the working memory area.

The control goes to step S721: (i) after step S711; (ii) if the judgment result of step S706 is negative, (iii) if the judgment result of step S707 is negative, (iv) if the judgment result of step S703 is negative, or (v) if the judgment result of step S704 is positive. In step S721, the execution control unit 660 judges whether a command in a command sequence #2 is currently executed by a slave hardware unit, where the command sequence #2 is a command sequence having a command whose command ID was previously held by the next command ID holding unit 162 (next command ID holding unit #2) (step S721).

Description of steps S721 to S731 (see FIG. 17) will be omitted here since they are the same as steps S701 to S711 (see FIG. 16) described above, except for a target command sequence.

In the above-stated manner, the execution control unit 660 repeats steps S701 to S731 in performing the execution control process.

3-3-2. Memory Management during Command Execution

Figure 18:
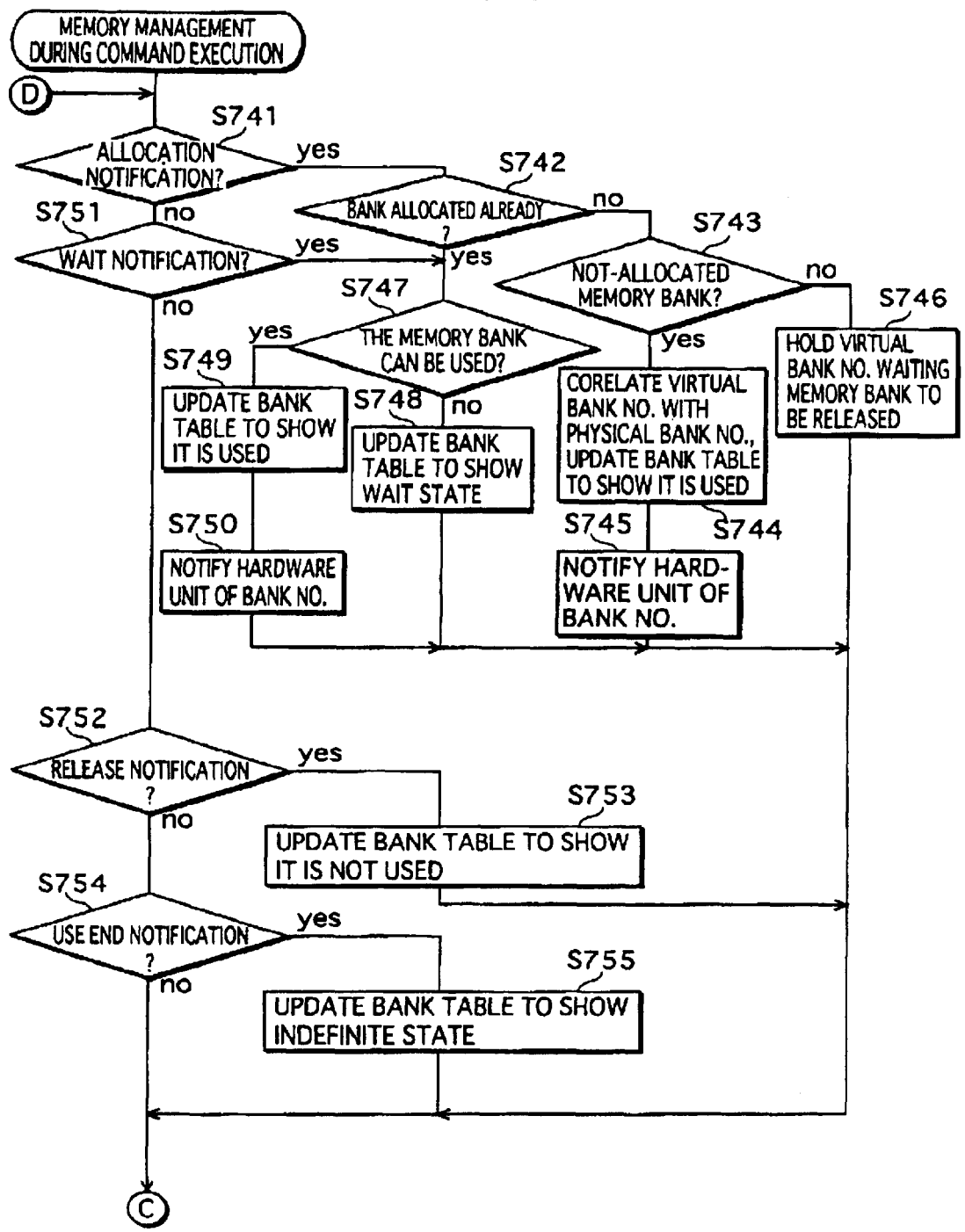
FIG. 18 is a flowchart showing part of the process of memory management during command execution which is performed by the memory notifying unit 664 in the execution control unit 660 of the command execution control apparatus 650.
Figure 19:
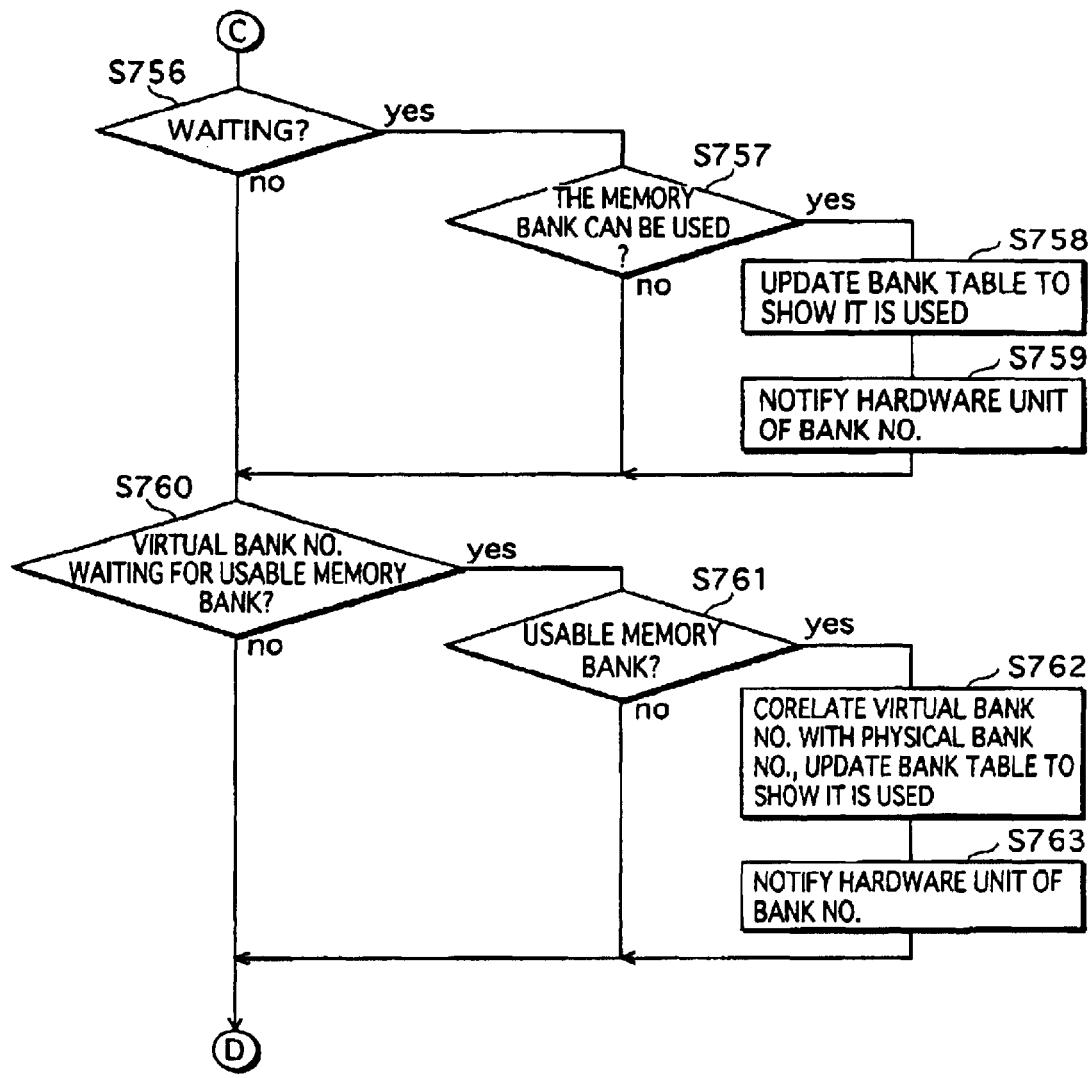
FIG. 19 is a flowchart showing another part of the process of memory management during command execution.

FIGS. 18 and 19 are flowcharts of the process of memory management during command execution which is performed by the memory notifying unit 664 in the execution control unit 660 of the command execution control apparatus 650.

The process of memory management during command execution can be executed concurrently with the above-described execution control process (see FIGS. 16 and 17) by a control program that has a different thread structure.

In the process of memory management during command execution, the bank table 663 is updated as described earlier in "3-2-2. Allocation, Release, Wait, Use End Notification" and "3-2-3. Use End Notification from DMA Controller".

Upon receiving a notification from the slave processor 630 that a bank in the local memory 131 should be allocated, with specification of a virtual bank number (step S741, "yes"), the memory notifying unit 664 refers to the hardware type information specifying the slave processor in the working memory area to detect a command sequence that corresponds to the slave processor. The memory notifying unit 664 then refers to the bank table 663 to judge whether the specified virtual bank number and the detected command sequence have been correlated with a physical bank number (step S742). If the judgment result is negative, the memory notifying unit 664 judges whether there is a not-allocated physical bank number (step S743). If the judgment result is positive, the memory notifying unit 664 updates the bank table 663 by correlating the specified virtual bank number with the not-allocated physical bank number, and for the same element, by setting the SP state column 668 to the used state and setting the DMA state column 669 to the indefinite state (step S744). The memory notifying unit 664 then notifies the slave processor 630 of the physical bank number together with the specified virtual bank number (step S745).

If the judgment result of step S743 is negative, the memory notifying unit 664 holds the specified virtual bank number in the working memory area, waiting for a release of a memory bank so that immediately after a memory bank is released, the memory bank can be allocated. Note that the memory notifying unit 664 holds the specified virtual bank number together with a command sequence number of a command sequence having the command being executed by the slave processor (step S746).

If the judgment result of step S742 is positive, the memory notifying unit 664 judges whether the memory bank identified by the physical bank number is usable (step S747). Here, in step S747, the memory notifying unit 664 refers to the bank table 663 and judges that the memory bank is usable if the DMA state column 669 in the same element as the physical bank number indicates the indefinite state.

If the judgment result of step S747 is positive, the memory notifying unit 664 updates the bank table 663 by setting the SP state column 668 in the same element as the physical bank number to the used state (step S749), and notifies the slave processor 630 of the physical bank number together with the specified virtual bank number (step S750). On the other hand, if the judgment result of step S747 is negative, the memory notifying unit 664 updates the bank table 663 by setting the SP state column 668 in the same element as the physical bank number to the wait state (step S748).

Upon receiving a wait notification from the slave processor 630, with specification of a virtual bank number (step S751, "yes"), the memory notifying unit 664 refers to the working memory area in the execution control unit 660 to detect a command sequence which the command currently executed by the slave processor 630 belongs to, then refers to the bank table 663 to see if a memory bank corresponding to a physical bank number correlated with the specified virtual bank number and the command sequence number is usable (step S747). Depending on the result, step S748 or steps S749 and 750 follow as described above.

Upon receiving a memory bank release notification from the slave processor 630, with specification of a virtual bank number (step S752, "yes"), the memory notifying unit 664 refers to the working memory area in the execution control unit 660 to detect a command sequence which the command currently executed by the slave processor 630 belongs to, then refers to the bank table 663 to detect an element in which a physical bank number is correlated with the specified virtual bank number, and updates the bank table 663 by replacing values in the execution command sequence identification number column 666 and the virtual bank number column 667 in the element with the values "3" and "4", respectively, to indicate the release of the physical bank, and replacing values in the SP state column 668 and the DMA state column 669 with the values indicating the indefinite state (step S753).

Upon receiving a memory bank use end notification from the slave processor 630, with specification of a virtual bank number (step S754, "yes"), the memory notifying unit 664 refers to the working memory area in the execution control unit 660 to detect a command sequence which the command currently executed by the slave processor 630 belongs to, then refers to the bank table 663 to detect an element in which a physical bank number is correlated with the specified virtual bank number, and updates the bank table 663 by replacing a value in the SP state column 668 with a value indicating the indefinite state (step S755).

Upon receiving a memory bank use end notification from the DMA controller 640, with specification of a channel number (step S754, "yes"), the memory notifying unit 664 refers to the hardware type information in the working memory area in the execution control unit 660 to detect a command sequence and a virtual bank number from the specified channel number, refers to the bank table 663 to detect an element in which a physical bank number is correlated with the detected virtual bank number, and updates the bank table 663 by changing the DMA state column 669 in the same element as the detected virtual bank number to the indefinite state (step S755).

After completion of step S745, S746, S748, S750, S753, or S755, or the judgment result of step 754 is negative, the control goes to step S756 in which the memory notifying unit 664 refers to the bank table 663 to judge whether there is an element in which the SP state column has a value indicating the wait state (step S756). If the judgment result is positive, the memory notifying unit 664 judges whether the memory bank corresponding to the physical bank number in the detected element is usable (step S757). Here, in step S757, the memory notifying unit 664 judges that the memory bank is usable if the DMA state column 669 in the same element as the physical bank number indicates the indefinite state.

If the judgment result of step S757 is positive, the memory notifying unit 664 updates the bank table 663 by setting the SP state column 668 in the same element as the physical bank number to the used state (step S758), and notifies the slave processor 630 of the physical bank number together with the specified virtual bank number (step S759). If the judgment result of step S757 or S756 is negative, the memory notifying unit 664 skips steps S758 and S759.

Instep S760, the memory notifying unit 664 judges whether a virtual bank number is held in the working memory area, waiting for a release of a memory bank (step S760). If the judgment result is positive, the memory notifying unit 664 judges whether there is a not-allocated memory bank, namely a not-allocated physical bank number (step S761). If the judgment result is positive, the memory notifying unit 664 updates the bank table 663 by correlating the held virtual bank number and the command sequence number with the not-allocated physical bank number, and also setting the SP state column 668 to the used state and setting the DMA state column 669 to the indefinite state (step S762). The memory notifying unit 664 then deletes the virtual bank number and the command sequence number from the working memory area, and notifies the slave processor 630 of the physical bank number together with the virtual bank number (step S763). The control then returns to step S741. If the judgment result of step S761 or S760 is negative, the memory notifying unit 664 skips steps S762 and S763 and returns to step S741.

3-3-3. Operation of Slave Processor

After receiving from the execution control unit 660 an instruction to start executing a command, with necessary information such as parameters, the slave processor 630 executes the command. More specifically, upon receiving of such an instruction from the execution control unit 660, the slave processor 630 decodes and executes a program portion corresponding to the specified command.

As described earlier, the program for the slave processor has instructions for notifying that a memory bank should be allocated, released, is in wait, or use completed (hereinafter, these instructions are respectively referred to as "alloc instruction", "release instruction", "wait instruction", and "done instruction").

The following describes the right to use a memory bank. In this description, the right to use a memory bank will be explained from the viewpoints of allocating and releasing in units of command sequences and allocating and releasing in units of slave hardware units. It should be noted here that under the control of the execution control unit 660, if a command sequence and a slave hardware unit being to execute a command in the command sequence both have the right to use a same memory bank, another slave hardware unit being to execute another command in the command sequence cannot have the right to use the memory bank. Accordingly, an arrangement has been made so that a plurality of slave hardware units being to execute commands in a same command sequence can share a same memory bank by specifying a corresponding virtual bank number, where each slave hardware unit uses the memory bank over a different time period avoiding an overlap.

The Alloc Instruction

The alloc instruction allows the slave processor to establish the right to use a memory bank by specifying a corresponding virtual bank number. The establishment of the right to use the memory bank by the alloc instruction is an establishment by a slave hardware unit. If the memory bank has not been allocated until the execution of the alloc instruction, the establishment doubles the establishment by a command sequence.

The Wait Instruction

For the wait instruction to be executed, it is presumed that the right to use a memory bank has been established by a previously executed command in a command sequence which also contains a command being executed by the slave processor, in other words, it is presumed that the right to use the memory bank has been established by the command sequence. In this condition, there is a possibility that another slave hardware unit is having the right to use the memory bank. By issuing the wait instruction, the slave processor can establish the right to use the memory bank immediately after the other slave hardware unit ends the use of the memory bank.

The Release Instruction

The release instruction is an instruction for memory management and releases the right to use a memory bank corresponding to a specified virtual bank number having been possessed by a command sequence containing a command being executed by the slave processor. In other words, the release instruction deprives a command sequence, which contains a command being executed by the slave processor, of the right to use the memory bank. The release instruction releases the right to use the memory bank owned by the slave hardware unit, at the same time it releases the right to use the memory bank owned by the command sequence.

The Done Instruction

The done instruction releases the right to use the memory bank corresponding to the specified virtual bank number, owned by the slave hardware unit, but at the same time it maintains the right to use the memory bank owned by the command sequence.

The slave processor 630 decodes and executes the alloc instruction or the wait instruction specifying a virtual bank number, notifies the memory notifying unit 664 of the allocation or wait of the memory bank together with the virtual bank number, stops the decoding and executing of the instruction waiting for the virtual bank number and a physical bank number to be sent from the memory notifying unit 664, and decodes and executes an instruction next to the alloc instruction or the wait instruction immediately after it receives the virtual bank number and a physical bank number from the memory notifying unit 664.

It should be noted here that in the program for the slave processor, the alloc instruction or the wait instruction is followed by an instruction to access the memory bank being allocated or waited. In this case, after receiving a physical bank number from the memory notifying unit 664, the slave processor 630 decodes the access instruction and accesses a memory bank identified by the received physical bank number.

The slave processor 630 also decodes and executes the release instruction or the done instruction specifying a virtual bank number, notifies the memory notifying unit 664 of the release or end of the memory bank together with the virtual bank number, and decodes and executes an instruction next to the release instruction or the done instruction, without stopping the decoding and executing of the release instruction or the done instruction.

3-3-4. Operation of DMA Controller

The DMA controller 640, when instructed by the execution control unit 660, with necessary information such as specification of a channel number or a memory address, to start executing a command, executes a data transfer process specified by the command using the specified channel, and after completing the data transfer, notifies the memory notifying unit 664 of completion of the use.

3-3-5. Operation Example

Figure 20:
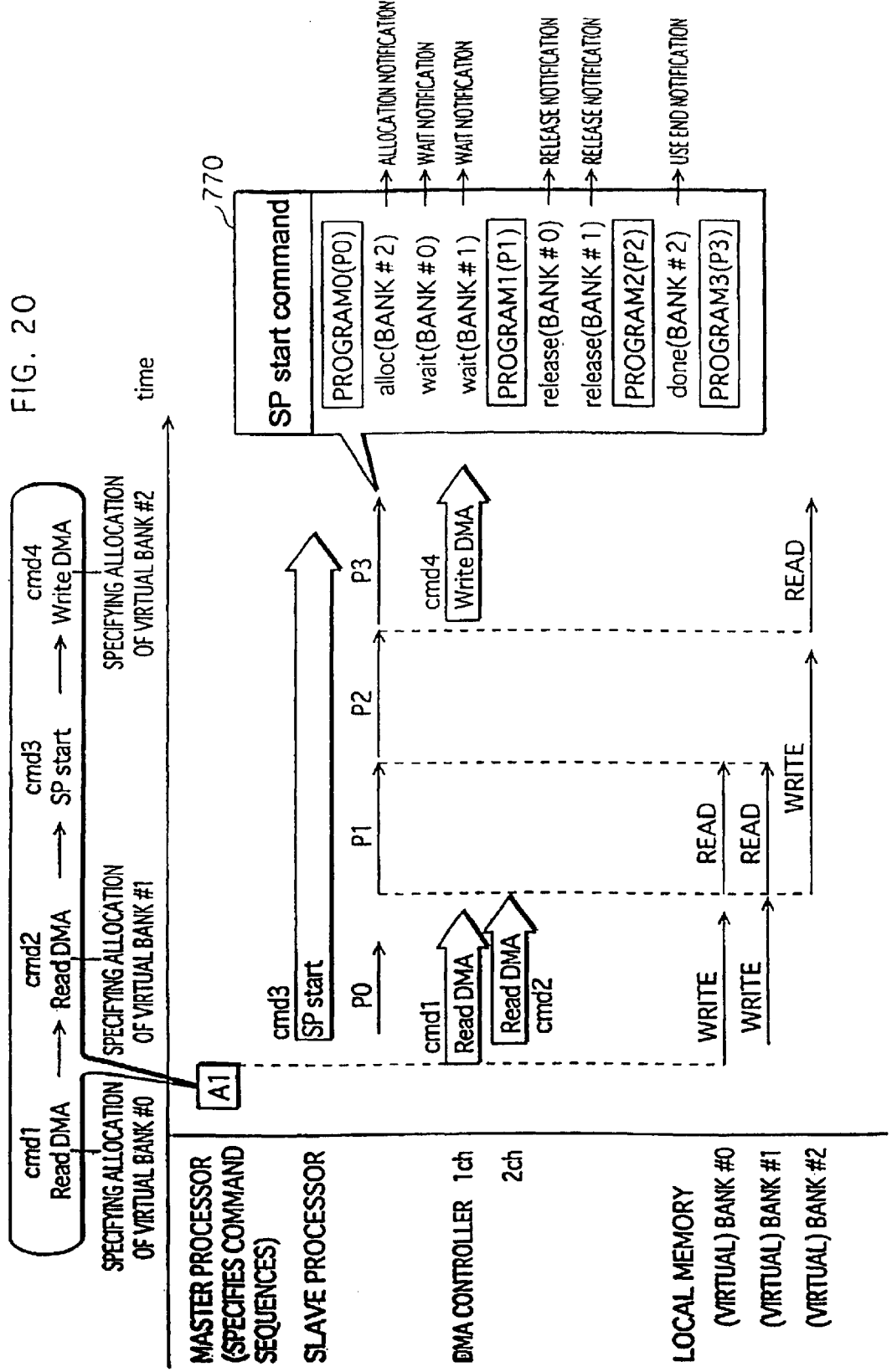
FIG. 20 is a time chart showing changes in a concurrent execution of a plurality of commands in a command sequence based on an operation example of the execution control unit 660.

FIG. 20 is a time chart showing changes in a concurrent execution of a plurality of commands. Note that the figure includes an example of a program 770 for the slave processor 630.

A command sequence "A1" is composed of commands "cmd1"–"cmd4" which are respectively stored in the command areas in the communication memory 151.

The first command (cmd1) of the command sequence "A1" has an attribute instructing to allocate a memory bank corresponding to a virtual bank number "0" specified in the command, and is a ReadDMA command instructing to transfer data from the main memory 620 to the memory bank corresponding to the virtual bank number "0" in the local memory 131.

The second command (cmd2) of the command sequence "A1" has an attribute instructing to allocate a memory bank corresponding to a virtual bank number "1" specified in the command, and is a ReadDMA command instructing to transfer data from the main memory 620 to the memory bank corresponding to the virtual bank number "1" in the local memory 131.

The third command (cmd3) of the command sequence "A1" is a SPstart command for causing the slave processor 630 to perform a data operation or the like.

The fourth command (cmd4) of the command sequence "A1" has an attribute instructing to allocate a memory bank corresponding to a virtual bank number "2" specified in the command, and is a WriteDMA command instructing to transfer data from the memory bank corresponding to the virtual bank number "1" in the local memory 131 to the main memory 620.

The program 770 is decoded and executed by the slave processor 630 when it executes the SPstart command, and contains the following as shown in FIG. 20, in the order from the top: a program 0 being a set of instructions; the alloc instruction specifying a virtual bank number "2"; the wait instruction specifying a virtual bank number "0"; the wait instruction specifying a virtual bank number "1"; a program 1 being a set of instructions; the release instruction specifying a virtual bank number "0"; the release instruction specifying a virtual bank number "1"; a program 2 being a set of instructions; the done instruction specifying a virtual bank number "2"; and a program 3 being a set of instructions.

For example, the program 0 instructs an initial process such as setting initial values in certain registers in the slave processor 630; the program 1 instructs to perform a calculation by referring to the contents of the memory banks identified by the virtual bank numbers "0" and "1" and store the result into the memory bank identified by the virtual bank number "2"; the program 2 instructs to perform a calculation based on the contents of the memory bank identified by the virtual bank number "2" and update the memory bank identified by the virtual bank number "2" in accordance with the calculation result; and the program 3 instructs to set a value in a register that may be referred to in the next execution, reflecting part of the calculation result of the program 2.

Now, a specific example of the operation of the execution control unit 660 will be described, starting with the state in which no command has been executed. The execution control unit 660 performs the execution control process (see FIG. 16) After judging negatively in step S701 and positively in steps S702 and S703, the execution control unit 660 refers to the command queue 152 to detect the first command, namely the ReadDMA command (cmd1), and decodes the ReadDMA command (cmd1) (step S705). Then, since both channels for the DMA controller are not occupied (step S706, "yes"), and enough physical banks in the local memory 131 can be used (step S707, "yes"), the execution control unit 660 deletes the command ID from the command queue 152 (step S708), stores a next command ID of the next command (cmd2) into the next command ID holding unit #1 (step S709), and updates the bank table 663 by correlating the virtual bank number "0" with the physical bank number "0", and for the same element, by setting the SPstate column 668 to the indefinite state and setting the DMA state column 669 to the used state (step S710). The execution control unit 660 then stores the command ID of the command cmd1 and the hardware type information indicating the first channel of the DMA controller into the working memory area in a manner that correspondence between them is indicated, and instructs the first channel of the DMA controller 640 to start to execute the ReadDMA command (cmd1) (step S711). Note that with the performance of step S711, it is recognized that a command in the command sequence #1 is being executed.

While the first channel of the DMA controller 640 is executing the ReadDMA command (cmd1), the execution control unit 660 continues the execution control process. In the next round of step S701, the execution control unit 660 judges that a command in the command sequence #1 is being executed (step S701, "yes"), and in the following step S704, judges that a command ID held by the next command ID holding unit 161 is not "0" (step S704, "no"). The execution control unit 660 then decodes the next command (cmd2), the ReadDMA command, that is indicated by the command ID held by the next command ID holding unit #1 (step S705). Then, since the second channel for the DMA controller is not occupied (step S706, "yes"), and enough physical banks in the local memory 131 can be used (step S707, "yes"), the execution control unit 660 stores a next command ID of the next command (cmd3) into the next command ID holding unit #1 (step S709), and updates the bank table 663 by correlating the virtual bank number "1" with the physical bank number "1", and for the same element, by setting the SPstate column 668 to the indefinite state and setting the DMA state column 669 to the used state (step S710). The execution control unit 660 then stores the command ID of the command cmd2 and the hardware type information indicating the second channel of the DMA controller into the working memory area in a manner that correspondence between them is indicated, and instructs the second channel of the DMA controller 640 to start to execute the ReadDMA command (cmd2) (step S711) for data transfer.

While the second channel of the DMA controller 640 is executing the ReadDMA command (cmd2), the execution control unit 660 continues the execution control process. In the next round of step S701, the execution control unit 660 judges that a command in the command sequence #1 is being executed (step s701, "yes"), and in the following step S704, judges that a command ID held by the next command ID holding unit 161 is not "0" (step s704, "no"). The execution control unit 660 then decodes the next command (cmd3), the SPstart command, that is indicated by the command ID held by the next command ID holding unit #1 (step S705). Then, since the slave processor 630 is available (step S706, "yes"), and no memory bank is required for the command (step S707, "yes"), the execution control unit 660 stores a next command ID of the next command (cmd4) into the next command ID holding unit #1 (step S709), and skips the updating of the bank table 663 because the allocation of a memory bank is not instructed, the execution control unit 660 then stores the command ID of the command cmd3 and the hardware type information indicating the slave processor into the working memory area in a manner that correspondence between them is indicated, and instructs the slave processor 630 to start to execute the SPstart command (cmd3) (step S711).

After instructed by the execution control unit 660 to start to execute the SPstart command (cmd3), the slave processor 630 starts to decode and execute each instruction in the program 770 that corresponds to the SPstart command. The slave processor 630 first executes the program 0, then decodes the alloc instruction, and transmits an allocation notification specifying a virtual bank number "2" to the memory notifying unit 664.

The memory notifying unit 664 performs the process of memory management during command execution (see FIGS. 18 and 19). Upon receiving the allocation notification from the slave processor 630 (step S741, "yes"), the memory notifying unit 664 refers to the bank table 663 to find that the specified virtual bank number "2" and the command sequence #1 have not been correlated with any physical bank number (step S742, no), but finds that there is a not-allocated physical bank number (step S743). Therefore, the memory notifying unit 664 updates the bank table 663 by correlating the virtual bank number "2" with the not-allocated physical bank number "2", and for the same element, by setting the SP state column 668 to the used state (step S744), then notifies the slave processor 630 of the physical bank number "2" together with the virtual bank number "2" (step S745).

Upon receiving the notification, the slave processor 630 decodes the wait instruction, transmits a wait notification specifying a virtual bank number "0" to the memory notifying unit 664.

Upon receiving the wait notification from the slave processor 630, with specification of the virtual bank number "0" (step S751, "yes"), the memory notifying unit 664 refers to the bank table 663 to see if the DMA state column 669 correlated with the virtual bank number "0" and the command sequence #1 indicates the indefinite state, that is, whether the memory bank corresponding to the physical bank number "0" is usable (step S747).

Here, if the ReadDMA command (cmd1) is being executed by the DMA controller 640, the memory notifying unit 664 judges that the memory bank corresponding to the physical bank number "0" is not usable (step S747, "no"), and updates the bank table 663 by setting the SP state column 668 in the same element as the virtual bank number "0" to the wait state (step S748).

After instructing the slave processor 630 to execute the SPstart command (cmd3), the execution control unit 660 decodes the next command (cmd4) in the command sequence A1, namely the WriteDMA command (step S701, "yes"; step S702, "no"; and step S705). However, at this stage, it is judged that no channel of the DMA controller 640 is not available since execution of any of the ReadDMA commands has not been completed (step S706, "no"). As a result, the WriteDMA command (cmd4) is not executed.

At a later time, when the first channel of the DMA controller 640 completes the execution of the ReadDMA command (cmd1), the DMA controller 640 transmits a use end notification to the memory notifying unit 664. Upon receiving the use end notification (step S754, "yes"), the memory notifying unit 664 updates the bank table 663 by changing the DMA state column 669 in the same element as the virtual bank number "0" to the indefinite state (step S755). Then, since the SP state column corresponding to the virtual bank number "0" indicates the wait state (step S756, "yes"), and the memory bank corresponding to the virtual bank number "0" can be used because the DMA state column 669 in the same element indicates the indefinite state (step S757, "yes"), the memory notifying unit 664 updates the bank table 663 by changing the SP state column 668 in the same element to the used state (step S758), and notifies the slave processor 630 of the physical bank number "0" together with the virtual bank number "0" (step S759).

Upon receiving the notification, the slave processor 630 decodes the next wait instruction, and transmits a wait notification specifying a virtual bank number "1" to the memory notifying unit 664.

Upon receiving the wait notification from the slave processor 630, with specification of the virtual bank number "1" (step S751, "yes"), the memory notifying unit 664 refers to the bank table 663 to see if the DMA state column 669 correlated with the virtual bank number "1" and the command sequence #1 indicates the indefinite state, that is, whether the memory bank corresponding to the physical bank number "1" is usable (step S747). At this stage, however, the memory bank corresponding to the virtual bank number "1" is being used in the execution of the ReadDMA command (cmd2) by the DMA controller 640, and cannot be used (step S747, "no"). The memory notifying unit 664 therefore updates the bank table 663 by setting the SP state column 668 in the same element as the virtual bank number "1" to the wait state (step S748).

At this point of time, the execution control unit 660 has started to decode the next command (cmd4) in the command sequence A1, namely the WriteDMA command (step S701, "yes"; step S702, "no"; and step S705), and execution of the ReadDMA command (cmd1) has been completed. As a result, since the first channel of the DMA controller 640 is available, it is judged positively in step S706 (step S706, "yes"). However, in the next step S707, it is judged negatively since the memory bank corresponding to the virtual bank number "2", which is requested by the WriteDMA command to be allocated, has been allocated by the alloc instruction to the slave processor 630, and cannot be used by the DMA controller 640 (step S707, "no"). Accordingly, execution of the WriteDMA command (cmd4) is not started yet.

At a later time, when the second channel of the DMA controller 640 completes the execution of the ReadDMA command (cmd2), the DMA controller 640 transmits a use end notification to the memory notifying unit 664. Upon receiving the use end notification (step S754, "yes"), the memory notifying unit 664 updates the bank table 663 by changing the DMA state column 669 in the same element as the virtual bank number "1" to the indefinite state (step S755). Then, since the SP state column 668 corresponding to the virtual bank number "1" indicates the wait state (step S756, "yes"), and the memory bank corresponding to the virtual bank number "1" can be used because the DMA state column 669 in the same element indicates the indefinite state (step S757, "yes"), the memory notifying unit 664 updates the bank table 663 by changing the SP state column 668 in the same element to the used state (step S758), and notifies the slave processor 630 of the physical bank number "1" together with the virtual bank number "1" (step S759).

Upon receiving the notification, the slave processor 630 accesses each memory bank identified by any virtual bank number (any of "0" to "2") by decoding and executing each instruction in the program 1. The slave processor 630 then decodes the next instruction, namely the release instruction, and transmits a release notification specifying a virtual bank number "0" to the memory notifying unit 664.

Upon receiving the release notification from the slave processor 630, with specification of the virtual bank number "0" (step S752, "yes"), the memory notifying unit 664 refers to the bank table 663 to detect an element in which a physical bank number is correlated with the virtual bank number "0", and updates the bank table 663 by replacing values in the execution command sequence identification number column 666 and the virtual bank number column 667 in the element with the values "3" and "4", respectively, to indicate the release of the physical bank number, and replacing values in the SP state column 668 and the DMA state column 669 with the values indicating the indefinite state (step S753).

The slave processor 630 then decodes the next instruction, namely the release instruction, and transmits a release notification specifying a virtual bank number "1" to the memory notifying unit 664.

Upon receiving the release notification from the slave processor 630, with specification of the virtual bank number "1" (step S752, "yes"), the memory notifying unit 664 refers to the bank table 663 to detect an element in which a physical bank number is correlated with the virtual bank number "1" and the command sequence #1, and updates the bank table 663 to indicate the release of the physical bank number (step S753).

The slave processor 630 then decodes and executes each instruction in the program 2, and accesses a memory bank identified by a virtual bank number "2". The slave processor 630 then decodes the done instruction, and transmits a use end notification specifying the virtual bank number "2" to the memory notifying unit 664. After this, the slave processor 630 then decodes and executes each instruction in the program 3.

Upon receiving the use end notification from the slave processor 630, with specification of the virtual bank number "2" (step S754, "yes"), the memory notifying unit 664 updates the bank table 663 by changing the SP state column 668 in the same element as the virtual bank number "2" to the indefinite state (step S755).

At a later time, the execution control unit 660 decodes the next command (cmd4) in the command sequence A1, namely the WriteDMA command (step S701, "yes"; step S702, "no"; and step S705). Since the DMA controller 640 is available, it is judged positively in step S706 (step S706, "yes"). In the next step S707, it is judged positively since the memory bank corresponding to the virtual bank number "2", which is requested by the WriteDMA command to be allocated, is usable, which is indicated by the fact that in the bank table 663, the SP state column 668 corresponding to the virtual bank number "2" indicates the indefinite state (step S707, "yes"). Accordingly, the execution control unit 660 stores a next command ID of the next command ID into the next command ID holding unit #1 (step S709), updates the bank table 663 by setting the DMA state column 669 corresponding to the virtual bank number "2" to the used state (step S710), stores the command ID and the like into the working memory area, and instructs the DMA controller 640 to start to execute the WriteDMA command (cmd4) (step S711).

As described above, the command execution control apparatus 650 of the processing system 600 causes the slave hardware units to execute commands in each command sequence in the order of arrangement, and allows slave hardware units to execute as many commands as possible concurrently. Also, as described above, in the concurrent executions of commands, each command is processed in synchronization with each other by the construction in which the slave hardware units transmit notifications such as those for allocating or releasing memory banks, and in which the execution control unit 660 or the like controls the access to the memory based on the bank table 663.

Embodiment 4

The processing system in Embodiment 4 is basically the same as the processing system 100 in Embodiment 1, though a slight modification has been added to it. The present modified processing system is characterized by supporting a suspense command. The suspense command is stored in the communication memory 151, constitutes a command sequence, and is referred to by the execution control unit, as is the case with the commands for the slave hardware units shown in Embodiment 1. The suspense command resembles to the commands described in Embodiment 1 in terms of the format, but differs from them in that it instructs the execution control unit to cause slave hardware units to suspend, while the commands in Embodiment 1 specify operations of the slave hardware units.

4-1. Construction

Figure 21:
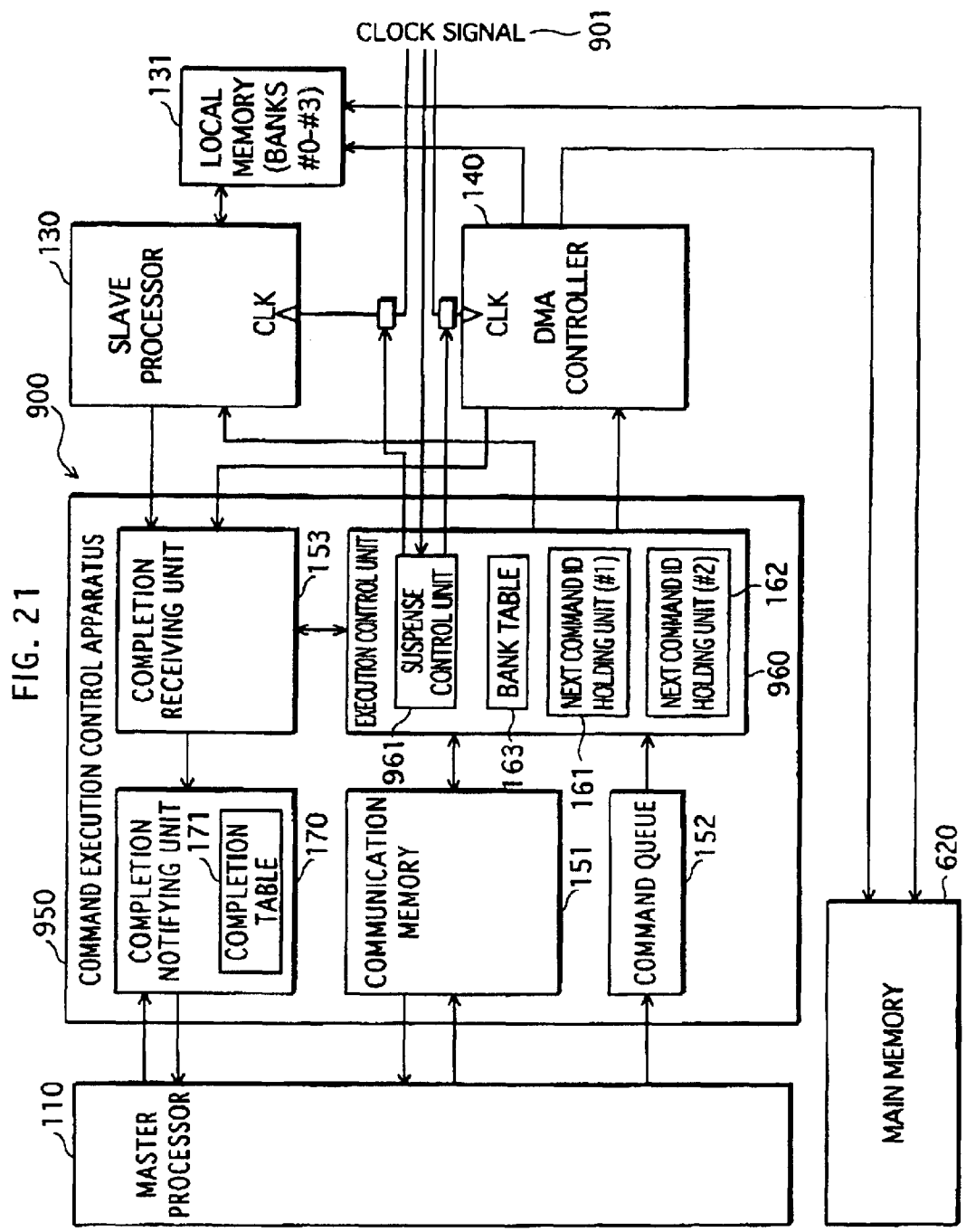
FIG. 21 shows the construction of the processing system 900 in Embodiment 4.

FIG. 21 shows the construction of the processing system 900 in Embodiment 4.

As shown in FIG. 21, the processing system 900 includes a master processor 110, a main memory 120, a slave processor 130, a local memory 131, a DMA controller 140, and a command execution control apparatus 950, and is formed in one semiconductor chip. It should be noted here that the processing systems 100 and 900 have the same components to which the same numbers are assigned in FIGS. 1 and 21, and such components are not explained here.

The slave processor 130, though not specifically described in Embodiment 1, receives input of a clock signal and operates in synchronization with the clock signal. Similarly, the DMA controller 140 receives input of a clock signal and transfers data in synchronization with the clock signal.

The command execution control apparatus 950 is the same as the command execution control apparatus 150 in Embodiment 1 except that it includes an execution control unit 960 that includes a suspense control unit 961 that receives input of a clock signal from inside or outside the 1-chip semiconductor and decodes and executes the suspense command. Note that the command execution control apparatus 950 may be achieved by a CPU or a memory.

The command execution control apparatus 950 performs an execution control process that is basically the same as the execution control process described in Embodiment 1 (see FIGS. 10 and 11). However, when the suspense command is decoded in step S24, it skips steps S25, S26, S29, and S30, and after performing step S28, it instructs the suspense control unit 961 to suspend supplying the clock signal to the slave hardware unit specified by the suspense command. Similarly, when the suspense command is decoded in step S34, it skips steps S35, S36, S39, and S40, and after performing step S38, it instructs the suspense control unit 961 to suspend supplying the clock signal to the slave hardware unit specified by the suspense command.

The suspense control unit 961 suspends supply of the clock signal to the specified slave hardware unit for a time period specified by the suspend command, by counting clocks in the input clock signal.

4-2. Command Format

FIG. 22 shows the format of the suspense command and commands for slave hardware units, the commands being elements of command sequences and are stored in the communication memory 151.

In FIG. 22, a command 800 is divided into 2-byte elements that are shown in rows, and each element contains information shown in columns: a position column 801 and an item column 802. The position column 801 has hexadecimal numerals that indicate the positions of the 2-byte elements in the command 800 by the byte numbers (byte 0 to byte E). The item column 802 shows meaning of the contents of each 2-byte element. The commands for slave hardware units shown in FIG. 22 are basically the same as those shown in FIG. 3.

One command has 16 bytes. Of the 16 bytes, the first two bytes starting with byte 0 indicate a command type and attribute, the next two bytes starting with byte 2 include a next command ID, and each of the following elements indicates a parameter for each slave hardware unit.

In the first two bytes of the command 800, the first two bits specifies a command type of the command 800 which is one of a command for the slave processor, a command for the DMA controller, and the suspense command. In the case of the suspense command, the command has an attribute specifying the type of a slave hardware unit that is to be suspended.

The next command ID store in the second two bytes starting with byte 2 is a command ID indicating a location in the communication memory 151 of the next command in a command sequence that contains the command 800.

In the case of the suspense command, the command has a parameter indicating the number of suspense cycles.

4-3. Suspense Operation

The execution control unit 960 decodes the suspense command and instructs the suspense control unit 961 to suspend supply of the clock signal to a slave hardware unit specified by the suspense command. Upon receiving the instruction, the suspense control unit 961 interrupts supply of the clock signal to the specified slave hardware unit, continues the interruption of supply until it counts as many clocks in the input clock signal as correspond to the number of suspense cycles specified by a parameter in the suspense command, and cancels the interruption of supply after it completes the counting. The interruption of supply is achieved by, for example, controlling the potential of the clock signal to a constant value.

It is accordingly possible for the master processor 110 to suspend desired slave hardware units for desired periods by storing suspense commands of desired contents into the communication memory 151 to cause the command execution control apparatus 950 to execute the suspense commands as elements of command sequences. This enables the power consumption to be reduced by suspending a slave hardware unit for a period during which the slave hardware unit is expected to be non-operative.

Supplemental Remarks

Although the circuit group control technique of the present invention has been described based on four embodiments, the present invention is not limited to these embodiments. The present invention can be modified as follows.

(1) The function assignment to the completion notifying unit 170, the completion receiving unit 153, and the execution control unit 160 described in Embodiment 1 is merely an example, and maybe changed in a different way. Also, interfaces between functional components can be changed.

(2) In Embodiments 1–4, two slave hardware units (the slave processor and the DMA controller) are shown. However, the command execution control apparatus may instruct three or more slave hardware units to execute commands in so far as the slave hardware units include at least one pair of slave hardware units that have different functions. The slave hardware units may be other than the slave processor and the DMA controller in so far as they execute the commands. In the case where a plurality of slave hardware units share a memory bank, either such a memory as has enough memory banks that can be concurrently accessed by the plurality of slave hardware units is used or a control is exercised so as to shift the timing with which each slave hardware unit accesses the memory.

Embodiment 1 shows an example in which the command execution control apparatus allows two slave hardware units to execute two command sequences concurrently. However, it is possible to allow three or more slave hardware units to execute three or more command sequences concurrently by providing three or more next command ID holding units, and preparing to perform three or more units of processes, regarding the process shown in FIG. 10 as one unit.

In Embodiments 1–4, the processing system is formed in one semiconductor chip. However, the processing system is not necessarily be formed in one semiconductor chip. For example, each of the master processor 110, slave processor 130, DMA controller 140, and command execution control apparatus 150 may be formed as an independent part.

(3) Embodiment 1 shows an example in which the master processor 110 specifies two different command sequences shown in FIG. 5. However, even if the master processor 110 specifies a plurality of command sequences which each have the same contents, the advantageous effect of using slave hardware units efficiently can be obtained.

The command sequence specification interface described in Embodiment 1 may be replaced with another method. For example, instead of chaining commands by using command IDs as pointers, the master processor 110 may store all commands constituting a command sequence into areas at consecutive addresses in the communication memory 151. In this case, the execution control unit 160 can cause slave hardware units to execute corresponding commands in order of the addresses. It should be noted here that when the pointer chaining method is adopted, a new command sequence can easily be created by using or replacing commands of previously stored command sequences, for example, and the communication memory is efficiently used.

In Embodiments 1–4, each command sequence is specified by storing the command ID of the first command in each command sequence into the command queue. However, the command sequence specification method is not limited to this. For example, the following method is possible. The master processor 110 may pass all commands constituting a command sequence to the command execution control apparatus 150. Upon receiving the commands, the command execution control apparatus 150 correlates the commands with command sequence numbers and transmits the command sequence numbers to the master processor 110. The master processor 110 then stores the received command sequence numbers into the command queue.

It should be noted here that the command sequence specification interface described in Embodiment 1 is most preferable from the viewpoints of: reduction in amount of commands transferred from the master processor; improvement in reuse of transferred commands; and high-speed processing by the command execution control apparatus after it receives specification of a command sequence.

Also, the command execution control apparatus 150 may further include a precedence command queue other than the command queue 152. The precedence command queue also stores the command IDs of the first commands in the respective command sequences. With this construction, the execution control unit 160 causes the slave hardware units to execute each command in the command sequences identified by the command IDs stored in the precedence command queue, in which these commands take precedence over commands in each of the command sequences identified by the command IDs stored in the command queue 152. Such a precedence command queue may be used for debugging, for example.

(4) In Embodiment 1 or the like, the execution control unit 160 instructs a slave hardware unit to execute a command, by transmitting necessary data for the execution of the command to the slave hardware unit. The method to instruct execution of a command is not limited to this. For example, the slave processor may be connected to the communication memory in advance, and the execution control apparatus 160 instructs a slave hardware unit to execute a command by conveying a physical bank number, as necessary, as well as a command ID to the slave processor. Upon receiving these pieces of information, the slave processor reads a corresponding command from the communication memory for the execution. Alternatively, the system may be constructed so that the slave hardware unit can refer to the bank table 163, and the execution control apparatus 160 need not notify the slave hardware unit of the physical bank number.

(5) The system may be constructed so that either the execution control unit 160 or the slave processor 130 can update the commands stored in the command areas in the communication memory 151 in Embodiment 1, and also can update the parameters and the like in the commands. For example, the slave processor 130 is connected to the communication memory 151 in advance, and the slave processor 130 may change part of the parameters and the like when it execute a command for the first time around. With this construction, it is possible to make a process performed by the second execution of a command different from that performed by the initial execution when a same command sequence is specified by the master processor 110 a plurality of times.

(6) In Embodiments 1–4, correspondences between the virtual bank numbers and physical bank numbers are managed by the bank table. Including the case, the bank table may be used to show correspondences between logical addresses and physical addresses, where the logical addresses identify virtual locations to be accessed, and the physical addresses identify physical locations to be accessed in reality. Furthermore, logical addresses specified by commands may be converted into physical addresses.

(7) Memory areas such as the working memory area in the execution control unit 160, the next command ID holding units 161 and 162, the bank table 163, and the completion table 171 may be achieved in any form in so far as they can store data. For example, the memory areas maybe an area of a typical memory, or may be a storage device.

(8) The execution control process performed by the execution control unit in Embodiments 1–4 may be specified by a program or may be performed by hardware such as a logical circuit or the like.

The execution control process shown in Embodiments 1–4 may be modified so that when either of two commands in different command sequences can be executed, one of the two commands may be given higher priority in accordance with a predetermined rule that is made in advance for determining priority levels in relation to execution of commands of different command sequences. An example of such a rule is that a command identified by a command ID of other than "0" stored in the next command ID holding unit should be given higher priority than a command identified by a command ID stored in the command queue.

Also, in the execution control process, if it is judged in step S25 that enough physical banks in the local memory 131 cannot be used, or if it is judged in step S26 that the slave hardware unit is not available, steps S22–S30 may be skipped until there is found a not-allocated physical bank number and the slave hardware unit becomes available. Similarly, if it is judged in step S35 that enough physical banks in the local memory 131 cannot be used, or if it is judged in step S36 that the slave hardware unit is not available, steps S32–S40 may be skipped until there is found a not-allocated physical bank number and the slave hardware unit becomes available.

(9) The execution control unit 660 in Embodiment 3 can execute two command sequences concurrently. However, the execution control unit may execute commands in only one command sequence. In this case, however, the execution control unit 660 can cause a plurality of slave hardware units to execute a plurality of commands in the same command sequence concurrently.

(10) In Embodiment 3, the DMA controller notifies the execution control unit 660 of completion of use of a memory bank, by specifying a channel number. However, the execution control unit 660 itself may perform the same process in response to the notification of completion of use of a memory bank and update the bank table 663, as described in Embodiment 3, with the timing that execution of a command instructing a data transfer is completed.

Also, the interface between the execution control unit 660 and each slave hardware unit in managing the right to use memory banks using the table 663 is not limited to the method shown in Embodiment 3, but may be any method in so far as the slave processor can transmit a notification, such as a notification requesting to obtain the right to use a memory bank or a release notification, to the execution control unit 660 while executing a command, and in so far as a control is exercised so that a memory bank is not accessed by two or more slave hardware units at the same time.

(11) A program for causing a CPU, or a computer to execute the execution control process or the process of memory management during command execution shown in Embodiments 1–4 (for example, the procedures shown in FIGS. 10, 11, 16–19) may be distributed via a communication path or the like, or via a recording medium on which the program is recorded. Such recording media include IC card, optical disc, flexible disk, and ROM. The distributed program is stored in a memory or the like from which a computer can read the program. The computer then executes the program to achieve the execution control process or the process of memory management during command execution as described in the above embodiments.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A circuit group control system for controlling a plurality of circuits in accordance with an instruction by a master processor, comprising:

a command sequence specification receiving unit operable to receive, from the master processor, specification of a command sequence composed of a plurality of commands, each command being to be executed by one of the plurality of circuits; and an execution control unit operable to cause any available circuits among the plurality of circuits to start executing corresponding commands among the plurality of commands one by one in order of arrangement in the command sequence, wherein the execution control unit includes a concurrent execution control unit operable to, while a circuit is executing a command, detect another command that can be executed by another circuit and cause the other circuit to execute the other command concurrently, wherein the plurality of circuits includes two circuits that are different in function, the command sequence specification receiving unit receives specification of a plurality of command sequences from the master processor, the execution control unit causes any available circuits among the plurality of circuits to execute corresponding commands in a manner in which commands constituting each command sequence are to be executed one by one in order of arrangement in each command sequence, wherein the concurrent execution control unit, while one of the two circuits is executing a command in a command sequence, detects another command in another command sequence that can be executed by another one of the two circuits and causes the other circuit to execute the other command, wherein each of the plurality of circuits can access a same memory, each command sequence includes a memory access command instructing a circuit to access the memory, the execution control unit includes a memory access control unit operable to control two or more circuits that are to execute memory access commands of different command sequences concurrently, to access different areas in the memory, respectively, wherein each memory access command includes a logical address of a location to be accessed, the memory access control unit, when two or more circuits are to execute memory access commands of different command sequences concurrently, converts each logical address contained in the memory access commands to a physical address, each physical address being assigned to a different command sequence, so that the two or more circuits use physical addresses converted from logical addresses to identify areas in the memory to access, respectively.

2. The circuit group control system of claim 1, wherein the memory access control unit holds an area ID information table that includes area ID information, each piece of which correlates a logical address with a physical address converted from the logical address and with a memory area, the memory access control unit, when converting a logical address to a physical address, refers to the area ID information table so as not to select in the conversion a physical address that is contained in a piece of area ID information in the table, each command sequence includes a command instructing release of a memory area that has been specified by a preceding command in a same command sequence as an access target, specifying a logical address corresponding to the memory area to be released, and the memory access control unit deletes a piece of area ID information corresponding to the specified logical address from the area ID information table before causing a circuit to execute the command instructing release of the memory area.

3. A circuit group control system for controlling a plurality of circuits in accordance with an instruction by a master processor, comprising:

a command sequence specification receiving unit operable to receive, from the master processor, specification of a command sequence composed of a plurality of commands, each command being to be executed by one of the plurality of circuits; and an execution control unit operable to cause any available circuits among the plurality of circuits to start executing corresponding commands among the plurality of commands one by one in order of arrangement in the command sequence, wherein the execution control unit includes a concurrent execution control unit operable to, while a circuit is executing, a command, detect another command that can be executed by another circuit and cause the other circuit to execute the other command concurrently, wherein the plurality of circuits includes two circuits that are different in function, the command sequence specification receiving unit receives specification of a plurality of command sequences from the master processor, the execution control unit causes any available circuits among the plurality of circuits to execute corresponding commands in a manner in which commands constituting each command sequence are to be executed one by one in order of arrangement in each command sequence, wherein the concurrent execution control unit, while one of the two circuits is executing a command in a command sequence, detects another command in another command sequence that can be executed by another one of the two circuits and causes the other circuit to execute the other command, wherein each of the plurality of circuits can access a same memory, each command sequence includes a memory access command instructing a circuit to access the memory, each memory access command contains either a share attribute or a separate attribute, the share attribute specifying an access to a shared memory area that can be accessed by a plurality of command sequences, and the separate attribute specifying an access to one of memory areas which are respectively assigned to the plurality of command sequences, the execution control unit includes a memory access control unit operable to control two or more circuits that are to execute memory access commands containing the separate attribute of different command sequences concurrently, to respectively access separate areas in the memory, and to control two or more circuits that are to execute memory access commands containing the share attribute of different command sequences concurrently, to access the shared memory area in the memory.

4. A circuit group control system for controlling a plurality of circuits in accordance with an instruction by a master processor, comprising;

a command sequence specification receiving unit operable to receive, from the master processor, specification of a command sequence composed of a plurality of commands, each command being to be executed by one of the plurality of circuits; and an execution control unit operable to cause any available circuits among the plurality of circuits to start executing corresponding commands among the plurality of commands one by one in order of arrangement in the command sequence, wherein the execution control unit includes a concurrent execution control unit operable to, while a circuit is executing a command, detect another command that can be executed by another circuit and cause the other circuit to execute the other command concurrently, wherein the plurality of circuits includes two circuits that are different in function, the command sequence specification receiving unit receives specification of a plurality of command sequences from the master processor, the execution control unit causes any available circuits among the plurality of circuits to execute corresponding commands in a manner in which commands constituting each command sequence are to be executed one by one in order of arrangement in each command sequence, wherein the concurrent execution control unit, while one of the two circuits is executing a command in a command sequence, detects another command in another command sequence that can be executed by another one of the two circuits and causes the other circuit to execute the other command, wherein the command sequence specification receiving unit includes a command storage memory, and recognizes the specification of the plurality of command sequences when the master processor writes the plurality of commands for each command sequence into the command storage memory, and the execution control unit causes any available circuits among the plurality of circuits to execute corresponding commands among the plurality of commands stored in the command storage memory, one by one in order of arrangement in each command sequence.

5. The circuit group control system of claim 4, wherein each command stored in the command storage memory has a pointer indicating a location in the command storage memory of a next command that is to be executed next to the command in a same command sequence, and the execution control unit causes any available circuits among the plurality of circuits to execute the plurality of commands one by one in order of arrangement, by referring to the pointer in each command to recognize the location in the command storage memory of the next command.

6. The circuit group control system of claim 4, wherein the plurality of commands are respectively stored in areas of the command storage memory at sequential addresses therein in order of arrangement in the command sequence to which the plurality of commands belong, and the execution control unit causes any available circuits among the plurality of circuits to execute the plurality of commands one by one in order of arrangement, by referring to the areas of the command storage memory in order of the sequential addresses.

7. The circuit group control system of claim 4 wherein further comprising the plurality of circuits, wherein each command contains a parameter, the command storage memory is connected to one or more circuits among the plurality of circuits, and when one of the one or more circuits is instructed by the execution control unit to execute a command, the instructed circuit accesses a parameter in the command stored in the command storage memory.

8. The circuit group control system of claim 4 wherein the specification of a command sequence is made by a command sequence identifier that identifies the command sequence composed of the plurality of commands stored in the command storage memory, and the execution control unit causes any available circuits among the plurality of circuits to execute the plurality of commands in the command sequence identified by the command sequence identifier, one by one in order of arrangement in the command sequence.

9. The circuit group control system of claim 8, wherein the circuit group control system comprises the master processor, and the master processor specifies a plurality of same command sequence identifiers.

10. The circuit group control system of claim 8, wherein the command sequence identifier is a pointer indicating a location of a command in the command storage memory, and the execution control unit recognizes the command at the location indicated by the pointer as a first command in a command sequence, and causes any available circuits among the plurality of circuits to execute the plurality of commands one by one in order of arrangement, starting with the command at the location indicated by the pointer.

11. The circuit group control system of claim 8, wherein the command sequence specification receiving unit includes a first FIFO buffer for storing command sequence identifiers, the master processor, after writing a plurality of commands into the command storage memory, writes command sequence identifiers into the first FIFO buffer, the command sequence identifiers identifying command sequences composed of commands among the plurality of commands, the command sequence specification receiving unit thereby recognizing specification of the command sequences, and the execution control unit causes any available circuits among the plurality of circuits to execute commands in each of the command sequences identified by the command sequence identifiers in the first FIFO buffer.

12. The circuit group control system of claim 11, wherein the command sequence specification receiving unit further includes a second FIFO buffer for storing command sequence identifiers, the master processor, after writing a plurality of commands into the command storage memory, writes command sequence identifiers into the second FIFO buffer, the command sequence identifiers identifying command sequences composed of commands among the plurality of commands, the command sequence specification receiving unit thereby also recognizing specification of the command sequences, and the execution control unit causes any available circuits among the plurality of circuits to execute commands in each of the command sequences identified by the command sequence identifiers in the second FIFO buffer, taking precedence over commands in each of the command sequences identified by the command sequence identifiers in the first FIFO buffer.

13. The circuit group control system of claim 4 further comprising a command updating unit operable to update the commands stored in the command storage memory.

14. A circuit group control system for controlling a plurality of circuits in accordance with an instruction by a master processor, comprising:

a command sequence specification receiving unit operable to receive, from the master processor, specification of a command sequence composed of a plurality of commands, each command being to be executed by one of the plurality of circuits; and an execution control unit operable to cause any available circuits among the plurality of circuits to start executing corresponding commands among the plurality of commands one by one in order of arrangement in the command sequence, wherein the execution control unit includes a concurrent execution control unit operable to, while a circuit is executing a command, detect another command that can be executed by another circuit and cause the other circuit to execute the other command concurrently, wherein the concurrent execution control unit, while a circuit is executing a command in a command sequence, detects another command in the command sequence that can be executed by another circuit and causes the other circuit to execute the other command concurrently, wherein each of the plurality of circuits can access a same memory, each command sequence includes a memory specification attached command that contains (i) an attribute specifying either allocation or release of a memory area and (ii) a bank number that identifies the specified memory area, the execution control unit holds memory management information for managing whether each memory area is used or not used, even if a command to be executed next in a command sequence is a memory specification attached command containing an attribute specifying allocation of a memory area identified by a bank number contained therein, the execution control unit does not cause a circuit to execute the command to be executed next in so far as the memory management information indicates that the memory area specified by the memory specification attached command to be executed next is used, when causing a circuit to execute a memory specification attached command containing an attribute specifying allocation of a memory area, the execution control unit updates the memory management information to indicate that a memory area specified by the memory specification attached command is used, and when causing a circuit to execute a memory specification attached command containing an attribute specifying release of a memory area, the execution control unit updates the memory management information to indicate that a memory area specified by the memory specification attached command is not used.

15. The circuit group control system of claim 14, wherein the plurality of circuits include some circuits having a function to, while executing a predetermined command, send the execution control unit a notification of release of a memory area together with a bank number identifying the released memory area, and the execution control unit, after receiving a notification of release of a memory area from any circuit, updates the memory management information to indicate that the memory area identified by a bank number attached to the notification is not used.

16. A circuit group control system for controlling a plurality of circuits in accordance with an instruction by a master processor, comprising:

a command sequence specification receiving unit operable to receive, from the master processor, specification of a command sequence composed of a plurality of commands, each command being to be executed by one of the plurality of circuits; and an execution control unit operable to cause any available circuits among the plurality of circuits to start executing corresponding commands among the plurality of commands one by one in order of arrangement in the command sequence, wherein the execution control unit includes a concurrent execution control unit operable to, while, a circuit is executing a command, detect another command that can be executed by another circuit and cause the other circuit to execute the other command concurrently, wherein the concurrent execution control unit, while a circuit is executing a command in a command sequence, detects another command in the command sequence that can be executed by another circuit and causes the other circuit to execute the other command concurrently, wherein each of the plurality of circuits can access a same memory, the plurality of circuits include some circuits having a function to, while executing a predetermined command, send the execution control unit a notification of release of a memory area together with a bank number identifying the released memory area, the plurality of circuits include some circuits having a function to, while executing a predetermined command, send the execution, control unit a request to allocate a memory area together with a bank number identifying the requested memory area, and then suspend the execution of the predetermined command until the some circuits receive a notification of allocation of the requested memory area from the execution control unit, the execution control unit holds memory management information for managing whether each memory area is used or not used, the execution control unit, after receiving a notification of release of a memory area from any circuit, updates the memory management information to indicate that the memory area identified by a bank number attached to the notification is not used, the execution control unit, after receiving a request to allocate a memory area from any circuit, sends a notification of allocation of the requested memory area immediately after the memory management information indicates that the requested memory area is not used, and updates the memory management information to indicate that the requested memory area is used.

17. A circuit group control method for controlling a plurality of circuits in accordance with an instruction by a master processor, comprising:

a command sequence specification receiving step for receiving, from the master processor, specification of a command sequence composed of a plurality of commands, each command being executed by one of the plurality of circuits; and an execution control step for causing any available circuits among the plurality of circuits to start executing corresponding commands among the plurality of commands one by one in order of arrangement in the command sequence, wherein the execution control step includes a concurrent execution control step for, while a circuit is executing a command, detecting another command that can be executed by another circuit and causing the other circuit to execute the other command concurrently, wherein the plurality of circuits includes two circuits that are different in function, the command sequence specification receiving step receives specification of a plurality of command sequences from the master processor, the execution control step causes any available circuits among the plurality of circuits to execute corresponding commands in a manner in which commands constituting each command sequence are to be executed one by one in order of arrangement in each command sequence, wherein the concurrent execution control step, while one of the two circuits is executing a command in a command sequence, detects another command in another command sequence that can be executed by another one of the two circuits and causes the other circuit to execute the other command, wherein each of the plurality of circuits can access a same memory, each command sequence includes a memory access command instructing a circuit to access the memory, the execution control step includes a memory access control step for controlling two or more circuits that are to execute memory access commands of different command sequences concurrently, to access different areas in the memory, respectively, wherein each memory access command includes a logical address of a location to be accessed, the memory access control step, when two or more circuits are to execute memory access commands of different command sequences concurrently, converts each logical address contained in the memory access commands to a physical address, each physical address being assigned to a different command sequence, so that the two or more circuits use physical addresses converted from logical addresses to identify areas in the memory to access, respectively.

18. A circuit group control method for controlling a plurality of circuits in accordance with an instruction by a master processor, comprising:

a command sequence specification receiving step for receiving, from the master processor, specification of a command sequence composed of a plurality of commands, each command being executed by one of the plurality of circuits; and an execution control step for causing any available circuits among the plurality of circuits to start executing corresponding commands among the plurality of commands one by one in order of arrangement in the command sequence, wherein the execution control step includes a concurrent execution control step for, while a circuit is executing a command, detecting another command that can be executed by another circuit and causing the other circuit to execute the other command concurrently, wherein the plurality of circuits includes two circuits that are different in function, the command sequence specification receiving step receives specification of a plurality of command sequences from the master processor, the execution control step causes any available circuits among the plurality of circuits to execute corresponding commands in a manner in which commands constituting each command sequence are to be executed one by one in order of arrangement in each command sequence, wherein the concurrent execution control step, while one of the two circuits is executing a command in a command sequence, detects another command in another command sequence that can be executed by another one of the two circuits and causes the other circuit to execute the other command, wherein each of the plurality of circuits can access a same memory, each command sequence includes a memory access command instructing a circuit to access the memory, each memory access command contains either a share attribute or a separate attribute, the share attribute specifying an access to a shared memory area that can be accessed by a plurality of command sequences, and the separate attribute specifying an access to one of memory areas which are respectively assigned to the plurality of command sequences, the execution control step includes a memory access control step for controlling two or more circuits that are to execute memory access commands containing the separate attribute of different command sequences concurrently, to respectively access separate areas in the memory, and for controlling two or more circuits that are to execute memory access commands containing the share attribute of different command sequences concurrently, to access the shared memory area in the memory.

19. A circuit group control method for controlling a plurality of circuits in accordance with an instruction by a master processor, comprising:

a command sequence specification receiving step for receiving, from the master processor, specification of a command sequence composed of a plurality of commands, each command being executed by one of the plurality of circuits; and an execution control step for causing any available circuits among the plurality of circuits to start executing corresponding commands among the plurality of commands one by one in order of arrangement in the command sequence, wherein the execution control step includes a concurrent execution control step for, while a circuit is executing a command, detecting another command that can be executed by another circuit and causing the other circuit to execute the other command concurrently, wherein the plurality of circuits includes two circuits that are different in function, the command sequence specification receiving step receives specification of a plurality of command sequences from the master processor, the execution control step causes any available circuits among the plurality of circuits to execute corresponding commands in a manner in which commands constituting each command sequence are to be executed one by one in order of arrangement in each command sequence, wherein the concurrent execution control step, while one of the two circuits is executing a command in a command sequence, detects another command in another command sequence that can be executed by another one of the two circuits and causes the other circuit to execute the other command, wherein the command sequence specification receiving step includes accessing a command storage memory, and recognizes the specification of the plurality of command sequences when the master processor writes the plurality of commands for each command sequence into the command storage memory, and the execution control step causes any available circuits among the plurality of circuits to execute corresponding commands among the plurality of commands stored in the command storage memory, one by one in order of arrangement in each command sequence.

20. A circuit group control method for controlling a plurality of circuits in accordance with an instruction by a master processor, comprising:

a command sequence specification receiving step for receiving, from the master processor, specification of a command sequence composed of a plurality of commands, each command being executed by one of the plurality of circuits; and an execution control step for causing any available circuits among the plurality of circuits to start executing corresponding commands among the plurality of commands one by one in order of arrangement in the command sequence, wherein the execution control step includes a concurrent execution control step for, while a circuit is executing a command, detecting another command that can be executed by another circuit and causing the other circuit to execute the other command concurrently, wherein the concurrent execution control step, while a circuit is executing a command in a command sequence, detects another command in the command sequence that can be executed by another circuit and causes the other circuit to execute the other command concurrently, wherein each of the plurality of circuits can access a same memory, each command sequence includes a memory specification attached command that contains (i) an attribute specifying either allocation or release of a memory area and (ii) a bank number that identifies the specified memory area, the execution control step holds memory management information for managing whether each memory area is used or not used, even if a command to be executed next in a command sequence is a memory specification attached command containing an attribute specifying allocation of a memory area identified by a bank number contained therein, the execution control step does not cause a circuit to execute the command to be executed next in so far as the memory management information indicates that the memory area specified by the memory specification attached command to be executed next is used, when causing a circuit to execute a memory specification attached command containing an attribute specifying allocation of a memory area, the execution control step updates the memory management information to indicate that a memory area specified by the memory specification attached command is used, and when causing a circuit to execute a memory specification attached command containing an attribute specifying release of a memory area, the execution control step updates the memory management information to indicate that a memory area specified by the memory specification attached command is not used.

21. A circuit group control method for controlling a plurality of circuits in accordance with an instruction by a master processor, comprising:

a command sequence specification receiving step for receiving, from the master processor, specification of a command sequence composed of a plurality of commands, each command being executed by one of the plurality of circuits; and an execution control step operable to cause any available circuits among the plurality of circuits to start executing corresponding commands among the plurality of commands one by one in order of arrangement in the command sequence, wherein the execution control step includes a concurrent execution control step for, while a circuit is executing a command, detecting another command that can be executed by another circuit and causing the other circuit to execute the other command concurrently, wherein the concurrent execution control step, while a circuit is executing a command in a command sequence, detects another command in the command sequence that can be executed by another circuit and causes the other circuit to execute the other command concurrently, wherein each of the plurality of circuits can access a same memory, the plurality of circuits include some circuits having a function to, while executing a predetermined command, send the execution control step a notification of release of a memory area together with a bank number identifying the released memory area, the plurality of circuits include some circuits having a function to, while executing a predetermined command, send the execution control step a request to allocate a memory area together with a bank number identifying the requested memory area, and then suspend the execution of the predetermined command until the some circuits receive a notification of allocation of the requested memory area from the execution control step, the execution control step holds memory management information for managing whether each memory area is used or not used, the execution control step, after receiving a notification of release of a memory area from any circuit, updates the memory management information to indicate that the memory area identified by a bank number attached to the notification is not used, the execution control step, after receiving a request to allocate a memory area from any circuit, sends a notification of allocation of the requested memory area immediately after the memory management information indicates that the requested memory area is not used, and updates the memory management information to indicate that the requested memory area is used.

22. A program for referring to a memory storing a command sequence composed of a plurality of commands, each command being executed by one of a plurality of circuits, and causing a computer to perform a circuit group control process for controlling the plurality of circuits, the circuit group control process comprising:

a command sequence specification receiving step for receiving, from the master processor, specification of a command sequence composed of a plurality of commands, each command being executed by one of the plurality of circuits; and an execution control step for causing any available circuits among the plurality of circuits to start executing corresponding commands among the plurality of commands one by one in order of arrangement in the command sequence, wherein the execution control step includes a concurrent execution control step for, while a circuit is executing a command, detecting another command that can be executed by another circuit and causing the other circuit to execute the other command concurrently, wherein the plurality of circuits includes two circuits that are different in function, the command sequence specification receiving step receives specification of a plurality of command sequences from the master processor, the execution control step causes any available circuits among the plurality of circuits to execute corresponding commands in a manner in which commands constituting each command sequence are to be executed one by one in order of arrangement in each command sequence, wherein the concurrent execution control step, while one of the two circuits is executing a command in a command sequence, detects another command in another command sequence that can be executed by another one of the two circuits and causes the other circuit to execute the other command, wherein each of the plurality of circuits can access a same memory, each command sequence includes a memory access command instructing a circuit to access the memory, the execution control step includes a memory access control step for controlling two or more circuits that are to execute memory access commands of different command sequences concurrently, to access different areas in the memory, respectively, wherein each memory access command includes a logical address of a location to be accessed, the memory access control step, when two or more circuits are to execute memory access commands of different command sequences concurrently, converts each logical address contained in the memory access commands to a physical address, each physical address being assigned to a different command sequence, so that the two or more circuits use physical addresses converted from logical addresses to identify areas in the memory to access, respectively.

23. A program for referring to a memory storing a command sequence composed of a plurality of commands, each command being executed by one of a plurality of circuits, and causing a computer to perform a circuit group control process for controlling the plurality of circuits, the circuit group control process comprising:

a command sequence specification receiving step for receiving, from the master processor, specification of a command sequence composed of a plurality of commands, each command being executed by one of the plurality of circuits; and an execution control step for causing any available circuits among the plurality of circuits to start executing corresponding commands among the plurality of commands one by one in order of arrangement in the command sequence, wherein the execution control step includes a concurrent execution control step for, while a circuit is executing a command, detecting another command that can be executed by another circuit and causing the other circuit to execute the other command concurrently, wherein the plurality of circuits includes two circuits that are different in function, the command sequence specification receiving step receives specification of a plurality of command sequences from the master processor, the execution control step causes any available circuits among the plurality of circuits to execute corresponding commands in a manner in which commands constituting each command sequence are to be executed one by one in order of arrangement in each command sequence, wherein the concurrent execution control step, while one of the two circuits is executing a command in a command sequence, detects another command in another command sequence that can be executed by another one of the two circuits and causes the other circuit to execute the other command, wherein each of the plurality of circuits can access a same memory, each command sequence includes a memory access command instructing a circuit to access the memory, each memory access command contains either a share attribute or a separate attribute, the share attribute specifying an access to a shared memory area that can be accessed by a plurality of command sequences, and the separate attribute specifying an access to one of memory areas which are respectively assigned to the plurality of command sequences, the execution control step includes a memory access control step for controlling two or more circuits that are to execute memory access commands containing the separate attribute of different command sequences concurrently, to respectively access separate areas in the memory, and for controlling two or more circuits that are to execute memory access commands containing the share attribute of different command sequences concurrently, to access the shared memory area in the memory.

24. A program for referring to a memory storing a command sequence composed of a plurality of commands, each command being to be executed by one of a plurality of circuits, and causing a computer to perform a circuit group control process for controlling the plurality of circuits, the circuit group control process comprising:

a command sequence specification receiving step for receiving, from the master processor, specification of a command sequence composed of a plurality of commands, each command being executed by one of the plurality of circuits; and an execution control step for causing any available circuits among the plurality of circuits to start executing corresponding commands among the plurality of commands one by one in order of arrangement in the command sequence, wherein the execution control step includes a concurrent execution control step for, while a circuit is executing a command, detecting another command that can be executed by another circuit and causing the other circuit to execute the other command concurrently, wherein the plurality of circuits includes two circuits that are different in function, the command sequence specification receiving step receives specification of a plurality of command sequences from the master processor, the execution control step causes any available circuits among the plurality of circuits to execute corresponding commands in a manner in which commands constituting each command sequence are to be executed one by one in order of arrangement in each command sequence, wherein the concurrent execution control step, while one of the two circuits is executing a command in a command sequence, detects another command in another command sequence that can be executed by another one of the two circuits and causes the other circuit to execute the other command, wherein the command sequence specification receiving step includes accessing a command storage memory, and recognizes the specification of the plurality of command sequences when the master processor writes the plurality of commands for each command sequence into the command storage memory, and the execution control step causes any available circuits among the plurality of circuits to execute corresponding commands among the plurality of commands stored in the command storage memory, one by one in order of arrangement in each command sequence.

25. A program for referring to a memory storing a command sequence composed of a plurality of commands, each command being executed by one of a plurality of circuits, and causing a computer to perform a circuit group control process for controlling the plurality of circuits, the circuit group control process comprising:

a command sequence specification receiving step for receiving, from the master processor, specification of a command sequence composed of a plurality of commands, each command being executed by one of the plurality of circuits; and an execution control step for causing any available circuits among the plurality of circuits to start executing corresponding commands among the plurality of commands one by one in order of arrangement in the command sequence, wherein the execution control step includes a concurrent execution control step for, while a circuit is executing a command, detecting another command that can be executed by another circuit and causing the other circuit to execute the other command concurrently, wherein the concurrent execution control step, while a circuit is executing a command in a command sequence, detects another command in the command sequence that can be executed by another circuit and causes the other circuit to execute the other command concurrently, wherein each of the plurality of circuits can access a same memory, each command sequence includes a memory specification attached command that contains (i) an attribute specifying either allocation or release of a memory area and (ii) a bank number that identifies the specified memory area, the execution control step holds memory management information for managing whether each memory area is used or not used, even if a command to be executed next in a command sequence is a memory specification attached command containing an attribute specifying allocation of a memory area identified by a bank number contained therein, the execution control step does not cause a circuit to execute the command to be executed next in so far as the memory management information indicates that the memory area specified by the memory specification attached command to be executed next is used, when causing a circuit to execute a memory specification attached command containing an attribute specifying allocation of a memory area, the execution control step updates the memory management information to indicate that a memory area specified by the memory specification attached command is used, and when causing a circuit to execute a memory specification attached command containing an attribute specifying release of a memory area, the execution control step updates the memory management information to indicate that a memory area specified by the memory specification attached command is not used.

26. A program for referring to a memory storing a command sequence composed of a plurality of commands, each command being to be executed by one of a plurality of circuits, and causing a computer to perform a circuit group control process for controlling the plurality of circuits, the circuit group control process comprising:

a command sequence specification receiving step for receiving, from the master processor, specification of a command sequence composed of a plurality of commands, each command being executed by one of the plurality of circuits; and an execution control step operable to cause any available circuits among the plurality of circuits to start executing corresponding commands among the plurality of commands one by one in order of arrangement in the command sequence, wherein the execution control step includes a concurrent execution control step for, while a circuit is executing a command, detecting another command that can be executed by another circuit and causing the other circuit to execute the other command concurrently, wherein the concurrent execution control step, while a circuit is executing a command in a command sequence, detects another command in the command sequence that can be executed by another circuit and causes the other circuit to execute the other command concurrently, wherein each of the plurality of circuits can access a same memory, the plurality of circuits include some circuits having a function to, while executing a predetermined command, send the execution control step a notification of release of a memory area together with a bank number identifying the released memory area, the plurality of circuits include some circuits having a function to, while executing a predetermined command, send the execution control step a request to allocate a memory area together with a bank number identifying the requested memory area, and then suspend the execution of the predetermined command until the some circuits receive a notification of allocation of the requested memory area from the execution control step, the execution control step holds memory management information for managing whether each memory area is used or not used, the execution control step, after receiving a notification of release of a memory area from any circuit, updates the memory management information to indicate that the memory area identified by a bank number attached to the notification is not used, the execution control step, after receiving a request to allocate a memory area from any circuit, sends a notification of allocation of the requested memory area immediately after the memory management information indicates that the requested memory area is not used, and updates the memory management information to indicate that the requested memory area is used.

* * * * *